US012061515B2

(12) United States Patent
Harutyunyan et al.

(10) Patent No.: US 12,061,515 B2
(45) Date of Patent: Aug. 13, 2024

(54) METHODS AND SYSTEMS THAT AUTOMATICALLY PREDICT DISTRIBUTED-COMPUTER-SYSTEM PERFORMANCE DEGRADATION USING AUTOMATICALLY TRAINED MACHINE-LEARNING COMPONENTS

(71) Applicant: VMware LLC, Palo Alto, CA (US)

(72) Inventors: Ashot Nshan Harutyunyan, Yerevan (AM); Nelli Aghajanyan, Yerevan (AM); Lilit Harutyunyan, Yerevan (AM); Arnak Poghosyan, Yerevan (AM); Tigran Bunarjyan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/577,329

(22) Filed: Jan. 17, 2022

(65) Prior Publication Data

US 2023/0229537 A1 Jul. 20, 2023

(51) Int. Cl.

*G06F 11/34* (2006.01)
*G06F 11/07* (2006.01)
*G06N 5/022* (2023.01)

(52) U.S. Cl.

CPC ...... *G06F 11/0757* (2013.01); *G06F 11/0709* (2013.01); *G06F 11/0766* (2013.01); *G06F 11/3447* (2013.01); *G06N 5/022* (2013.01)

(58) Field of Classification Search

CPC ............. G06F 11/0766; G06F 11/0709; G06F 11/3409; G06F 11/3447; G06F 11/3006; G06N 20/00

See application file for complete search history.

(56) References Cited

U.S. PATENT DOCUMENTS

| | | | | |
|---|---|---|---|---|
| 10,558,207 | B1 * | 2/2020 | McGuirk | G05B 23/0283 |
| 2014/0317040 | A1 * | 10/2014 | Liu | G06K 9/6296 706/46 |
| 2020/0183769 | A1 * | 6/2020 | Poghosyan | G06F 11/0751 |
| 2020/0234162 | A1 * | 7/2020 | Jayaraman | G06N 20/00 |
| 2021/0089377 | A1 * | 3/2021 | Wang | G06F 11/079 |
| 2021/0383206 | A1 * | 12/2021 | Teppoeva | G06N 3/08 |
| 2022/0019935 | A1 * | 1/2022 | Ghatage | G06N 20/00 |
| 2022/0019936 | A1 * | 1/2022 | Sarda | G06N 7/005 |

* cited by examiner

*Primary Examiner* — Yolanda L Wilson

(74) *Attorney, Agent, or Firm* — Quarles & Brady LLP

(57) ABSTRACT

The current document is directed to methods and systems that automatically generate training data for machine-learning-based components used by a metric-data processing-and-analysis component of a distributed computer system, a subsystem within a distributed computer system, or a stand-alone metric-data processing-and-analysis system. The training data sets are labeled using categorical KPI values. The machine-learning-based components are applied to metric data both for predicting anomalous operational behaviors and problems within the distributed computer system and for determination of potential causes of anomalous operational behaviors and problems within the distributed computer system. Training of machine-learning-based components is carried out concurrently and asynchronously with respect to other metric-data collection, aggregation, processing, storage, and analysis tasks.

15 Claims, 59 Drawing Sheets

1114 (1115, 1116, 1117; rows 1118, 1119)

| label | D | E |
|---|---|---|
| 1 | 1 | 1 GB |
| 2 | 1 | 4 GB |
| 3 | 2 | 1 GB |
| 4 | 2 | 4 GB |
| 5 | 2 | 8 GB |
| 6 | 3 | 1 GB |
| 7 | 3 | 4 GB |
| 8 | 3 | 8 GB |
| 9 | 4 | 4 GB |
| 10 | 4 | 8 GB |
| 11 | 4 | 16 GB |
| 12 | 4 | 32 GB |

1120 (1121)

| attribute | attribute value |
|---|---|
| A | a |
| A | b |
| A | f |
| B | p |
| B | s |
| B | t |
| B | g |
| C | k |
| C | m |
| C | n |

1122 (1123, 1124, 1125, 1126, 1127; 1128; rows 1160, 1161, 1162, 1163, 1164) ①

| num | A | B | C | label |
|---|---|---|---|---|
| 1 | b | p | k | 1 |
| 2 | f | s | n | 1 |
| 3 | a | p | m | 2 |
| 4 | a | p | k | 11 |
| 5 | a | g | k | 4 |
| 6 | b | p | m | 1 |
| 7 | a | g | m | 10 |
| 8 | b | s | m | 2 |
| 9 | a | s | n | 11 |
| 10 | b | p | n | 10 |
| 11 | b | t | k | 4 |
| 12 | f | s | k | 1 |
| 13 | b | g | k | 10 |
| 14 | a | p | m | 11 |
| 15 | f | g | m | 2 |
| 16 | f | g | n | 10 |
| 17 | b | t | m | 2 |
| 18 | a | t | n | 11 |
| 19 | f | p | k | 4 |
| 20 | b | p | k | 1 |
| 21 | f | s | m | 4 |
| 22 | a | s | m | 2 |
| 23 | a | g | k | 11 |
| 24 | a | s | m | 10 |
| 25 | a | g | k | 11 |
| 26 | b | p | k | 4 |
| 27 | f | s | n | 1 |
| 28 | b | p | m | 1 |
| 29 | f | g | k | 10 |
| 30 | a | p | n | 11 |
| 31 | f | p | m | 2 |
| 32 | a | s | m | 4 |
| 33 | a | g | k | 11 |
| 34 | b | p | k | 1 |
| 35 | a | t | m | 11 |
| 36 | f | s | n | 1 |
| 37 | a | t | m | 2 |
| 38 | a | s | n | 11 |
| 39 | b | p | m | 1 |
| 40 | b | p | k | 1 |

$$\text{Entropy} = -\sum_{i=f_0}^{f_n} P(i)\log_2 P(i)$$

1139

$$w = \frac{\text{numChild}}{\text{numParent}}$$

$$\text{Entropy Gain} = E_p - (W_{C1}E_{C1} + W_{C2}E_{C2})$$

1134 1136 1137 1138

1131

1130

| | | |
|---|---|---|
| A | a | -0.54 * |
| A | b | -0.22 |
| A | f | -0.12 |
| B | p | -0.09 |
| B | s | -0.02 |
| B | t | -0.11 |
| B | g | -0.21 |
| C | k | -0.08 |
| C | m | -0.28 |
| C | n | -0.16 |

1140 1142 (2)

| num | A | B | C | label |
|---|---|---|---|---|
| 1 | a | p | m | 2 |
| 2 | a | p | k | 11 |
| 3 | a | g | k | 4 |
| 4 | a | g | m | 10 |
| 5 | a | s | n | 11 |
| 6 | a | p | m | 11 |
| 7 | a | t | n | 11 |
| 8 | a | s | m | 2 |
| 9 | a | g | k | 11 |
| 10 | a | s | m | 10 |
| 11 | a | g | k | 11 |
| 12 | a | p | n | 11 |
| 13 | a | s | m | 4 |
| 14 | a | g | k | 11 |
| 15 | a | t | m | 11 |
| 16 | a | t | m | 2 |
| 17 | a | s | n | 11 |

1141 1142 (3)

| num | A | B | C | label |
|---|---|---|---|---|
| 1 | b | p | k | 1 |
| 2 | f | s | n | 1 |
| 3 | b | p | m | 1 |
| 4 | b | s | m | 2 |
| 5 | b | p | n | 10 |
| 6 | b | t | k | 4 |
| 7 | f | s | k | 1 |
| 8 | b | g | k | 10 |
| 9 | f | g | m | 2 |
| 10 | f | g | n | 10 |
| 11 | b | t | m | 2 |
| 12 | f | p | k | 4 |
| 13 | b | p | k | 1 |
| 14 | f | s | m | 4 |
| 15 | b | p | k | 4 |
| 16 | f | s | n | 1 |
| 17 | b | p | m | 1 |
| 18 | f | g | k | 10 |
| 19 | f | p | m | 2 |
| 20 | b | p | k | 1 |
| 21 | f | s | n | 1 |
| 22 | b | p | m | 1 |
| 23 | b | p | k | 1 |

1145

1146

| | | |
|---|---|---|
| B | p | -0.11 |
| B | s | -0.20 |
| B | t | -0.09 |
| B | g | -0.12 |
| C | k | -0.19 |
| C | m | -0.46 * |
| C | n | -0.22 |

| | | |
|---|---|---|
| A | b | -0.01 |
| A | f | -0.01 |
| B | p | -0.09 |
| B | s | -0.09 |
| B | t | -0.14 |
| B | g | -0.38 |
| C | k | -0.20 |
| C | m | -0.39 * |
| C | n | -0.18 |

FIG. 11C (4)

| num | A | B | C | label |
|---|---|---|---|---|
| 1 | a | p | m | 2 |
| 2 | a | g | m | 10 |
| 3 | a | p | m | 11 |
| 4 | a | s | m | 2 |
| 5 | a | s | m | 10 |
| 6 | a | s | m | 4 |
| 7 | a | t | m | 11 |
| 8 | a | t | m | 2 |

1148

| | | | |
|---|---|---|---|
| B | p | -0.22 | |
| B | s | -0.36 | * |
| B | t | -0.22 | |
| B | g | -0.29 | |

(5)

| num | A | B | C | label |
|---|---|---|---|---|
| 1 | a | p | k | 11 |
| 2 | a | g | k | 4 |
| 3 | a | s | n | 11 |
| 4 | a | t | n | 11 |
| 5 | a | g | k | 11 |
| 6 | a | g | k | 11 |
| 7 | a | p | n | 11 |
| 8 | a | g | k | 11 |
| 9 | a | s | n | 11 |

1149

(6)

| num | A | B | C | label |
|---|---|---|---|---|
| 1 | a | s | m | 2 |
| 2 | a | s | m | 10 |
| 3 | a | s | m | 4 |

(7)

| num | A | B | C | label |
|---|---|---|---|---|
| 1 | a | p | m | 2 |
| 2 | a | g | m | 10 |
| 3 | a | p | m | 11 |
| 4 | a | t | m | 11 |
| 5 | a | t | m | 2 |

| | | | |
|---|---|---|---|
| B | p | -0.17 | |
| B | t | -0.17 | |
| B | g | -0.72 | * |

(8)

| num | A | B | C | label |
|---|---|---|---|---|
| 1 | a | g | m | 10 |

(9)

| num | A | B | C | label |
|---|---|---|---|---|
| 1 | a | p | m | 2 |
| 2 | a | p | m | 11 |
| 3 | a | t | m | 11 |
| 4 | a | t | m | 2 |

(10)

| num | A | B | C | label |
|---|---|---|---|---|
| 1 | a | p | m | 2 |
| 2 | a | p | m | 11 |

(11)

| num | A | B | C | label |
|---|---|---|---|---|
| 1 | a | t | m | 11 |
| 2 | a | t | m | 2 |

(12)

| num | A | B | C | label |
|---|---|---|---|---|
| 1 | a | g | k | 4 |
| 2 | a | g | k | 11 |
| 3 | a | g | k | 11 |
| 4 | a | g | k | 11 |

(13)

| num | A | B | C | label |
|---|---|---|---|---|
| 1 | a | p | k | 11 |
| 2 | a | s | n | 11 |
| 3 | a | t | n | 11 |
| 4 | a | p | n | 11 |
| 5 | a | s | n | 11 |

| num | A | B | C | label |
|---|---|---|---|---|
| 1 | b | p | m | 1 |
| 2 | b | s | m | 2 |
| 3 | f | g | m | 2 |
| 4 | b | t | m | 2 |
| 5 | f | s | m | 4 |
| 6 | b | p | m | 1 |
| 7 | f | p | m | 2 |
| 8 | b | p | m | 1 |

| | | |
|---|---|---|
| A | b | -0.45 |
| A | f | -0.45 |
| B | p | -0.59 |
| B | s | -0.41 |
| B | t | -0.14 |
| B | g | -0.14 |

*

(15)

| num | A | B | C | label |
|---|---|---|---|---|
| 1 | b | p | k | 1 |
| 2 | f | s | n | 1 |
| 3 | b | p | n | 10 |
| 4 | b | t | k | 4 |
| 5 | f | s | k | 1 |
| 6 | b | g | k | 10 |
| 7 | f | g | n | 10 |
| 8 | f | p | k | 4 |
| 9 | b | p | k | 1 |
| 10 | b | p | k | 4 |
| 11 | f | s | n | 1 |
| 12 | f | g | k | 10 |
| 13 | b | p | k | 1 |
| 14 | f | s | n | 1 |
| 15 | b | p | k | 1 |

(16)

| num | A | B | C | label |
|---|---|---|---|---|
| 1 | b | p | m | 1 |
| 2 | b | p | m | 1 |
| 3 | f | p | m | 2 |
| 4 | b | p | m | 1 |

(17)

| num | A | B | C | label |
|---|---|---|---|---|
| 1 | b | s | m | 2 |
| 2 | f | g | m | 2 |
| 3 | b | t | m | 2 |
| 4 | f | s | m | 4 |

(18)

| num | A | B | C | label |
|---|---|---|---|---|
| 1 | f | p | m | 2 |

(20)

| num | A | B | C | label |
|---|---|---|---|---|
| 1 | b | s | m | 2 |
| 2 | b | t | m | 2 |

(19)

| num | A | B | C | label |
|---|---|---|---|---|
| 1 | b | p | m | 1 |
| 2 | b | p | m | 1 |
| 3 | b | p | m | 1 |

(21)

| num | A | B | C | label |
|---|---|---|---|---|
| 1 | f | g | m | 2 |
| 2 | f | s | m | 4 |

(22)

| num | A | B | C | label |
|---|---|---|---|---|
| 1 | f | g | m | 2 |

(23)

| num | A | B | C | flavor |
|---|---|---|---|---|
| 1 | f | s | m | 4 |

| num | A | B | C | label |
|---|---|---|---|---|
| 1 | b | g | k | 10 |
| 2 | f | g | n | 10 |
| 3 | f | g | k | 10 |

| | | | |
|---|---|---|---|
| A | b | -0.13 | |
| A | f | -0.13 | |
| B | p | -0.06 | |
| B | s | -0.30 | |
| B | t | -0.17 | |
| B | g | -0.51 | * |
| C | k | -0.14 | |
| C | n | -0.14 | |

25

| num | A | B | C | label |
|---|---|---|---|---|
| 1 | b | p | k | 1 |
| 2 | f | s | n | 1 |
| 3 | b | p | n | 10 |
| 4 | b | t | k | 4 |
| 5 | f | s | k | 1 |
| 6 | f | p | k | 4 |
| 7 | b | p | k | 1 |
| 8 | b | p | k | 4 |
| 9 | f | s | n | 1 |
| 10 | b | p | k | 1 |
| 11 | f | s | n | 1 |
| 12 | b | p | k | 1 |

| | | | |
|---|---|---|---|
| A | b | -0.08 | |
| A | f | -0.08 | |
| B | p | -0.08 | |
| B | s | -0.25 | |
| B | t | -0.18 | |
| C | k | -0.29 | * |
| C | n | -0.28 | |

26

| num | A | B | C | label |
|---|---|---|---|---|
| 1 | b | p | k | 1 |
| 2 | b | t | k | 4 |
| 3 | f | s | k | 1 |
| 4 | f | p | k | 4 |
| 5 | b | p | k | 1 |
| 6 | b | p | k | 4 |
| 7 | b | p | k | 1 |
| 8 | b | p | k | 1 |

27

| num | A | B | C | label |
|---|---|---|---|---|
| 1 | f | s | n | 1 |
| 2 | b | p | n | 1 |
| 3 | f | s | n | 1 |
| 4 | f | s | n | 1 |

28

| num | A | B | C | label |
|---|---|---|---|---|
| 1 | b | t | k | 4 |

29

| num | A | B | C | label |
|---|---|---|---|---|
| 1 | b | p | k | 1 |
| 2 | f | s | k | 1 |
| 3 | f | p | k | 4 |
| 4 | b | p | k | 1 |
| 5 | b | p | k | 4 |
| 6 | b | p | k | 1 |
| 7 | b | p | k | 1 |

30

| num | A | B | C | label |
|---|---|---|---|---|
| 1 | f | s | k | 1 |

31

| num | A | B | C | label |
|---|---|---|---|---|
| 1 | b | p | k | 1 |
| 2 | f | p | k | 4 |
| 3 | b | p | k | 1 |
| 4 | b | p | k | 4 |
| 5 | b | p | k | 1 |
| 6 | b | p | k | 1 |

32

| num | A | B | C | label |
|---|---|---|---|---|
| 1 | b | b | k | 1 |
| 2 | b | p | k | 1 |
| 3 | b | p | k | 4 |
| 4 | b | p | k | 1 |
| 5 | b | p | k | 1 |

33

| num | A | B | C | label |
|---|---|---|---|---|
| 1 | f | p | k | 4 |

| A | B | C | D | E | F | G | H | label |
|---|---|---|---|---|---|---|---|---|
| 11 | j | 7 | 2 | 11.3 | x | c | 3 | 0 |
| 26 | k | 20 | 2 | 13.6 | x | b | 3 | 0 |
| 13 | m | 9 | 3 | 7.2 | x | a | 3 | 0 |
| 7 | b | 19 | 6 | 88.3 | w | d | 2 | 0 |
| 19 | c | 11 | 1 | 51.4 | y | a | 1 | 1 |
| 16 | z | 6 | 7 | 37.6 | z | b | 3 | 0 |
| 13 | q | 8 | 3 | 29.5 | x | a | 3 | 0 |
| 31 | l | 13 | 4 | 77.7 | z | a | 1 | 1 |
| 17 | b | 14 | 5 | 63.9 | z | d | 2 | 0 |
| 32 | g | 2 | 5 | 21.8 | y | c | 2 | 0 |
| 6 | s | 19 | 9 | 19.4 | y | c | 3 | 0 |
| 41 | u | 16 | 8 | 11.1 | w | d | 1 | 0 |
| 27 | t | 16 | 3 | 47.2 | w | a | 2 | 1 |
| 24 | h | 7 | 2 | 62.7 | z | b | 1 | 0 |
| 17 | a | 6 | 1 | 91.3 | x | a | 2 | 0 |
| 3 | k | 15 | 1 | 40.0 | z | a | 3 | 1 |
| 45 | j | 9 | 4 | 31.8 | y | b | 3 | 0 |
| 13 | n | 11 | 7 | 10.0 | z | d | 2 | 0 |
| 33 | w | 17 | 9 | 81.4 | y | a | 1 | 1 |
| 6 | y | 7 | 8 | 58.3 | x | a | 1 | 0 |
| 7 | d | 13 | 8 | 35.2 | w | b | 1 | 0 |
| 19 | z | 8 | 2 | 15.5 | z | c | 2 | 0 |
| 25 | f | 12 | 1 | 22.6 | z | a | 1 | 1 |
| 16 | q | 18 | 3 | 48.0 | y | d | 3 | 0 |
| 17 | e | 16 | 4 | 58.7 | w | c | 3 | 0 |
| 9 | x | 13 | 4 | 16.9 | x | b | 2 | 0 |
| 16 | l | 14 | 7 | 25.4 | w | a | 2 | 1 |

| A | B | C | D | E | F | G | H | label | 1224 | 1222 |
|---|---|---|---|---|---|---|---|---|---|---|
| 11 | j | 7 | 2 | 11.3 | x | c | 3 | 0 | N | G |
| 26 | k | 20 | 2 | 13.6 | x | b | 3 | 0 | N | G |
| 13 | m | 9 | 3 | 7.2 | x | a | 3 | 0 | N | Pr |
| 7 | b | 19 | 6 | 88.3 | w | d | 2 | 0 | N | G |
| 19 | c | 11 | 1 | 51.4 | y | a | 1 | 1 | P | Pr |
| 16 | z | 6 | 7 | 37.6 | z | b | 3 | 0 | N | Pr |
| 13 | q | 8 | 3 | 29.5 | x | a | 3 | 0 | N | G |
| 31 | l | 13 | 4 | 77.7 | z | a | 1 | 1 | P | G |
| 17 | b | 14 | 5 | 63.9 | z | d | 2 | 0 | N | Pr |
| 32 | g | 2 | 5 | 21.8 | y | c | 2 | 0 | N | G |
| 6 | s | 19 | 9 | 19.4 | y | c | 3 | 0 | N | G |
| 41 | u | 16 | 8 | 11.1 | w | d | 1 | 0 | N | G |
| 27 | t | 16 | 3 | 47.2 | w | a | 2 | 1 | P | G |
| 24 | h | 7 | 2 | 62.7 | z | b | 1 | 0 | N | Pr |
| 17 | a | 6 | 1 | 91.3 | x | a | 2 | 0 | N | G |
| 3 | k | 15 | 1 | 40.0 | z | a | 3 | 1 | P | Pr |
| 45 | j | 9 | 4 | 31.8 | y | b | 3 | 0 | N | G |
| 13 | n | 11 | 7 | 10.0 | z | d | 2 | 0 | N | G |
| 33 | w | 17 | 9 | 81.4 | y | a | 1 | 1 | P | G |
| 6 | y | 7 | 8 | 58.3 | x | a | 1 | 0 | N | Pr |
| 7 | d | 13 | 8 | 35.2 | w | b | 1 | 0 | N | G |
| 19 | z | 8 | 2 | 15.5 | z | c | 2 | 0 | N | G |
| 25 | f | 12 | 1 | 22.6 | z | a | 1 | 1 | P | G |
| 16 | q | 18 | 3 | 48.0 | y | d | 3 | 0 | N | G |
| 17 | e | 16 | 4 | 58.7 | w | c | 3 | 0 | N | Pr |
| 9 | x | 13 | 4 | 16.9 | x | b | 2 | 0 | N | G |
| 16 | l | 14 | 7 | 25.4 | w | a | 2 | 1 | P | G |

FIG. 12C

1226 Rule: Ø

1234

$$\text{Information\_Gain} = t\left(p_c \log_2 \frac{p_n}{p_n+n_n} - p_c \log_2 \frac{p_c}{p_c+n_c}\right)$$

1232

1228 / 1230

| | |
|---|---|
| A >= 10 | 1.7 |
| A >= 17 | 2.4 |
| A >= 25 | 3.7 |
| B == b | 0 |
| B == g | 0 |
| B == n | 0 |
| C >= 7 | 0.81 |
| C >= 10 | 2.7 |
| C >= 16 | 0.24 |
| D >= 3 | 0.47 |
| D >= 6 | 0.24 |
| D >= 9 | 0.93 |
| E >= 16.0 | 2.2 |
| E >= 35.0 | 2.1 |
| E >= 50.0 | 1.9 |
| F == X | 0 |
| F == W | 1.2 |
| F == Z | 1.9 |
| G == a | 7.2 * |
| G == b | 0 |
| G == c | 0 |
| H >= 1 | 0 |
| H >= 2 | -1.8 |
| H >= 3 | 0 |

1236 $p_n = 5,\ n_n = 2,\ p_c = 5,\ n_c = 14$

Rule: G == a 1238

1240

| | |
|---|---|
| G == a AND A >= 10 | 0 |
| G == a AND A >= 17 | 0.65 |
| G == a AND A >= 25 | 1.9 |
| G == a AND B == b | -∞ |
| G == a AND B == g | -∞ |
| G == a AND B == n | -∞ |
| G == a AND C >= 7 | 1.1 |
| G == a AND C >= 10 | 2.4 * |
| G == a AND C >= 16 | 0.97 |
| G == a AND D >= 3 | 0.65 |
| G == a AND D >= 6 | 0.97 |
| G == a AND D >= 9 | 0.49 |
| G == a AND E >= 16.0 | 0 |
| G == a AND E >= 35.0 | 2.1 |
| G == a AND E >= 50.0 | -0.20 |
| G == a AND F == X | 0 |
| G == a AND F == W | 0.97 |
| G == a AND F == Z | 0.97 |
| G == a AND H >= 1 | 0 |
| G == a AND H >= b | -1.0 |
| G == a AND H >= c | 0 |

1242 $p_n = 5,\ n_n = 0,\ p_c = 5,\ n_c = 2$

Rule: G == a AND C >= 10 1244

| A | B | C | D | E | F | G | H | label |
|---|---|---|---|---|---|---|---|---|
| 11 | j | 7 | 2 | 11.3 | x | c | 3 | 0 |
| 26 | k | 20 | 2 | 13.6 | x | b | 3 | 0 |
| 7 | b | 19 | 6 | 88.3 | w | d | 2 | 0 |
| 13 | q | 8 | 3 | 29.5 | x | a | 3 | 0 |
| 31 | l | 13 | 4 | 77.7 | z | a | 1 | 1 |
| 32 | g | 2 | 5 | 21.8 | y | c | 2 | 0 |
| 6 | s | 19 | 9 | 19.4 | y | c | 3 | 0 |
| 41 | u | 16 | 8 | 11.1 | w | d | 1 | 0 |
| 27 | t | 16 | 3 | 47.2 | w | a | 2 | 1 |
| 17 | a | 6 | 1 | 91.3 | x | a | 2 | 0 |
| 45 | j | 9 | 4 | 31.8 | y | b | 3 | 0 |
| 13 | n | 11 | 7 | 10.0 | z | d | 2 | 0 |
| 33 | w | 17 | 9 | 81.4 | y | a | 1 | 1 |
| 7 | d | 13 | 8 | 35.2 | w | b | 1 | 0 |
| 19 | z | 8 | 2 | 15.5 | z | c | 2 | 0 |
| 25 | f | 12 | 1 | 22.6 | z | a | 1 | 1 |
| 16 | q | 18 | 3 | 48.0 | y | d | 3 | 0 |
| 9 | x | 13 | 4 | 16.9 | x | b | 2 | 0 |
| 16 | l | 14 | 7 | 25.4 | w | a | 2 | 1 |

$$coverage = \frac{p}{num\_positive}$$ 1262

$$confidence = \frac{p}{p+n}$$ 1264

$$accuracy = \frac{p + num\_negative - n}{num\_negative + num\_positive}$$ 1266

G == a 1252 1254 1255

| | | | | | | | | |
|---|---|---|---|---|---|---|---|---|
| 13 | q | 8 | 3 | 29.5 | x | a | 3 | 0 |
| 31 | l | 13 | 4 | 77.7 | z | a | 1 | 1 |
| 27 | t | 16 | 3 | 47.2 | w | a | 2 | 1 |
| 17 | a | 6 | 1 | 91.3 | x | a | 2 | 0 |
| 33 | w | 17 | 9 | 81.4 | y | a | 1 | 1 |
| 25 | f | 12 | 1 | 22.6 | z | a | 1 | 1 |
| 16 | q | 18 | 3 | 48.0 | y | d | 3 | 0 |

$$coverage = \frac{5}{5} = 1.0$$

$$confidence = \frac{5}{7} = 0.714$$

accuracy = 0.89

G == a AND c >= 10

1260

| | | | | | | | | |
|---|---|---|---|---|---|---|---|---|
| 31 | l | 13 | 4 | 77.7 | z | a | 1 | 1 |
| 27 | t | 16 | 3 | 47.2 | w | a | 2 | 1 |
| 33 | w | 17 | 9 | 81.4 | y | a | 1 | 1 |
| 25 | f | 12 | 1 | 22.6 | z | a | 1 | 1 |
| 16 | q | 18 | 3 | 48.0 | y | d | 3 | 0 |

$$coverage = \frac{5}{5} = 1.0$$

$$confidence = \frac{5}{5+0} = 1.0$$

accuracy = 1.0

FIG. 12E

Entropy $$H(x) = -\sum_{i=1}^{n} p(x_i)\log(p(x_i)) = \text{entropy of } X$$

where $x_i$ are the n possible outcomes from sampling X } 1942

Joint Entropy $$H(X,Y) = \sum_{i=1}^{n}\sum_{j=1}^{m} p(x_i,y_j)\log(p(x_i,y_j))$$ — 1943

Mutual Information $$I(X;Y) = \sum_{y\in Y}\sum_{x\in X} p(x,y)\log\left(\frac{p(x,y)}{p(x)p(y)}\right)$$

$$I(X;Y) = \int_Y\int_X p(x,y)\log\left(\frac{p(x,y)}{p(x)p(y)}\right)dx\,dy$$

$$I(X;Y) = H(X) - H(X|Y)$$
$$= H(Y) - H(Y|X)$$
$$= H(X,Y) - H(X|Y) - H(Y|X)$$

} 1944

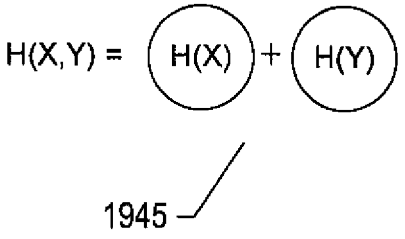

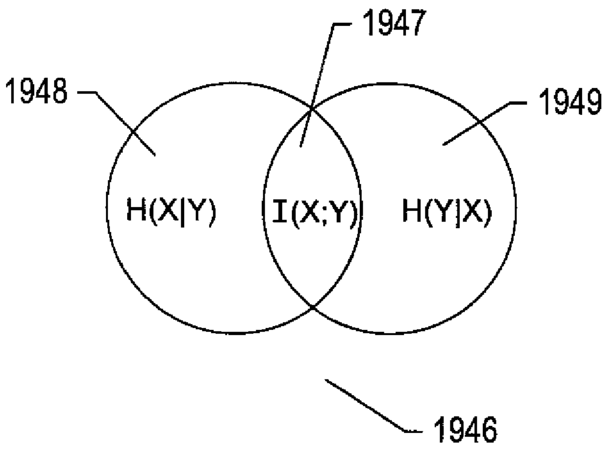

Symmetrical Uncertainty $$SU(X,Y) = 2\left[\frac{I(X;Y)}{H(X)+H(Y)}\right]$$ — 1950

FIG. 19B

METHODS AND SYSTEMS THAT AUTOMATICALLY PREDICT DISTRIBUTED-COMPUTER-SYSTEM PERFORMANCE DEGRADATION USING AUTOMATICALLY TRAINED MACHINE-LEARNING COMPONENTS

TECHNICAL FIELD

The current document is directed to computer-system monitoring and management and, in particular, to methods and systems that automatically generate training data for machine-learning-based components that are used by metric-data processing-and-analysis systems to monitor metric-data generated by a distributed-computer-system.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operating systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system monitoring, management, and administration. Currently, these needs have begun to be addressed by highly capable automated data-collection, data analysis, monitoring, management, and administration tools and facilities. Many different types of automated monitoring, management, and administration facilities have emerged, providing many different products with overlapping functionalities, but each also providing unique functionalities and capabilities. Owners, managers, and users of large-scale computer systems continue to seek methods, systems, and technologies to provide secure, efficient, and cost-effective data-collection and data analysis tools and subsystems to support monitoring, management, and administration of computing facilities, including cloud-computing facilities and other large-scale computer systems.

SUMMARY

The current document is directed to methods and systems that automatically generate training data for machine-learning-based components used by a metric-data processing-and-analysis component of a distributed computer system, a subsystem within a distributed computer system, or a stand-alone metric-data processing-and-analysis system. The training data sets are labeled using categorical KPI values. The machine-learning-based components are applied to metric data both for predicting anomalous operational behaviors and problems within the distributed computer system and for determination of potential causes of anomalous operational behaviors and problems within the distributed computer system. Training of machine-learning-based components is carried out concurrently and asynchronously with respect to other metric-data collection, aggregation, processing, storage, and analysis tasks.

BRIEF DESCRIPTION OF THE DRAWINGS

FIG. 11A-F illustrate construction of a decision tree.

FIGS. 12A-E illustrate an example of generating a simple rule from a dataset of entries including attribute values and a label value.

FIGS. 19A-B illustrate numerous statistical and data-analysis methods and processes.

DETAILED DESCRIPTION

Figure 1:
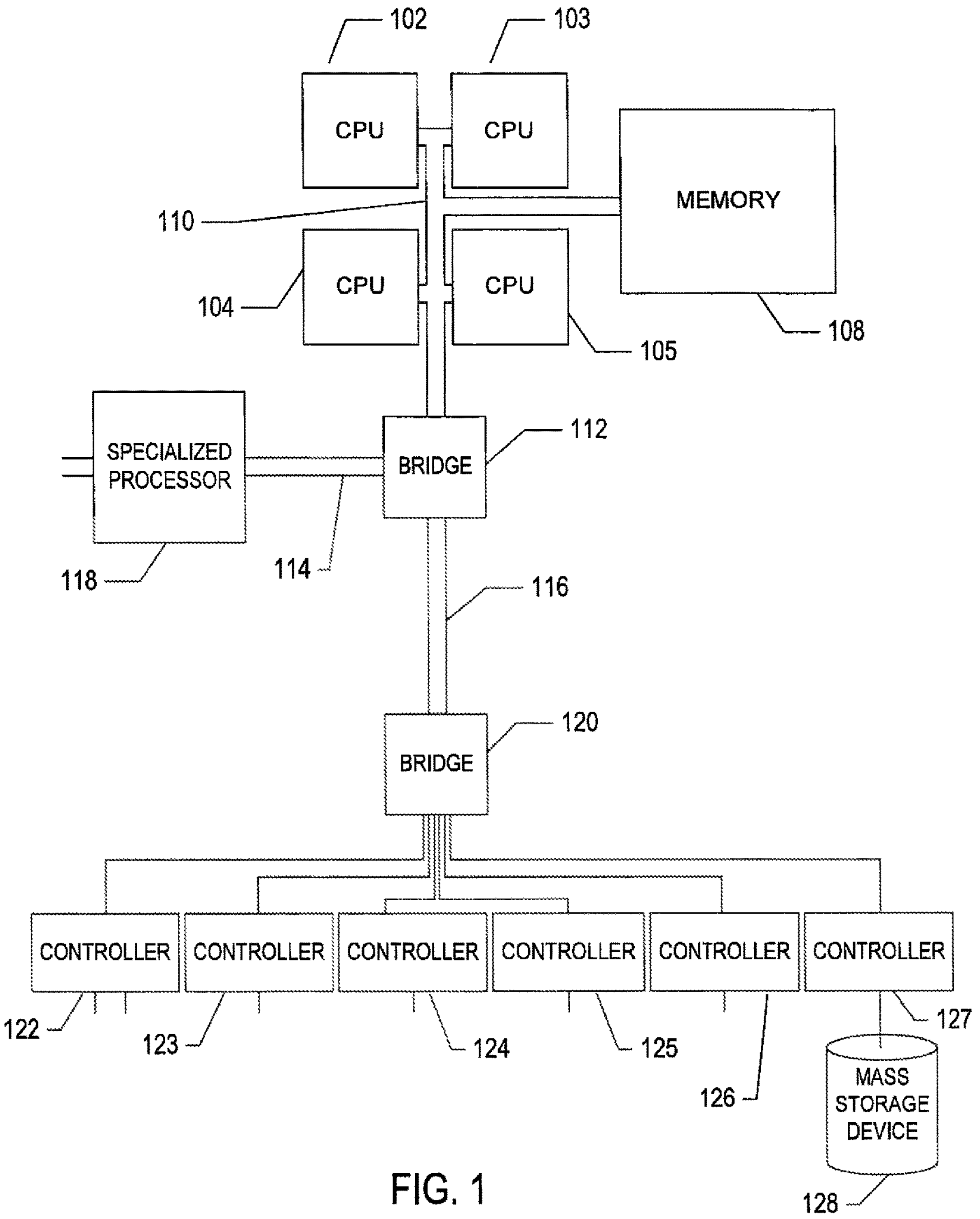
FIG. 1 provides a general architectural diagram for various types of computers.

The current document is directed to methods and systems that automatically train machine-learning components for use by metric-data processing-and-analysis systems. In a first subsection, below, a detailed description of computer hardware, complex computational systems, and virtualization is provided with reference to FIGS. 1-10. In a second subsection, decision trees are discussed with reference to FIGS. 11A-F. In a third subsection, rule induction is discussed with reference to FIGS. 12A-18B. In a fourth subsection, statistical methods are discussed with reference to FIGS. 19A-B. In a final subsection, the currently disclosed methods and systems are discussed with reference to FIGS. 20-34 F.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
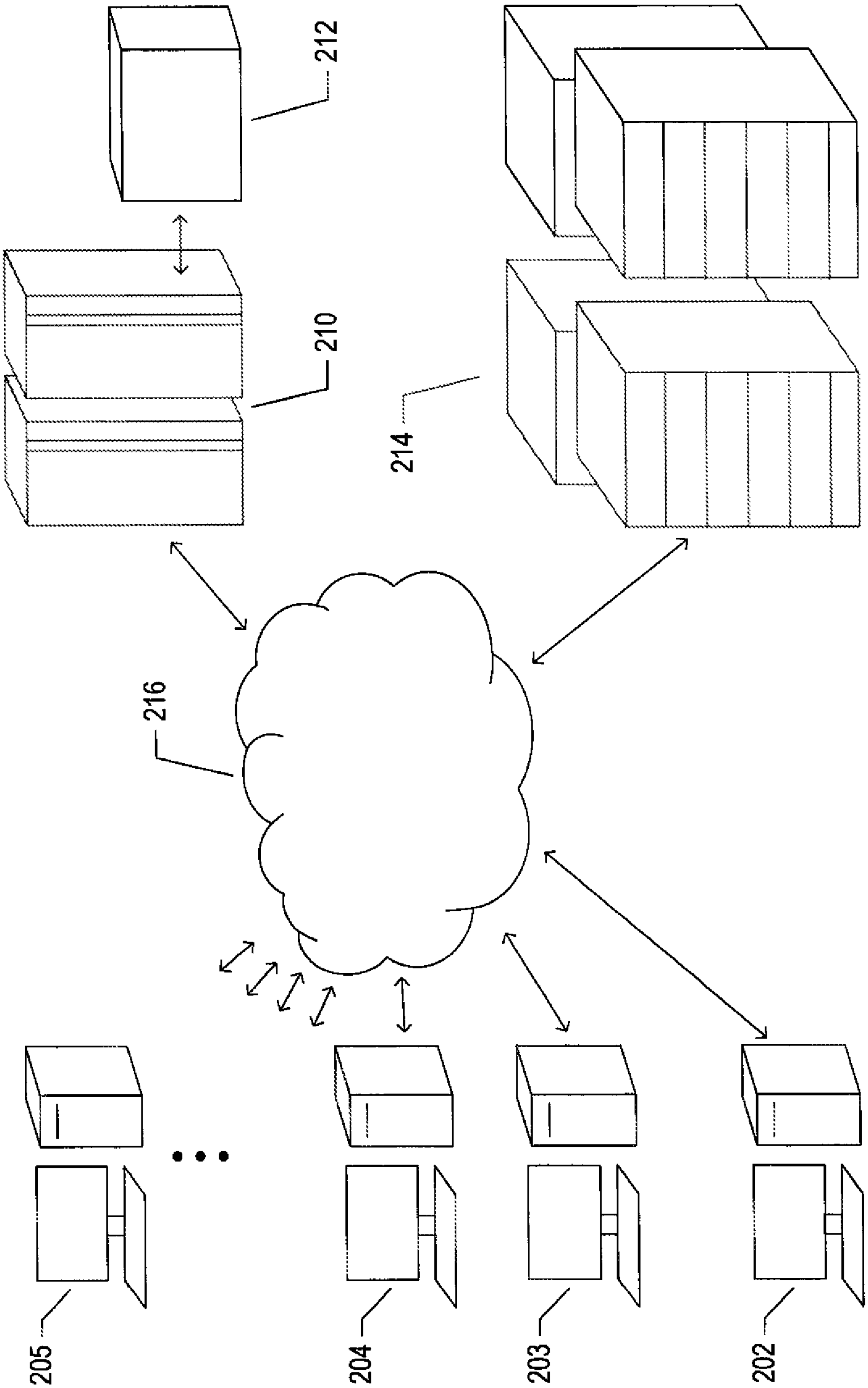
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
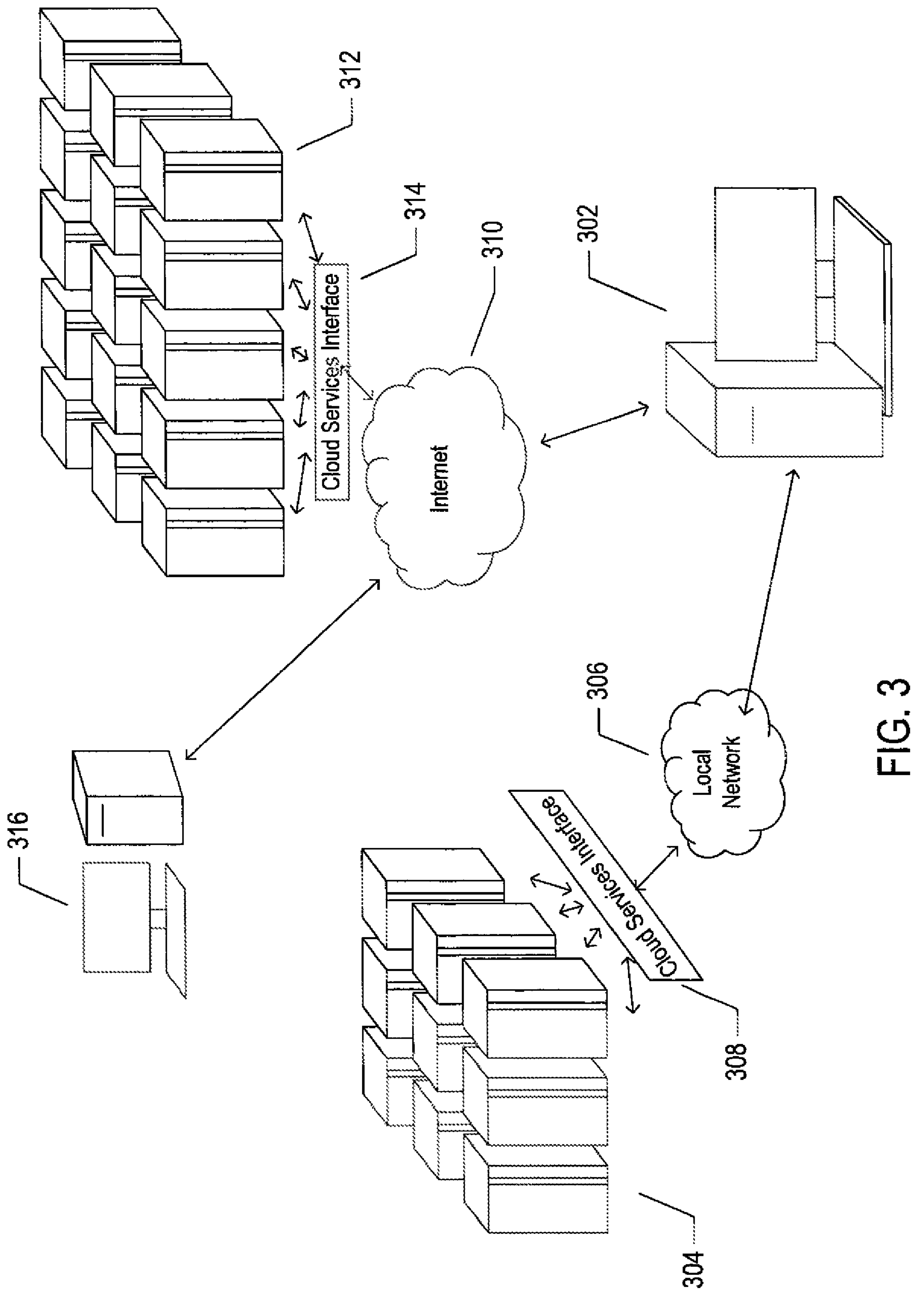
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
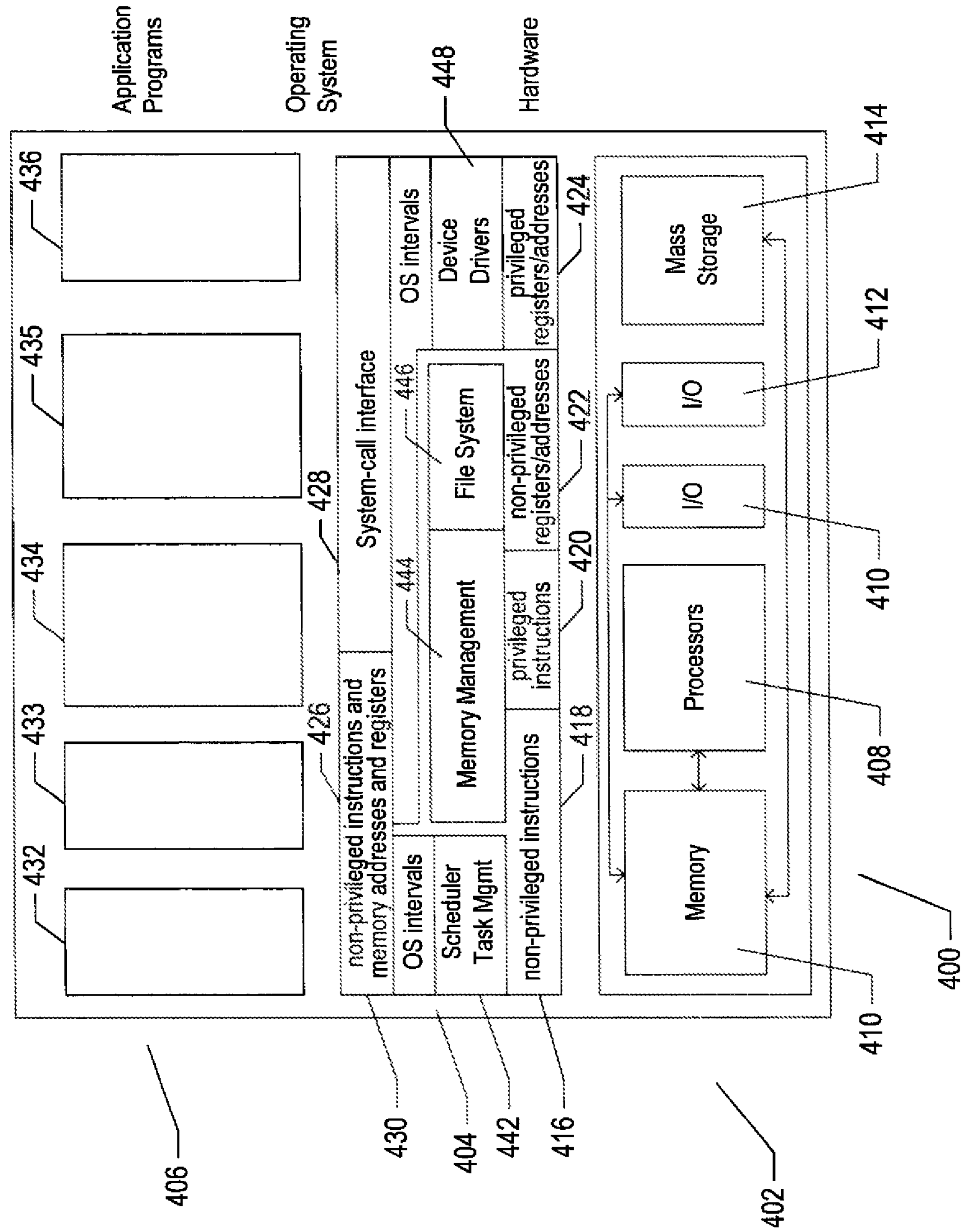
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 132, memory management 134, a file system 136, device drivers 138, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
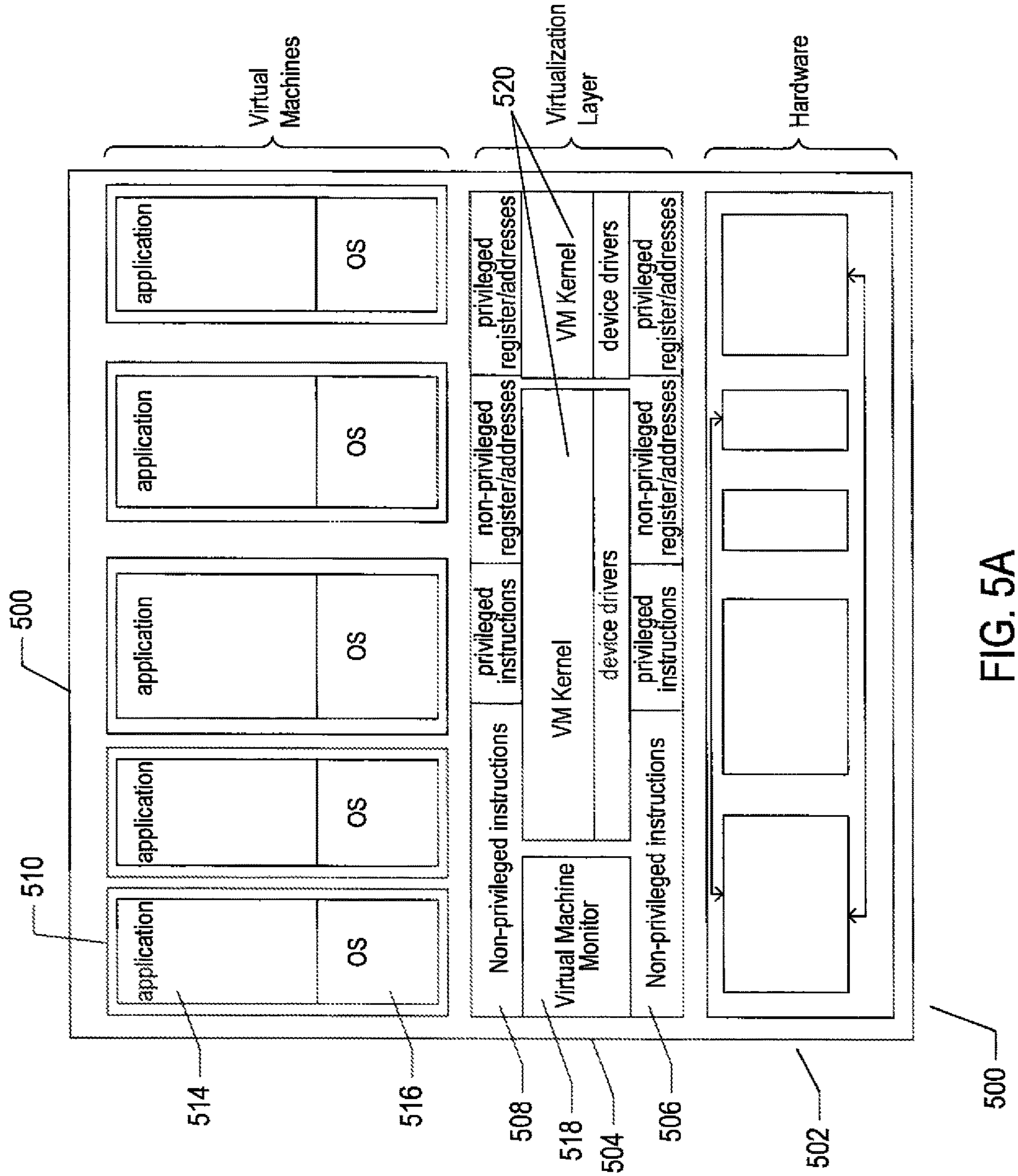
FIGS. 5A-D illustrate two types of virtual machine and virtual-machine execution environments.
Figure 5B:
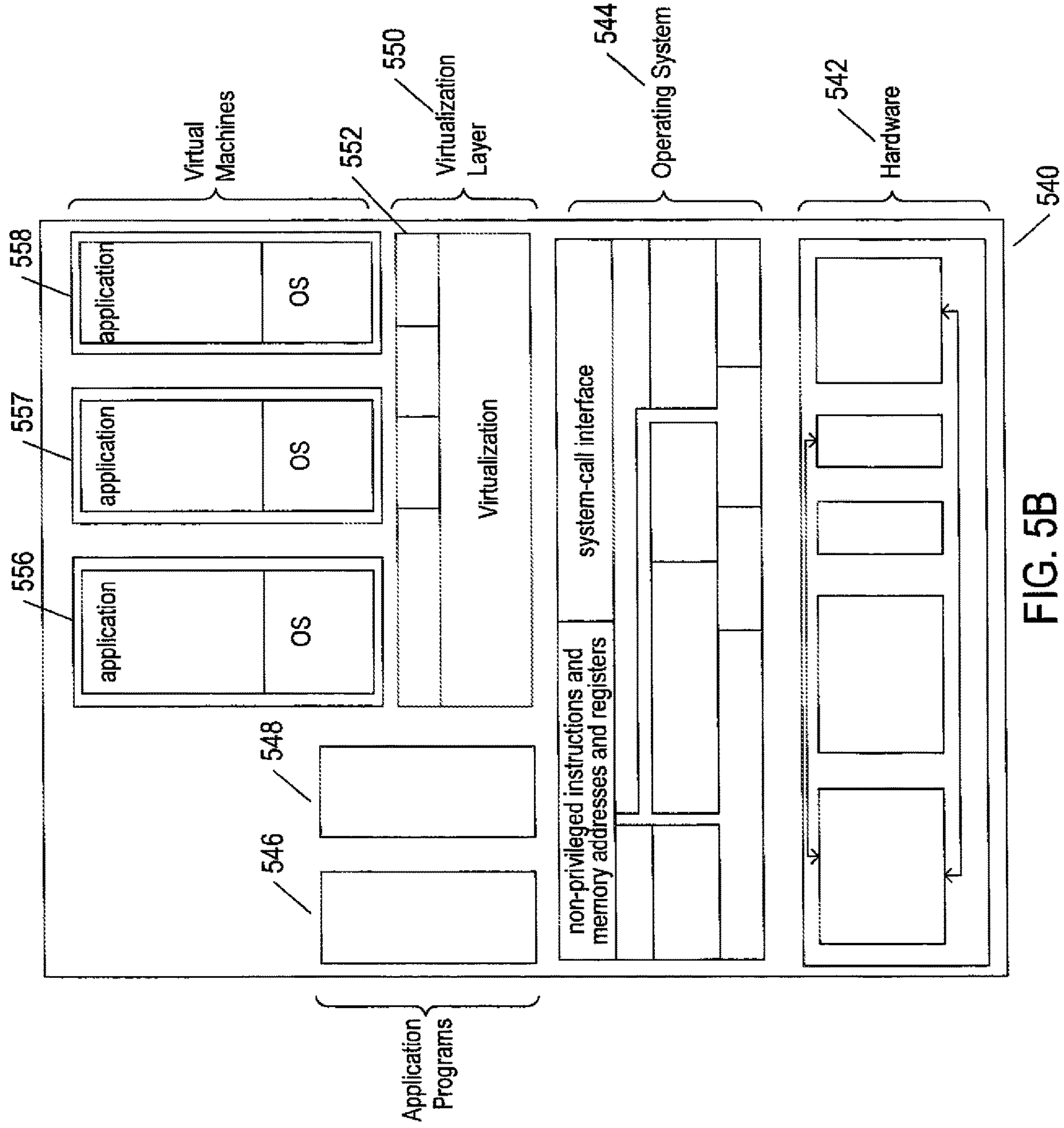

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 513 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 513, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
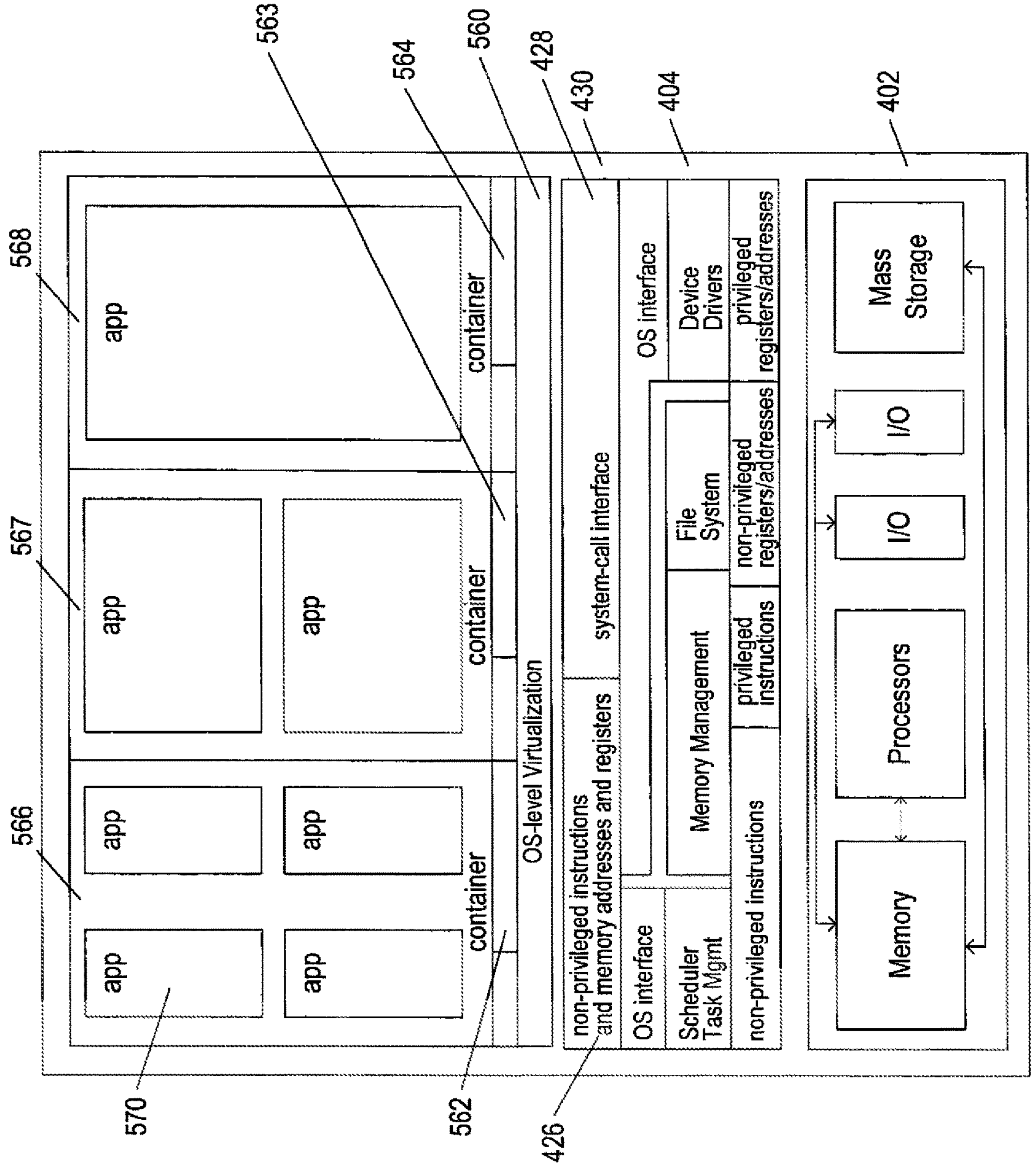

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
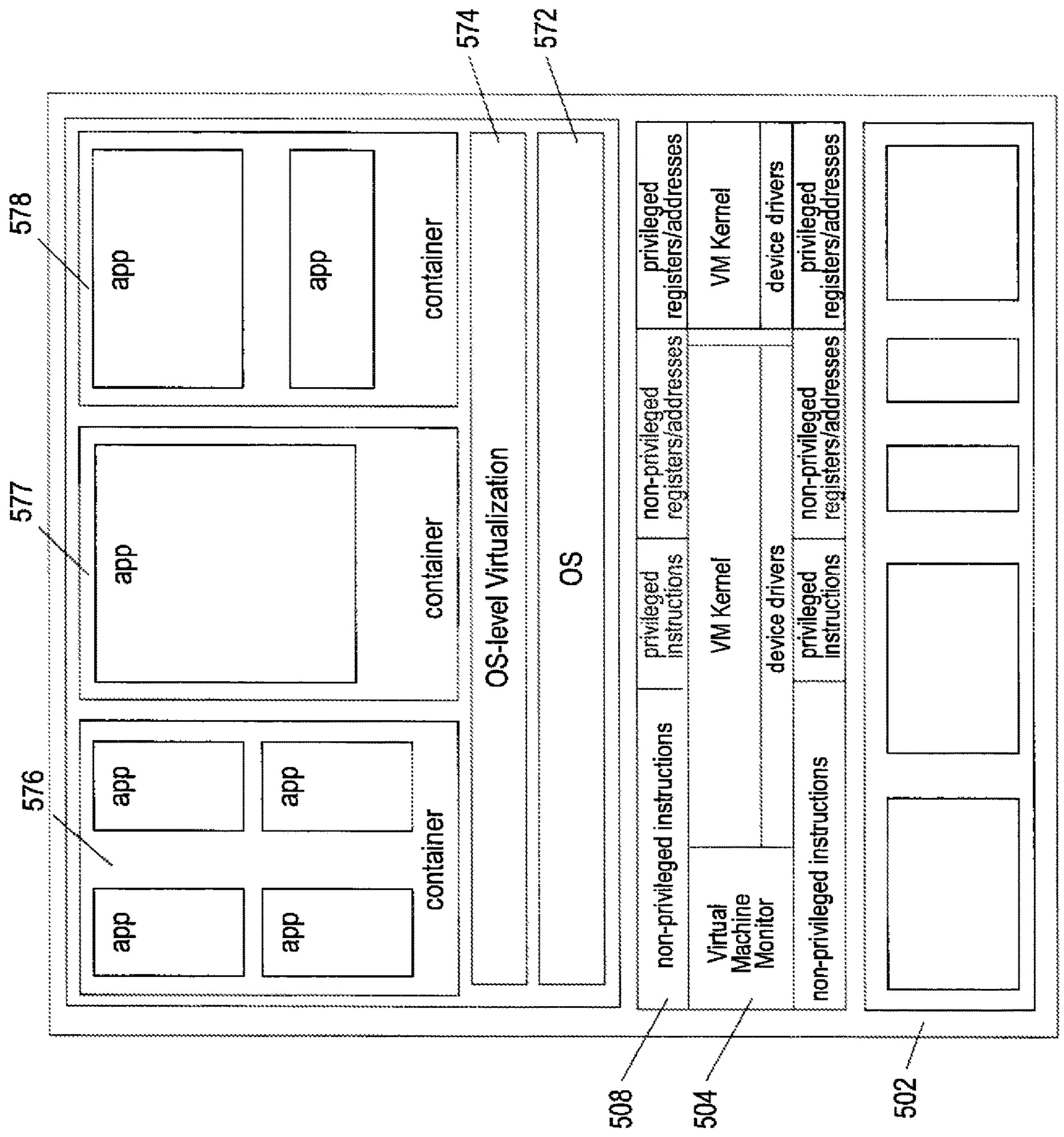

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
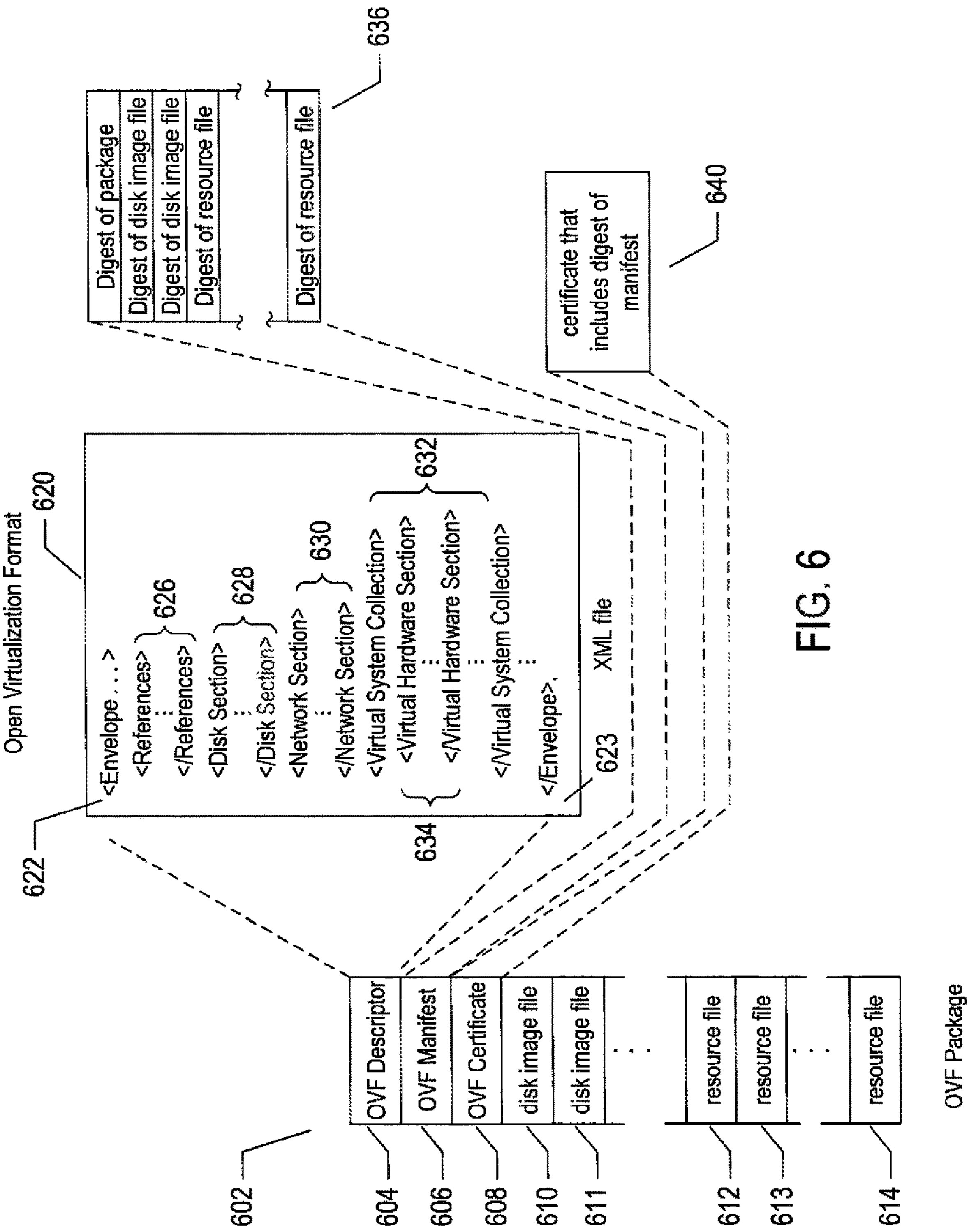
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
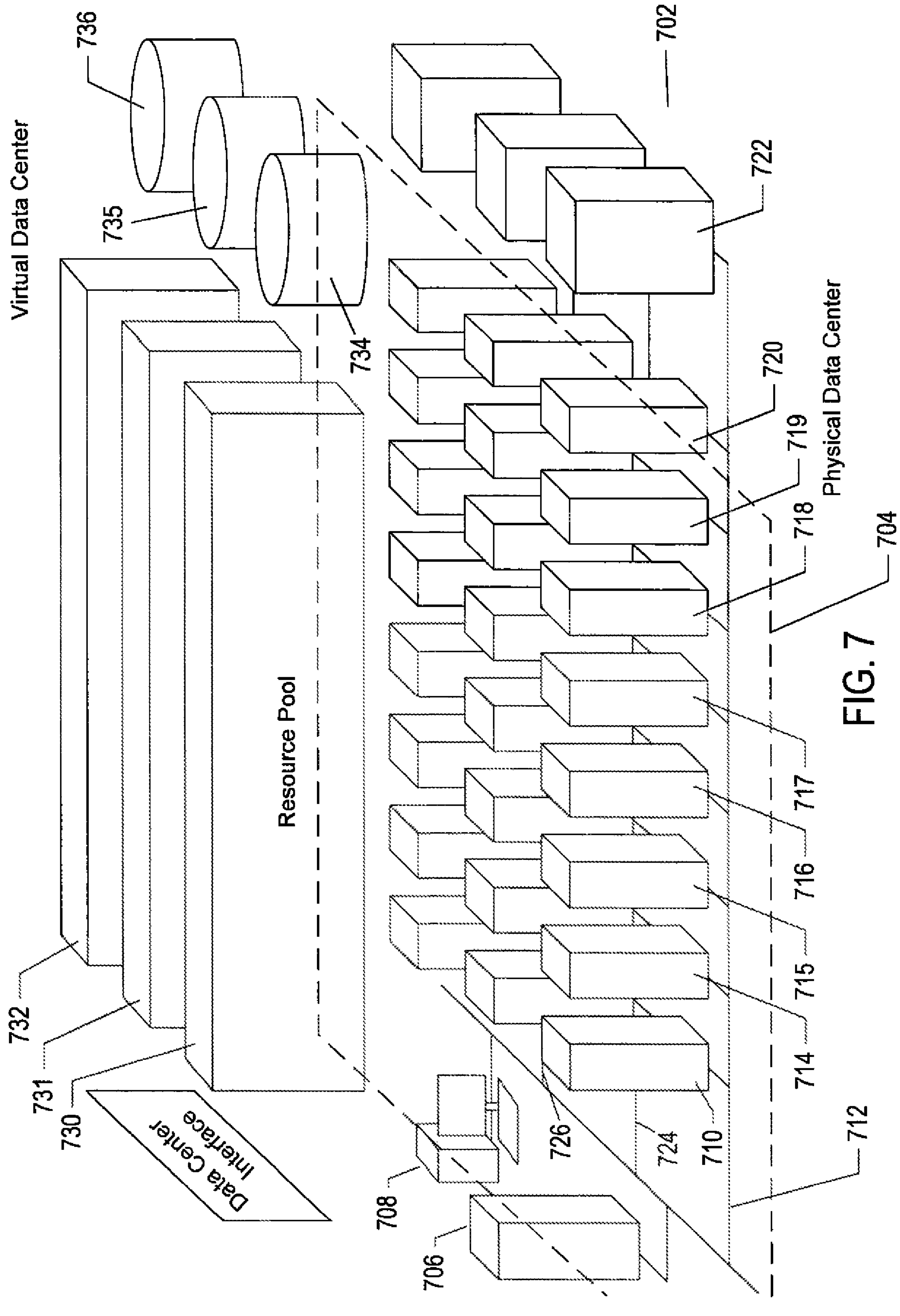
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
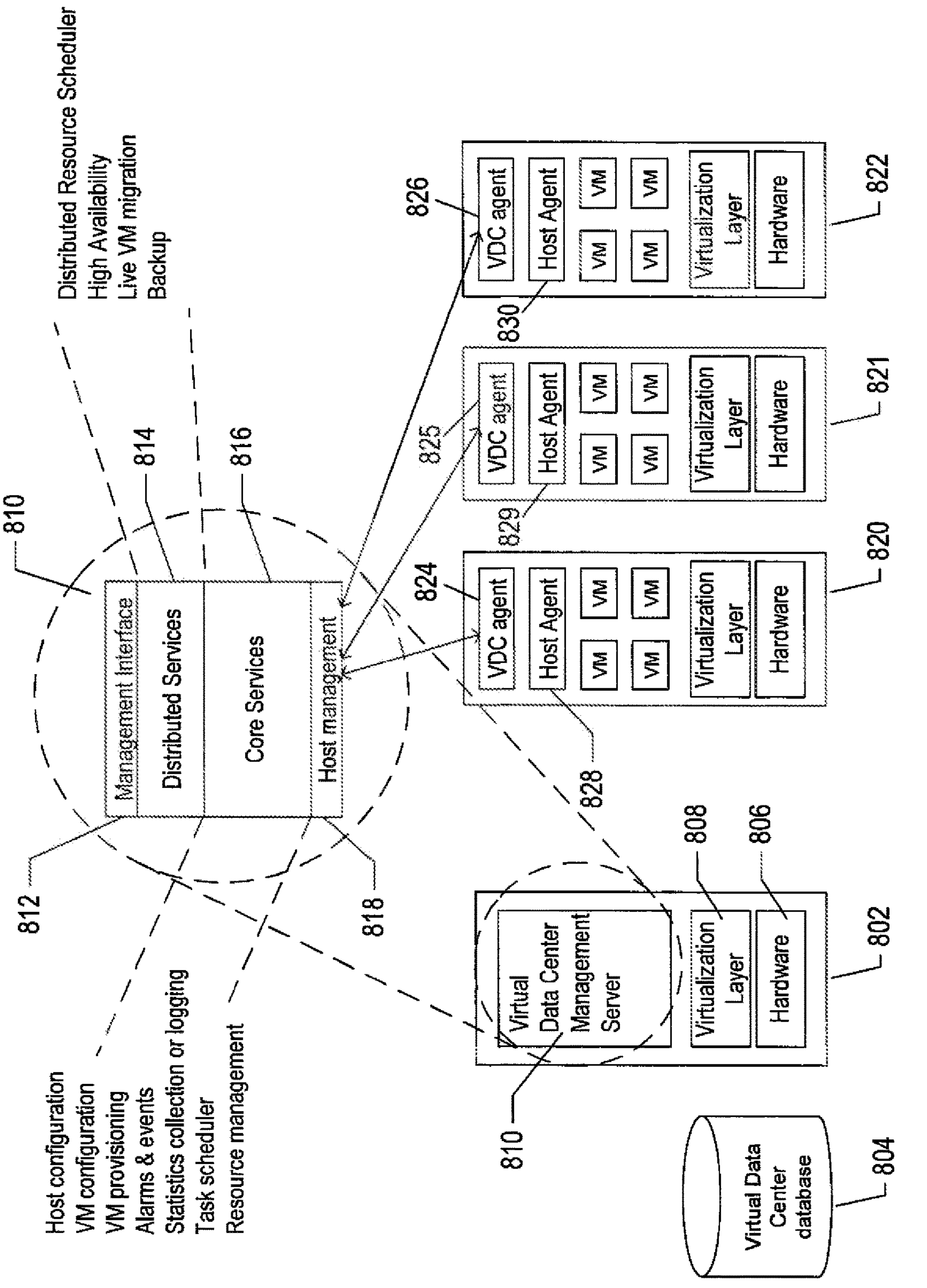
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
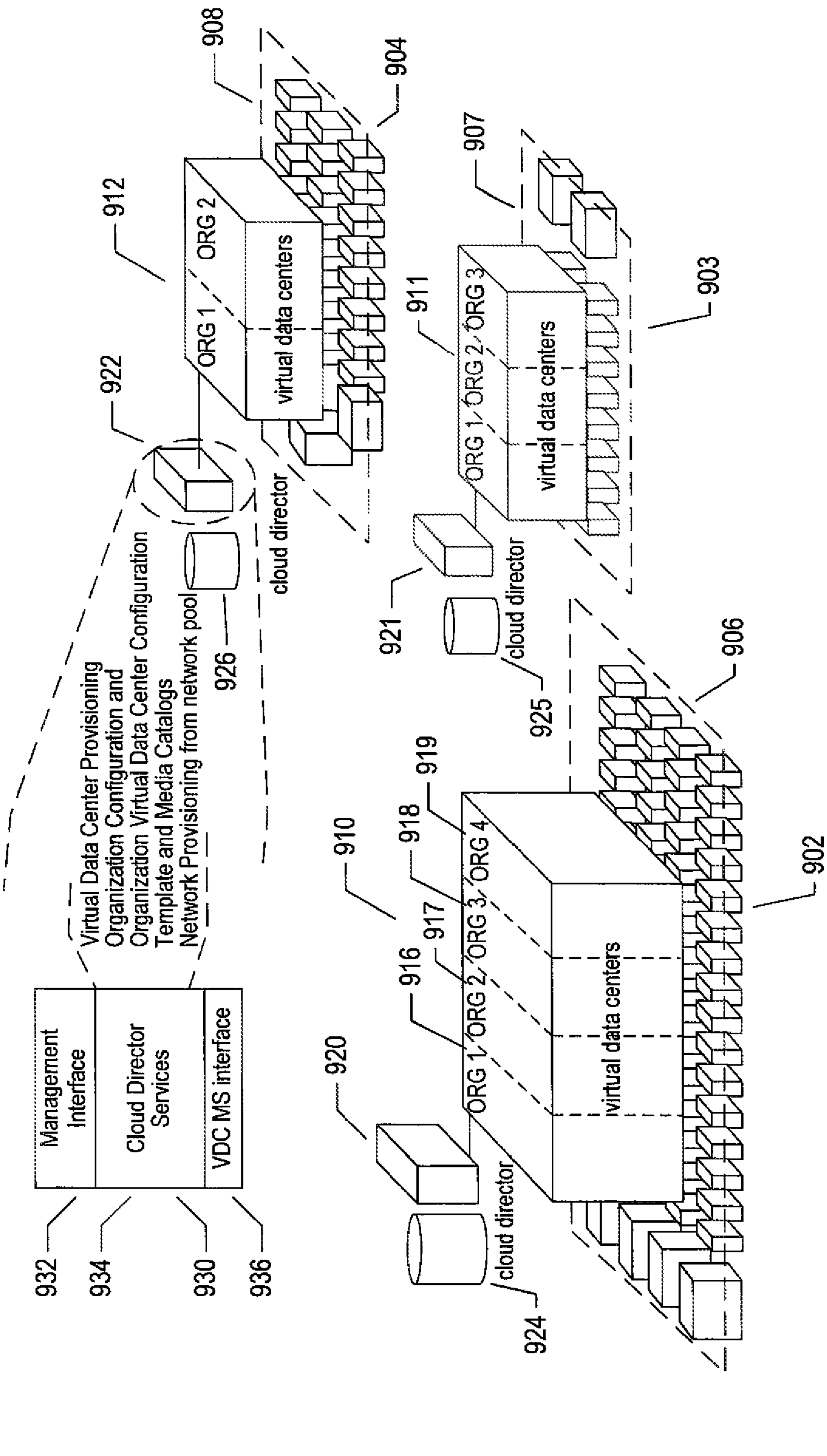
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
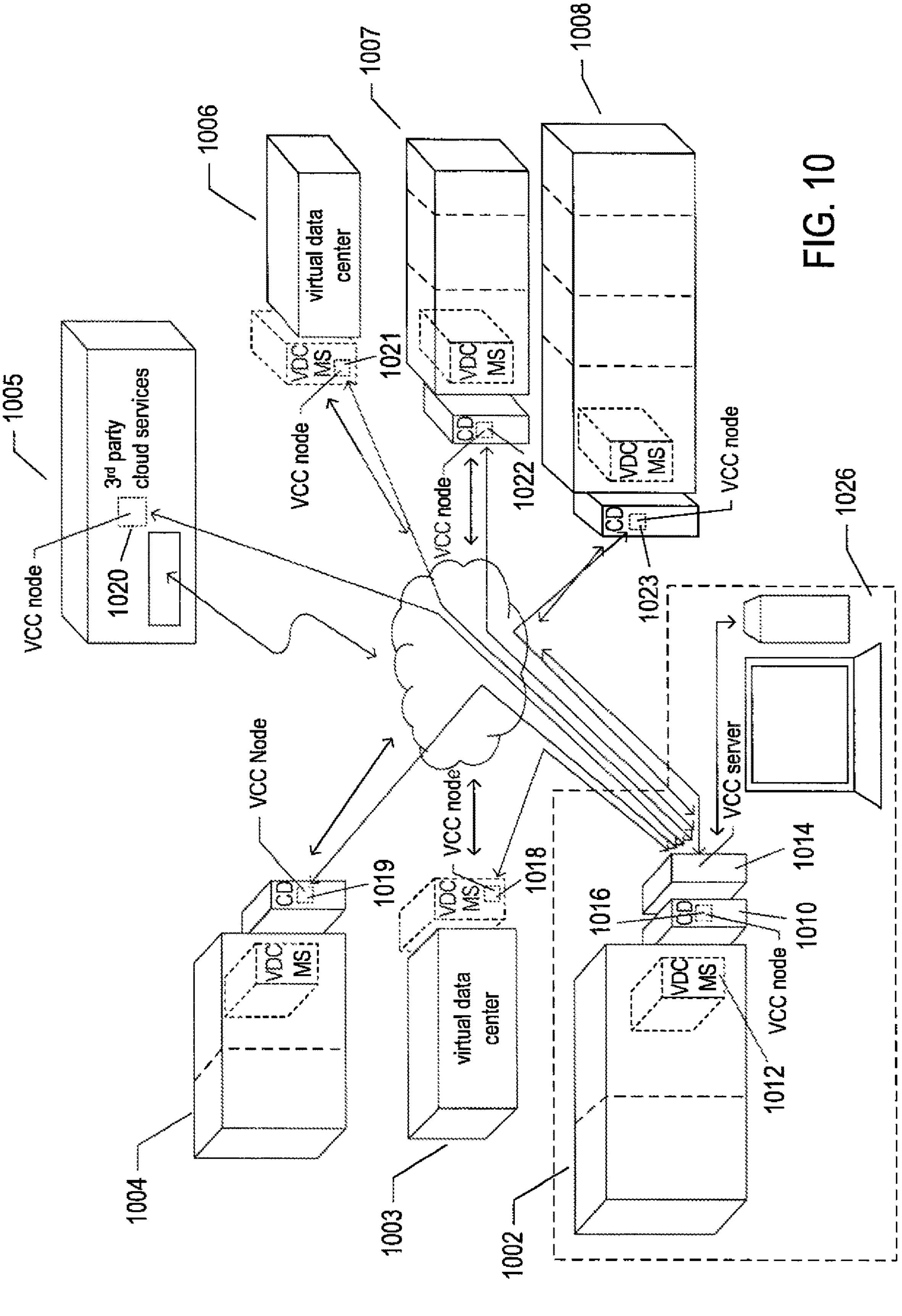
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Decision Trees

Figure 11A:
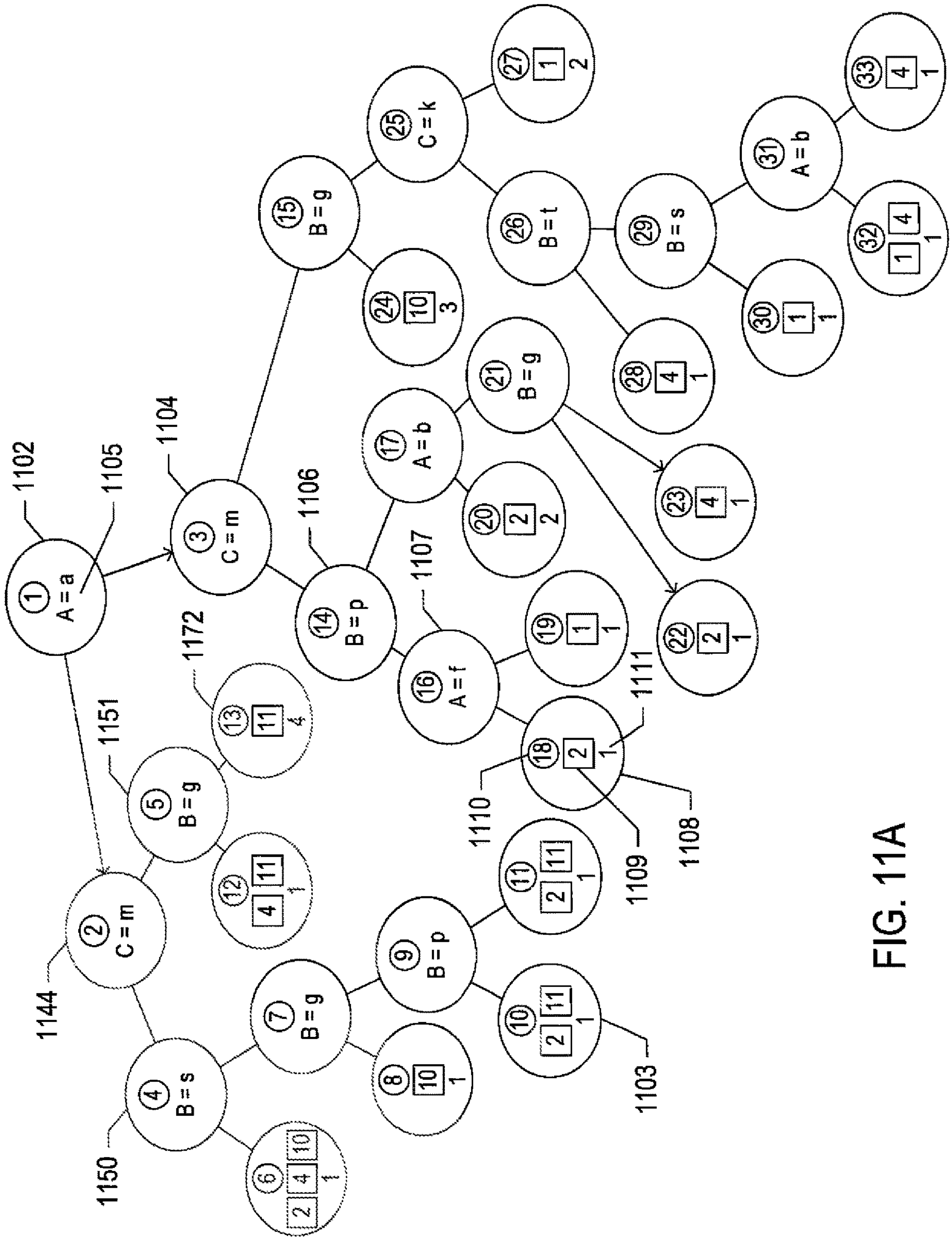

There are many different possible machine-learning methods and technologies that may be employed as a basis for a machine-learning-based classifier. These include automated regression-based classification systems, neural-network classification systems, random forests of decision trees, and a variety of other machine-learning methods and technologies. In the discussion that follows, a decision tree is used as a machine-learning-based classifier, or value generator. FIG. 11A-F illustrate construction of a decision tree. FIG. 11A shows the complete decision tree generated from a small dataset, described below. This is an example of a binary decision tree in which each node has two children. Other types of decision trees feature nodes with more than two children. The first node 1102 in the decision tree is referred to as the "root node." Terminal nodes in the decision tree, such as terminal node 1103, are referred to as "leaf nodes." All other nodes of the decision tree, such as node 1104, are referred to as "internal modes." The root node and internal nodes each have two children while the leaf nodes have no children. The root nodes and internal modes are each associated with a rule, such as the rule "A=a" 1105 in root node 1102. A set of attribute values for a set of attributes is input to the root node and used to traverse the decision tree to a leaf node. The leaf node contains a label value.

In order to illustrate a traversal of the decision tree shown in FIG. 11A, an example set of three attribute values "f," "p," "m" for three attributes represented by upper-case letters "A," "B," and "C" is used. In this example, the three attributes "A," "B," and "C" are categorical attributes, meaning that each of the attributes is associated with a set of unordered attribute values, in this example represented by lower-case characters. Non-categorical attributes may be associated with integer or real values or with ordered sets of values. For categorical values, each of the rules shown in the decision-tree nodes has the form of an attribute, an equals operator "=," and an attribute value. When the attribute values input to a node includes the attribute value specified in the rule, a traversal of the decision tree continues with the left-hand child node. Otherwise, the traversal continues with the right-hand child node. For non-categorical attributes, rules may include additional comparison operators, such as "≤," "≥," "<," and ">." Applying the rule "A=a" in the root node to the set of attribute values {A=f, B=p, and C=m} returns the Boolean value FALSE since the value of attribute A in the input attribute values is not "m." Therefore, the traversal of the decision tree continues with the right-hand child node 1104. When the rule "C=m" in this node is applied to the attribute values {A=f, B=p, and C=m}, the Boolean value TRUE is returned, since the value of attribute C in the VM characterization is "m." Therefore, traversal of the decision tree continues with node 1106. Application of the rule in node 1106 also returns the Boolean value TRUE, so traversal continues with node 1107. Application of the rule in node 1107 also returns the Boolean value TRUE, in which case traversal ends with leaf node 1108. The numeric value "2" in the small square box 1109 in this node indicates that the label value that should be associated with the input set of attribute values {A=f, B=p, and C=m} is "2." As further discussed below, the numeric values in square boxes in a leaf node represent the label values historically associated with attribute-value sets that, when used to traverse the decision tree, terminate at the leaf node. The numeric values in circles within a decision-tree node, such as the value "18" within circle 1110 in node 1108, indicate the set of data entries corresponding to the node, as further discussed below. The numeric value at the bottom of each node, such as the numeric value "1" 1111 at the bottom of node 1108, indicates the number of different attribute-value sets represented by the node.

FIG. 11B shows two tables illustrating the meaning of the label and attribute values in the example dataset used to generate the decision tree shown in FIG. 11A. Table 1114 shows 12 different label values corresponding to different combinations of values of two attributes D and E. The numeric identifiers for the different label values are shown in a first column 1115, the values of attribute D corresponding to the label values are shown in column 1116, and the values of attribute E corresponding to the label values are shown in column 1117. Thus, for example, the label value "4" 1118 corresponds to the value of attribute D "2" and the value of attribute E "4 GB," as indicated by table entry 1119. In this example, the label values might indicate different sizes of computers, attribute D indicates the number of processors, and attribute E indicates the size of memory. Input values for attributes A, B, and C may indicate various workload characteristics. Thus, inputting a workload characterization to the decision tree produces a label value that indicates the size of computer needed for the workload.

Table 1120 shows the different attribute values for each of the three attributes A, B, and C. Thus, according to the first three entries 1121 in table 1120, the attribute A can have one of the three attribute values {a, b, f}. Table 1122 shows the dataset used to generate the decision tree shown in FIG. 11A. Column 1123 in table 1122 represents a number identifier, or index, of each data entry, the next three columns 1124-1126 represent the attribute values for the three attributes A. B, and C, and the final column 1127 indicates the particular computer size that was needed for handling the workload described by the values of attributes A, B, and C. Thus, entry 1128 indicates that a VM characterized by the attribute values {a, g, k} needed a computer size 4.

Construction of the decision tree begins with table 1122. A rule needs to be selected for the root node. Since all of the attributes are categorical, in this example, there are only 10 possible rules of the form attribute/=/attribute-value, corresponding to the 10 entries in table 1120, for the root-node rule. In order to select one of these 10 possible rules, the entropy gain obtained by partitioning the dataset 1122 into two datasets using the rule is computed for each rule. At the top of FIG. 11C, table 1130 shows the computed entropy gains for each possible rule. The smaller the value of an entropy gain, the better the rule. Thus, the computed entropy-gain values indicate that rule "A=a" provides a best entropy gain, as indicated by the star 1131 next to the entry corresponding to this rule. Expression 1132 shows how the entropy for a dataset is computed. The lowest possible entropy value for a dataset is 0, when all of the label values for the entries in the dataset are identical. The entropy gain obtained by applying a rule to partition a dataset into two child datasets is indicated by expression 1134. The entropy gain is the entropy of the dataset 1136 minus the weighted sum of the entropies of the child datasets 1137-1138, where the weight is computed according to expression 1139. Since rule "A=a" is selected for the root node based on exhibiting the lowest and most favorable entry gain for all possible rules, the original dataset 1122 in FIG. 11B is divided into the two child datasets 1140 and 1141. Note these two datasets are associated with the circled numerical values "2" 1142 and "3" 1143. These are the circled dataset values shown for nodes 1104 and 1113 in FIG. 11A. Thus, each node is associated with a dataset and the child nodes of an internal node are associated with datasets obtained by partitioning the dataset associated with the internal node using the rule included in the internal node. Those entries of a dataset for which the rule returns Boolean value TRUE are included in a left-hand child dataset and those entries in the dataset for which the rule returns a Boolean value FALSE are included in a right-hand child dataset. Table 1145 shows the entropy gains calculated for seven possible rules that can be applied to dataset 1140 and thus constitute the possible rules for node 1113 in the decision tree shown in FIG. 11A. The most desirable entropy gain is exhibited by the rule "C=m," as indicated by star 1146. Thus, the rule "C=m" is included in decision-tree node 1148, in FIG. 11 A, and dataset 1140 is then partitioned by this rule into datasets 1148 and 1149, shown at the top of FIG. 11D. These two datasets are then associated with the child nodes of node 1113, node 1150 and node 1151 in FIG. 11A. FIGS. 11 C-F show all of the datasets associated with the nodes in the decision tree of FIG. 11A as well as tables of calculated entropy-gain values used to select rules for certain of the internal nodes.

There are many different methods for generating decision trees from datasets. These methods include gradient tree boosting methods. The current disclosed methods and systems can employ any of many different decision-tree-generation methods to generate decision trees from automatically generated training data, as discussed below.

Rule Induction

Figure 12B:
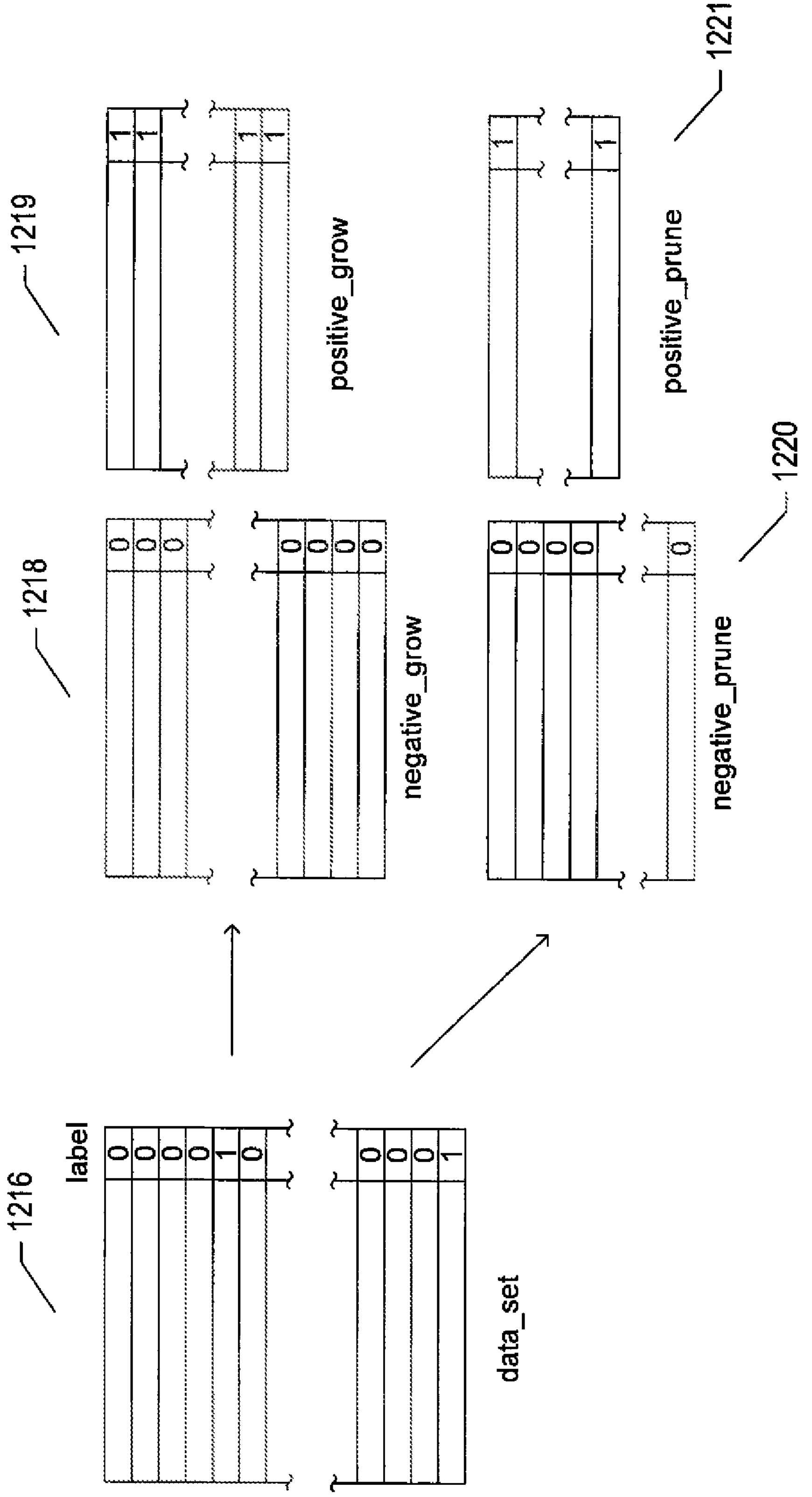

FIGS. 12A-E illustrate an example of generating a simple rule from a dataset of entries including attribute values and a label value. The simple rule generated in this example illustrates classification rules. FIG. 12A shows a small dataset 1202. Each row in this tabular dataset, such as the first row 1204, is a representation of the attribute values that characterize an entity along with a label value that represents the class to which the entity belongs. The attributes are represented by capital letters 1206-1213. Each attribute has a data type that defines the types of values that the attribute may represent. The values for attributes A, C, D, and H are integer values. The values for attributes B, F, and G are discrete values represented by lower-case letters. The values for attribute E are floating-point values. A special attribute 1214, "Label," represents the label assigned to the entity represented by a row in the table.

FIG. 12B illustrates a first step taken in certain automated rule-generation procedures. The labeled dataset 1216 is partitioned into two pairs of datasets: (1) a grow pair of datasets 1218-1219; and (2) a prune pair of datasets 1220-1221. The grow pair of datasets are used to generate a rule consisting of multiple conditions joined together by Boolean AND operations and the prune pair of datasets 1220-1221 are used to prune the initially generated rule, as further discussed below. Each pair of datasets consists of a negative dataset (1218 and 1220) containing negatively labeled entries and a positive dataset (1219 and 1221) containing positively labeled entries. As shown in FIG. 12C, dataset 1202 is randomly partitioned into the two pairs of the datasets, as indicated by the characters "G" and "Pr" in a final column 1222, and the characters "N" and "P" in a penultimate column 1224 indicate the positive or negative labeling of each of the entries. Note that, in the current discussion, a classification rule is intended to select positively labeled entries from a dataset with high confidence. When a classification rule selects the positively labeled entries from a dataset with high confidence, it can be used to partition the dataset into a corresponding positive dataset and negative dataset pair.

FIG. 12D illustrates a rule-generation process. Initially, a generated classification rule Rule contains no conditions 1226. Next, a large set of candidate conditions 1228 is considered for inclusion as the first condition in the generated classification rule Rule. The conditions have the form of an attribute followed by a comparison operator and an attribute value. For example, the first candidate condition 1230 is: "A>=10." This condition would evaluate to TRUE for entries containing values for the attribute A greater than or equal to 10 and would evaluate to FALSE for values of the attribute A less than 10. Comparison operators ">=" and "<=" are used in conditions that include attributes with integer and floating-point values while the comparison operator "=" is used for attributes with discrete values, such as attributes that may have a value selected from a generally unordered set of values. Each candidate condition is then evaluated by applying a rule consisting of the candidate condition to the dataset 1202. Application of a next, new rule to the dataset generates two values: (1) $p_n$, the number of entries in the dataset identified as positive by the new rule; and (2) $n_n$, the number of entries in the dataset identified as negative by the new rule. The method also considers similar values for the current rule or, in other words, the rule to which an additional condition has been added to generate the new rule; (1) $p_c$, the number of entries in the dataset identified by the current rule as being positive; and (2) $n_c$, the number of entries in the dataset identified by the current rule as being negative. Initially, the current rule is the empty rule 1226 and the new rule is a rule with one condition selected from the candidate conditions 1228. The empty rule 1226, when applied to the dataset, returns a number of entries equal to the total number of traces in the dataset. The results returned by application of each new rule consisting of one of the candidate conditions are used to compute an information gain for the new rule according to expression 1232. The computed information gains for all of the candidate rules are provided in column 1234. Then, the candidate condition associated with the largest information gain is selected as the first condition for the generated rule. In this example, the highest information gain 1236 is associated with the candidate condition "G==a." Thus, the candidate condition "G==a" is selected as the first condition to include in the nascent rule Rule 1238. Next, a set of second candidate conditions are added to the nascent rule 1238 to generate a second set of candidate rules for evaluation 1240. This evaluation involves applying each of these new candidate rules to the dataset and determining the information gain provided by each of the new candidate rules. In this example, the highest information gain 1242 is associated with the candidate rule "G==a AND C>=10." Therefore, the nascent classification rule now becomes "G==a AND C>=10" 1213. This process continues until application of the nascent classification rule to the dataset selects only positively labeled entries, as is the case for the classification rule "G==a AND C>=10."

FIG. 12E illustrates the generation of the rule "G==a AND C>=10" discussed above with reference to FIG. 12D.

The grow dataset 1250 is shown at the left in FIG. 12E. Application of the initial nascent rule containing only the condition "G==a" to the grow dataset produces result dataset 1252. The result dataset 1252 contains all of the positively labeled entries in the grow dataset 1250 but also includes two negatively labeled entries 1254-1255. Application of the rule "G==a AND C>=10" produces result dataset 1260, which contains only the positively labeled entries of the grow dataset 1250. Thus, no further conditions need to be added to rule "G==a AND C>=10" because it selects no negatively labeled entries from the grow dataset. In many cases, a rule may not select all of the positively labeled entries from the grow dataset, in which case additional rules need to be generated in order to fully partition the dataset into positively and negatively labeled entries.

Various different metrics can be computed for application of a classification rule to a dataset. Expressions for certain of these metrics are shown, in FIG. 12E, below the grow dataset 1250. In these expressions, p represents the number of positively labeled entries selected by the classification rule and n represents the number of negatively labeled entries selected by the classification rule. The coverage metric 1262 is the ratio of p to the total number of positively labeled traces in the dataset. Thus, a coverage metric equal to 1.0 indicates that application of a classification rule selects all of the positively labeled entries in a dataset, coverage-metric values less than 1.0 indicate that application of the classification rule selects fewer than all of the positively labeled entries in the dataset, and a coverage metric equal to 0 indicates that application of the classification rule selects none of the positively labeled entries the dataset. The confidence metric 1264 is the ratio of p to the total number of entries selected by the classification rule, n+p. A confidence metric of 1.0 indicates that the classification rule selected no negatively labeled entries and a confidence metric of 0.0 indicates that the classification rule selects no positively labeled entries. The accuracy metric 1266 is the ratio of p+the number of negatively labeled entries in the dataset−n to the total number of entries in the dataset. When the accuracy metric has a value 1.0, the classification rule selects exactly all of the positively labeled entries in the dataset and no negatively labeled entries in the dataset and when the accuracy metric has a value 0, the classification rule selects no positively labeled entries from the dataset and all of the negatively labeled entries from the dataset. The values for these three metrics are shown for the two result datasets 1252 and 1260 in FIG. 12E. Both result datasets have coverage metrics equal to 1.0. Result dataset 1252 is associated with confidence and accuracy metrics less than 1.0 while result dataset 1260 is associated with confidence and accuracy metrics both equal to 1.0. As discussed above, simple classification rules sought to be generated by the currently disclosed methods and systems need not provide comprehensive explanations for the positively and negatively labeled entries in a dataset. Thus, the accuracy associated with these simple classification rules is unimportant. However, the confidence associated with the desirable classification rules needs to be high because, when the classification rule is applied to a dataset and returns more than a threshold number of entries, it is assumed that the selected entries are explained by the classification rule and that the classification rule therefore provides an indication of problematic or failing distributed-application components. The coverage associated with the desirable classification rules is less important than the confidence associated with the desirable classification rules, but also needs to be sufficiently large for the classification rule to represent a useful generality.

Next, one of many rule-generation methods that can be used to generate classification rules for partitioning datasets is described in a series of control-flow diagrams provided in FIGS. 13-18C. Rule-generation methods include the Reduced Error Pruning ("REP"), Incremental Reduced Error Pruning ("IREP"), and Repeated Incremental Pruning to Produce Error Reduction ("RIPPER") methods. The rule-generation method described with reference to FIGS. 13-18C is based on a version of the RIPPER method. There are many additional types of rule-generation methods that can be used to generate the simple classification rules that are accumulated in a logical toolbox by the disclosed methods and systems.

Figure 13:
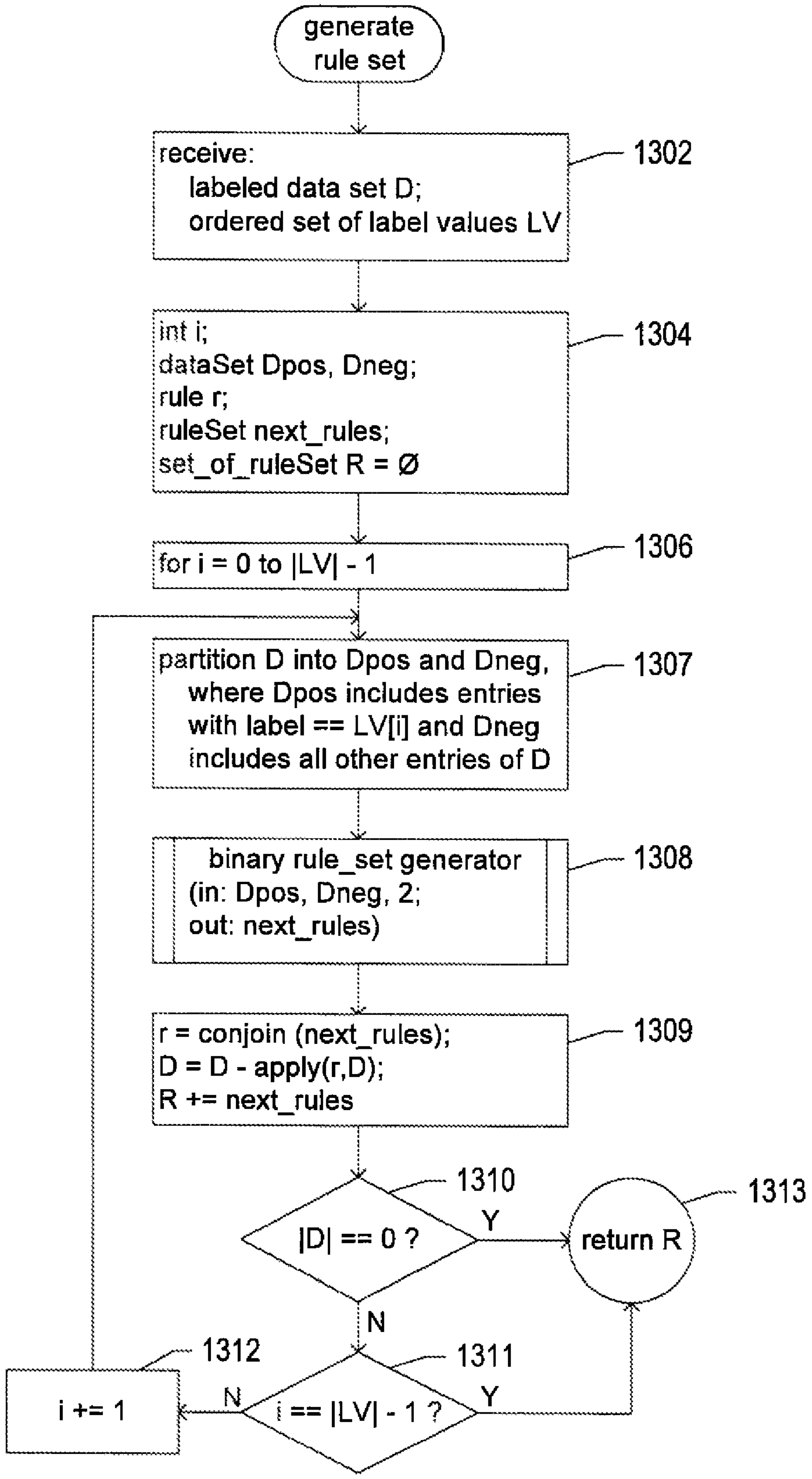
FIG. 13 provides a highest-level control-flow diagram for a routine "generate rule set" that generates a set of rules to explain different label values within a dataset.

FIG. 13 provides a highest-level control-flow diagram for a routine "generate rule set" that generates a set of rules to explain different label values within a dataset. Each of these one or more labels is then used to generate a rule set that partitions the dataset into multiple partitions that each corresponds to a different label value. In many cases, as in the example discussed above with reference to FIGS. 12A-E, a label has only two possible label values, one indicating positive entries and the other indicating negative entries. These may be referred to as binary labels. However, a label may alternatively be associated with more than two label values. Such labels are referred to as "multi-valued labels." The routine "generate rule set," illustrated in FIG. 13, is a generic rule-generation routine that can be used to generate a rule set for either a particular binary label associated with a dataset or for a multi-valued label associated with a dataset. The routine "generate rule set" describes a generalize rule-generation method that can be used to generate classification rules for any of many different types of labeled datasets, including datasets that contain entries other than representations.

In step 1302, the routine "generate rule set" receives a labeled dataset D and an ordered set of label values LV for the label attribute of the labeled dataset D. The routine "generate rule set" partitions the labeled dataset D with respect to a single label with label values selected from the set LV. The routine "generate rule set" generates a rule set for partitioning based on either a binary or a multi-valued label.

In step 1304, a set of local variables is declared. The local variables include: (1) i, a loop variable; (2) Dpos and Dneg, dataset variables; (3) r, a local variable that contains a rule; (4) next_rules, a local variable contains a set of rules; and (5) R, a local variable that contains a set of rule sets and that is initialized to the empty set. In the for-loop of steps 1306-1312, a set of rules is generated for each label value in the ordered set of label values LV. The set of label values LV is ordered in increasing order of the number of entries in the received dataset D labeled with the label values. In step 1707, the received dataset D is partitioned by placing the entries associated with the currently considered label value LV[i] into Dpos and placing the entries associated with all other label values into Dneg. In step 1308, a routine "binary rule-set generator" is called to generate a set of rules. output to local variable next_rules, that partitions dataset D into Dpos and Dneg. In step 1309, the set of rules returned by the routine "binary rule-set generator" is joined together using AND operators and placed, as a single rule, into the local variable r. The set of entries in dataset D selected by application of rule r is then removed from dataset D. The set of rules next_rules is then added to the set of rule sets R.

When the number of entries in dataset D is now equal to 0, as determined in step 1310, the set of rule sets R is returned, in step 1313. Otherwise, when loop variable i is equal to one less than the number of label values in the set of label values LV, as determined in step 1412, the set of rule sets R is returned in step 1313. Otherwise, control flows back to step 1307 for a next iteration of the for-loop of steps 1306-1311 after incrementing the loop variable i in step 1312. For a binary label, the for-loop of steps 1306-1311 iterates only once. The returned set of rule sets R can be used to partition a dataset into multiple partitions, one for each possible label value. In certain of the control-flow diagrams used to illustrate the rule-generation method, it may be assumed that the dataset D contains examples of entries associated with all of the different possible label values.

Figure 14:
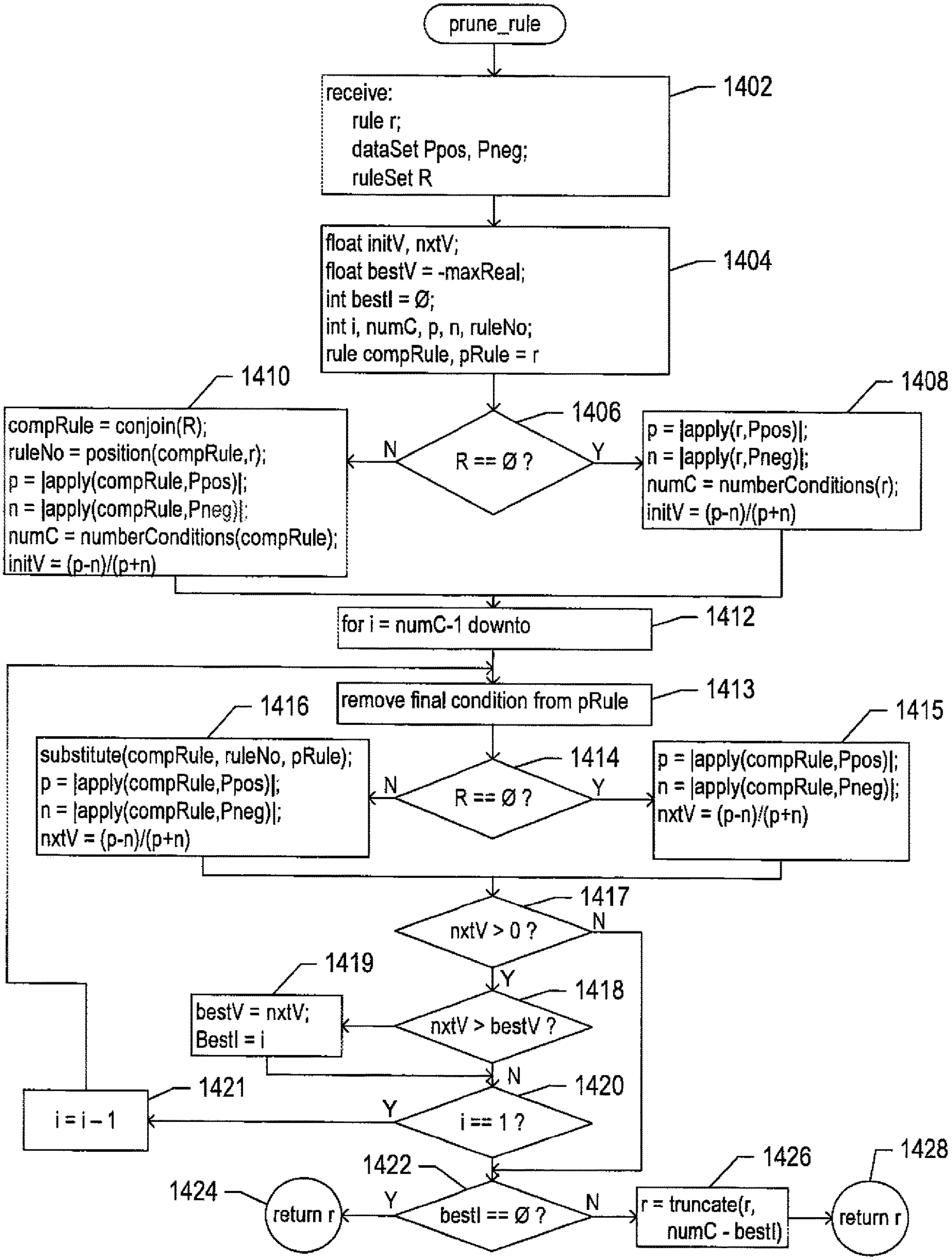
FIG. 14 provides a control-flow diagram for a routine "prune_rule," called by the routine "binary rule-set generator," called in step 1308 of FIG. 13.

FIG. 14 provides a control-flow diagram for a routine "prune_rule," called by the routine "binary rule-set generator," called in step 1308 of FIG. 13. The routine "prune_rule" removes terminal conditions from a newly generated rule in order to simplify the rule. In step 1402, the routine "prune_rule" receives a rule r, two prune datasets Ppos and Pneg, and a rule set R as arguments. In step 1404, the routine "prune_rule" declares the following local variables: (1) inirV and nxtV, two floating-point variables; (2) bestV, a floating-point variable initialized to a large negative real number, (3) besII, an integer variable initialized to an invalid integer value; (4) integer variables i, numC, p, n, and ruleNo; and (5) compRule and pRule, two rule variables with pRule initialized to contain a copy of received rule r. When the set of rules R is empty, as determined in step 1406, then, in step 1408, p is set to the number of dataset entries selected by applying rule r to dataset Ppos, n is sent to the number of dataset entries selected by applying rule r to dataset Pneg, numC is set to the number of conditions in rule r, and initV is set to a value computed as the ratio of p−n to p+n. The computed value initV is the ratio of the difference in the number of selected positive and selected negative rules to the total number of selected rules. Clearly, the higher this computed value, the more desirable the rule. Otherwise, the set of rules R is not empty, as determined in step 1406, then, in step 1410, local variable compRule is set to a rule obtained by joining all of the rules in rule set R by AND operators, local variable ruleNo is set to an integer indicating the position of rule r in rule compRule, p is set to the number of dataset entries selected by applying rule compRule to dataset Ppos, n is sent to the number of dataset entries selected by applying rule compRule to dataset Pneg, numC is set to the number of conditions in rule compRule, and initV is set to a value computed as the ratio of p−n to p+n. Then, in the for-loop of steps 1412-1421, the terminal conditions in either rule r or rule compRule are considered. In step 1413, the terminal condition is removed from rule pRule. When the rule set R is empty, as determined in step 1414, a new value nxtV is computed for modified rule pRule in step 1415, similarly to the computation of the value initV in step 1408. Otherwise, in step 1416, a new value nxtV is computed for the rule compRule in which modified pRule is substituted for rule r. When the new value nxtV is less than 0, the for-loop of steps 1412-1421 is terminated, with control flowing to step 1422, discussed below. When nxtV is greater than bestV, as determined in step 1418, bestV is set to nxtV and bestI is set to the current value of loop variable i, in step 1419. The variable bestI is used to keep track of the condition representing the maximum value of the metric nxtV. When loop variable i is equal to the 1, as determined in step 1420, the for-loop of steps 1412-1421 terminates. Otherwise, loop variable i is incremented, in step 1421, and control then flows to step 1413 for an additional iteration of the for-loop of steps 1412-1421. Following termination of the for-loop of steps 1412-1421, when bestI has been set to a value in step 1419, then, in step 1426, rule r is truncated be removing terminal conditions starting from the condition indicated by numC−bestI, and the truncated rule r is returned. Otherwise, received rule r is returned, in step 1424. The routine "prune_rule" thus removes terminal conditions to a point where the computed value nxtV is maximized.

Figure 15:
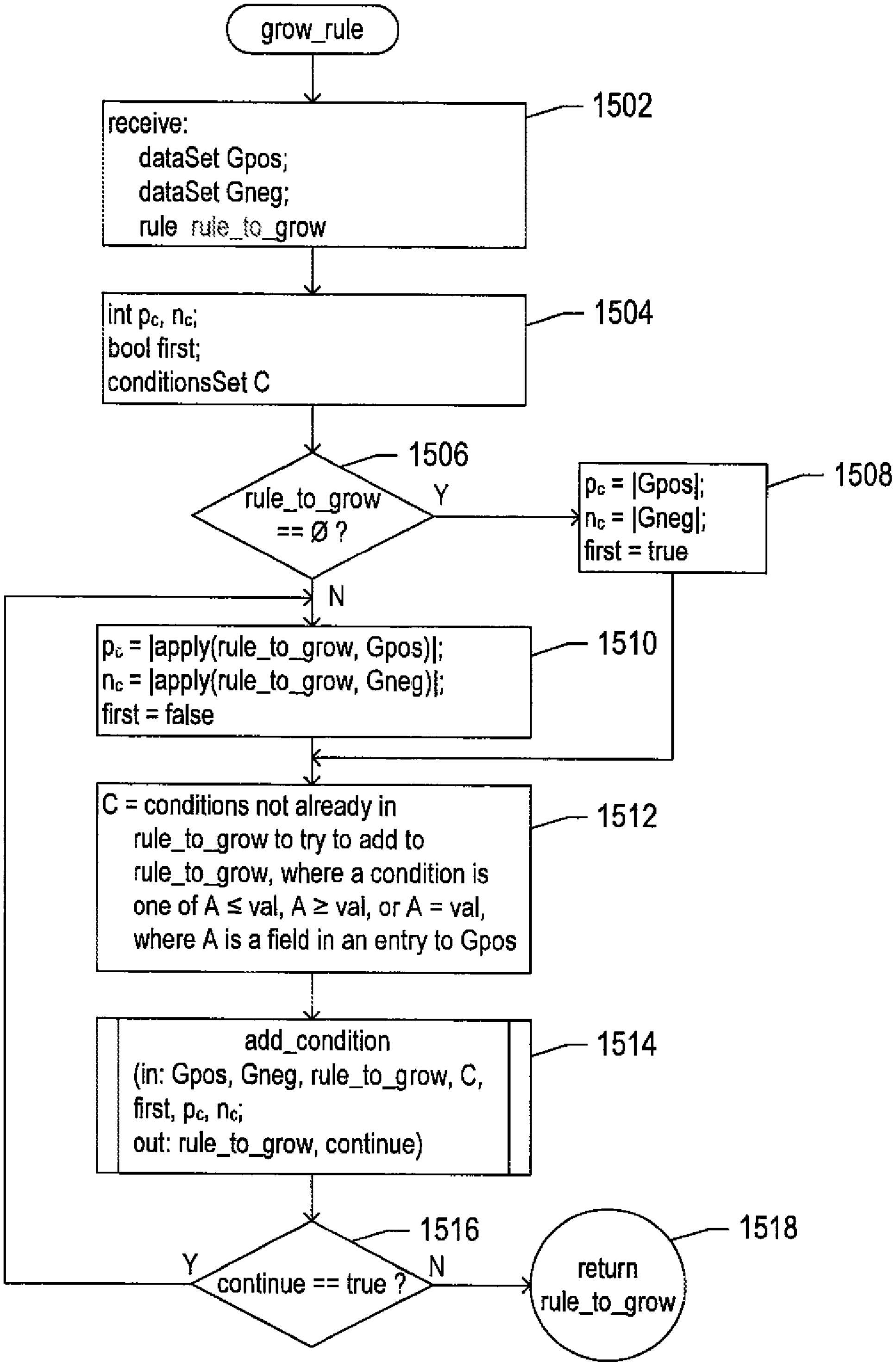
FIG. 15 provides a control-flow diagram for a routine "grow_rule," called by the routine "binary rule-set generator," discussed below with reference to FIGS. 18A-C.

FIG. 15 provides a control-flow diagram for a routine "grow_rule," called by the routine "binary rule-set generator," discussed below with reference to FIGS. 18A-C. The routine "grow_rule" generates an entirely new rule, when the argument rule_to_grow contains the empty rule, or adds conditions to a non-empty rule contained in the argument rule_to_grow. In step 1502, the routine "grow_rule" receives, as arguments, two datasets Gpos and Gneg and a rule rule_to_grow. In step 1504, local variables are declared, including local variables: (1) $p_c$ and $n_c$, integer variables that contain the number of positively and negatively labeled rules selected from datasets Gpos and Gneg by a current rule; (2) first, a Boolean variable indicating whether or not a condition is already contained in the rule rule_to_grow; and (3) a set of conditions C. In step 1506, the routine "grow_rule" determines whether or not the received rule rule_to_grow is the empty rule. If so, then, in step 1508, $p_c$ and $n_c$ are set to the number of dataset entries in Gpos and Gneg, respectively, and variable first is set to TRUE. Otherwise, in step 1510, $p_c$ is set to the number of entries selected by the rule rule_to_grow from Gpos, $n_c$ is set to the number of dataset entries selected by the rule rule_to_grow from Gneg, and variable first is set to FALSE. In step 1512, the set of conditions C is initialized to a set of conditions that are not already in rule rule_to_grow that together comprise the candidate conditions for attempting to grow the rule rule_to_grow by one additional condition. In certain implementations, all possible conditions are placed in the set of conditions C. In other implementations, a selected subset of all possible conditions is placed in C. In step 1514, a routine "add_condition" is called to add a next condition to the rule rule_to_grow. The routine "add_condition" returns a Boolean indication of whether the rule can be further grown as well as a possibly modified rule_to_grow. When the routine "add_condition" returns a Boolean value TRUE, as determined in step 1516, control flows back to step 1510 to initiate another attempt to add an additional condition to the rule rule_to_grow. Otherwise, the rule rule_to_grow is returned, in step 1518. Note that the routine "add_condition" returns a modified version of the rule rule_to_grow when the routine "add_condition" returns a Boolean value TRUE.

Figure 16:
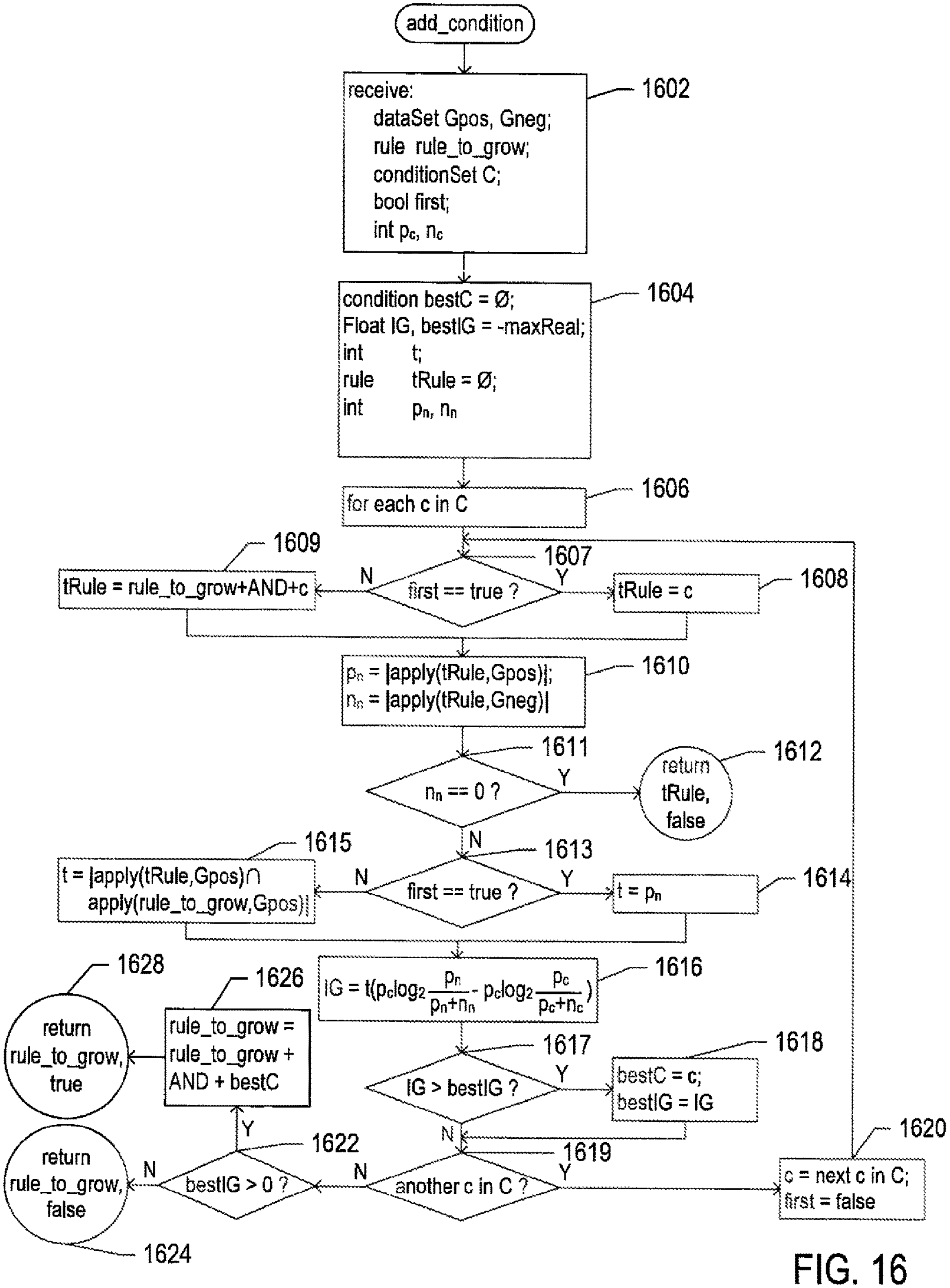
FIG. 16 provides a control-flow diagram for the routine "add_condition," called by the routine "grow_rule" in step 1514 of FIG. 15.

FIG. 16 provides a control-flow diagram for the routine "add_condition," called by the routine "grow_rule" in step 1514 of FIG. 15. In step 1602, the routine "add_condition" receives, as arguments, two datasets Gpos and Gneg, a rule rule_to_grow, a set of conditions C, a Boolean argument first, and two integer arguments $p_c$ and $n_c$. The values of these arguments are discussed above with reference to FIG. 15. In step 1604, the routine "add_condition" declares the following local variables: (1) bestC, a variable that contains a condition and that is initialized to the empty condition; (2) two floating-point variables IG and bestIG, with variable bestIG initialized to a large negative value; (3) t, and integer variable: (4) tRule, a rule variable initialized to the empty rule; and (5) $p_n$ and $n_n$, both integer variables. In the for-loop of steps 1606-1620, each candidate condition c in the set of conditions C is considered for adding to the received rule rule_to_grow. When there is no condition already in the rule rule_to_grow, as determined in step 1607, the rule tRule is set to the currently considered condition c. Otherwise, the currently considered condition c is added to tRule, in step 1609. In step 1610, $p_n$ is set to the number of dataset entries selected by applying rule tRule to dataset Gpos and $n_n$ is set to the number of entries selected by applying rule tRule to dataset Gneg. When $n_n$ is equal to 0, as determined in step 1611, the routine "add_condition" returns tRule and the Boolean value FALSE. Otherwise, when tRule contains only a single condition, as determined in step 1613, t is set to $p_n$ in step 1614. Otherwise, t is set to the number of dataset entries that are selected both by tRule and rule-to_grow, in step 1615. In step 1616, the information gain for tRule is computed via expression 1232, discussed above with reference to FIG. 12D. When the information gain is greater than the value stored in variable bestIG, as determined in step 1617, bestC is set to c and bestIG is set to the information gain IG, in step 1618. When there is another condition c in the set of conditions C to consider, as determined in step 1619, c is set to the next condition to consider and the variable first is set to FALSE, in step 1620, after which control flows back to step 1607 for another iteration of the for-loop of steps 1606-1620. Following completion of the for-loop of steps 1606-1620, when bestIG is less than or equal to 0, as determined in step 1622, the received rule rule_to_grow is returned along with the Boolean value FALSE, in step 1624. Otherwise, the condition stored in the variable bestC is added to the received rule_to_grow, and the modified rule_to_grow is returned along with the Boolean value TRUE, in step 1628.

Figure 17:
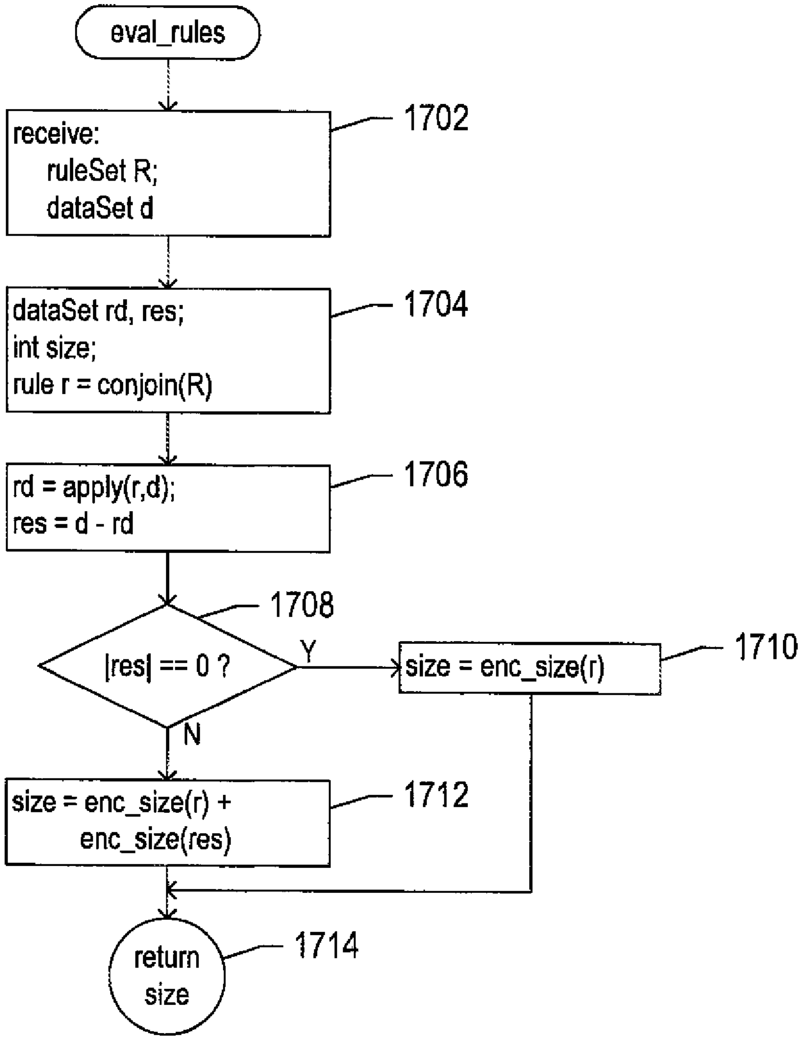
FIG. 17 provides a control-flow diagram for a routine "eval_rules," called by the routine "binary rule-set generator," discussed below with reference to FIGS. 18A-C.

FIG. 17 provides a control-flow diagram for a routine "eval_rules." called by the routine "binary rule-set generator," discussed below with reference to FIGS. 18A-C. In step 1702, the routine "eval_rules" receives a rule set R and a dataset d. In step 1704, the routine "eval_rules" declares the following local variables: (1) rd and res, two dataset variables; (2) size, an integer variable; and (3) r, a rule variable that is initialized to a rule formed by joining the rules in the rule set R with AND operators. In step 1706, rd is set to the entries of dataset d selected by ruler and res is set to the set difference between datasets d and rd. When the dataset res contains no entries, as determined in step 1708, the variable size is set to the number of bits needed to encode rule r, in step 1710. Otherwise, the variable size is set to the number of bits needed to encode both rule r and the entries contained in the dataset res, in step 1712. The value contained in local variable size is returned in step 1714. Thus, the routine "eval_rules" calculates the number of bits needed to encode the rule r and any entries in the dataset d not selected by the rule r.

Figure 18A:
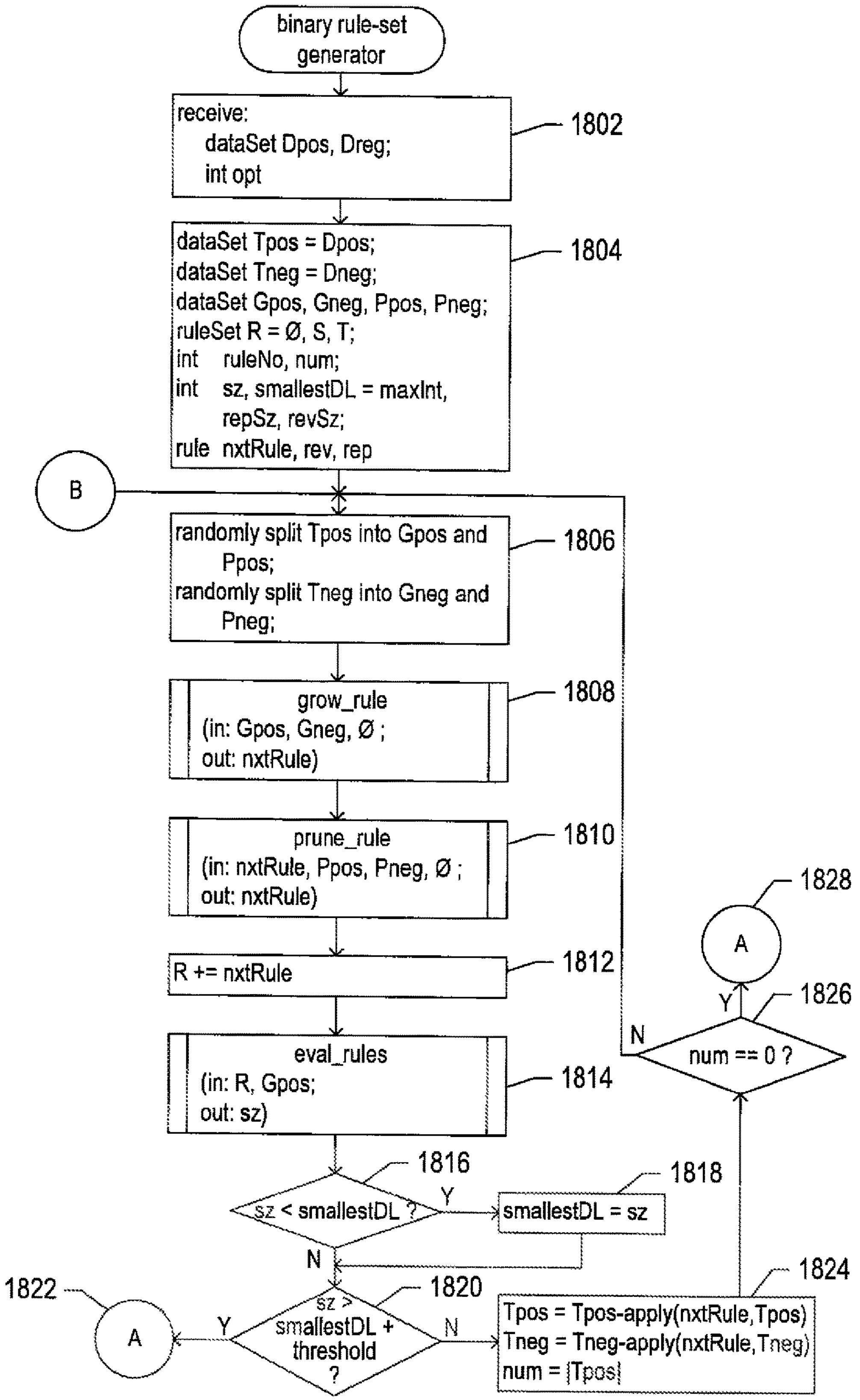
FIGS. 18A-C provide control-flow diagrams for the routine "binary rule-set generator," called in step 1308 of FIG. 13.
Figure 18B:
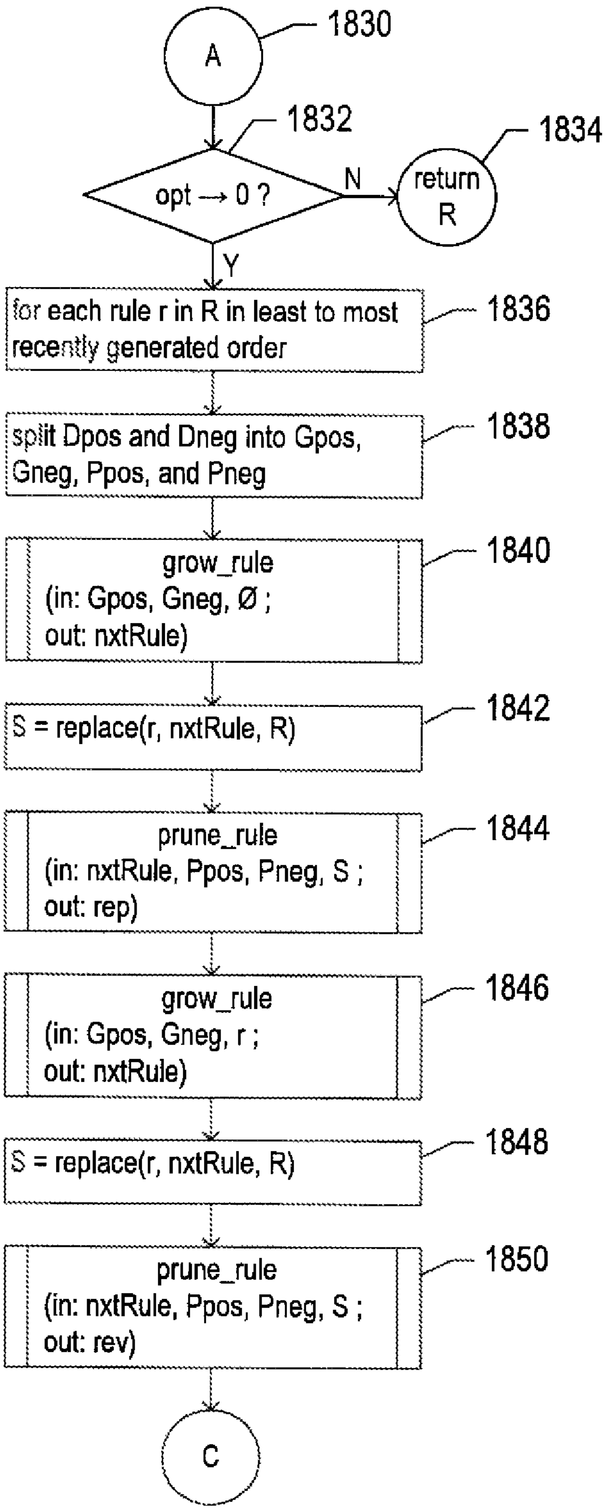
Figure 18C:
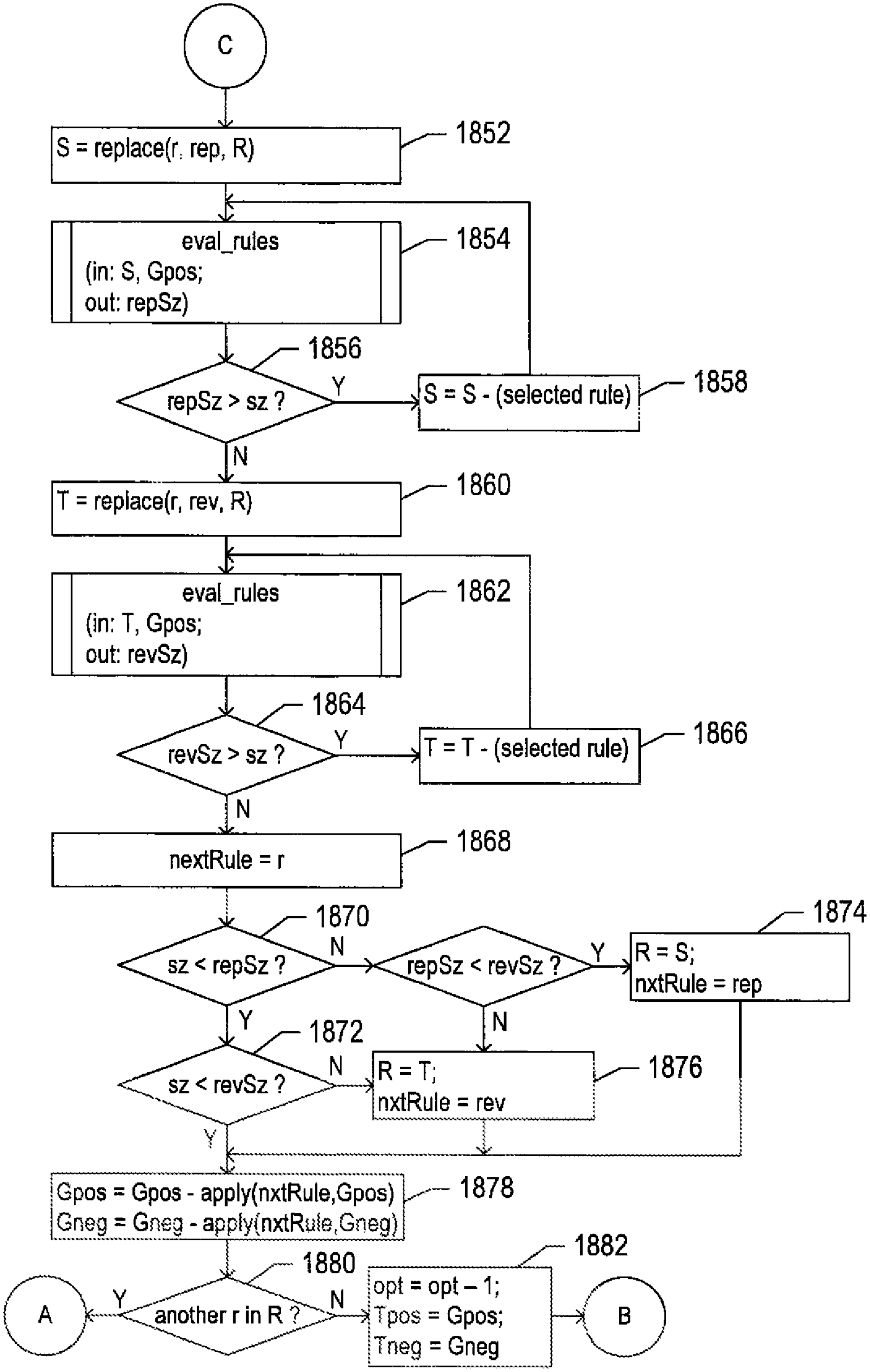

FIGS. 18A-C provide control-flow diagrams for the routine "binary rule-set generator," called in step 1308 of FIG. 13. In step 1802, the routine "binary rule-set generator" receives, as arguments, two datasets Dpos and Dneg and an integer opt. The integer opt indicates whether or not to carry out an additional optimization of the generated rule set, as discussed below. In step 1804, the routine "binary rule-set generator" declares the following local variables: (1) Tpos, a dataset variable initialized to contain the same entries as contained in Dpos; (2) Tneg, a dataset variable initialized to contain the same entries as contained in Dneg; (3) Gpos, Gneg, Ppos, and Pneg, all dataset variables: (4) R, S, and T, rule-set variables with variable R initialized to the empty set; (5) ruleNo and num, both integer variables; (6) sz, smallestDL, repSz, and revSz, all integer variables with variable smallestDL set to a large integer value; and (7) nxtRule, rev, and rep, all rule variables. In step 1806, the routine "binary rule-set generator" randomly splits dataset Tpos into two parts and stores the two parts in datasets Gpos and Pos and randomly splits dataset Tneg into two parts and stores the two parts in datasets Gneg and Pneg. In step 1808, the routine "binary rule-set generator" calls the routine "grow_rule" with input arguments Gpos, Gneg, and an empty rule to generate a next rule. In step 1810, the routine "binary rule-set generator" calls the routine "prune_rule" with arguments nxtRule, Ppos, Pneg, and an empty rule set to prune the rule generated by the routine "grow_rule," called in step 1808. In step 1812, the pruned rule nxtRule is added to rule set R. In step 1814, the routine "binary rule-set generator" calls the routine "eval_rules" to compute an encoding size. When the encoding size is less than the value stored in variable smallestDL, as determined in step 1816, variable smallestDL is set to the computed encoding size in step 1818. When the encoding size is greater than the value stored in smallestDL plus a threshold value, as determined in step 1820, no more rules are added to the rule set and control flows to label A, discussed below, in step 1822. Otherwise, in step 1824, the dataset entries selected by the application of the rule nxtRule to the dataset Tpos are removed from the dataset Tpos and the dataset entries selected by application of the rule nxtRule to the dataset Tneg are removed from the dataset Tneg. In addition, local variable num is set to the number of entries in Tpos. When the number of entries in Tpos is 0, as determined in step 1826, no further rules are generated and control flows to label A, in step 1828. Otherwise control flows back to step 1806 for generation of another rule.

FIG. 18B continues the control-flow diagram of FIG. 18A. Label A 1830 labels step 1832, where control flows from steps 1822 and 1828 in FIG. 18A. When the value stored in local variable opt is less than or equal to 0, as determined in step 1832, the rule set R is returned, in step 1834. Otherwise, in a large for-loop that begins with step 1836, each rule r in rule set R is considered in least-recently-generated to most-recently-generated order. In step 1838, datasets Dpos and Dneg are split into datasets Gpos and Ppos and datasets Gneg and Pneg, respectively. In step 1840, the routine "grow_rule" is called to grow a new rule. In step 1842, the newly grown rule is substituted for currently considered rule r in rule set R to generate rule set S. In step 1813, the routine "prune_rule" is called to prune the rule generated in step 1840, outputting the pruned rule rep. In steps 1846, 1848, and 1850, the routine "binary rule-set generator" again calls the routines "grow_rule," and "prune_rule" in order to generate a new rule obtained by adding additional conditions to currently considered rule r and to then prune the new rule, which is output as rule rev. Continuing to FIG. 18C, rule set S is initialized to contain copies of the rules in rule set R with currently considered rule r replaced by the rule rep, in step 1852. In step 1854, the routine "binary rule-set generator" calls the routine "eval_rules" to determine the encoding size for S. When the encoding size is greater than the encoding size for rule set R, as determined in step 1856, a rule is selected for removal from rule set S and the selected rule is removed, in step 1858. Similarly, in steps 1860-1862, 1864, and 1866, a rule set T is generated by replacing currently considered rule r in rule set R with the rule rev and, if necessary to decrease the encoding size of rule set T, a rule is removed from rule set T. In step 1868, the variable nxtRule is set to currently considered rule r. If the encoding size of rule set R is less than the encoding size of rule set S, as determined in step 1870, and if the encoding size of rule set R is less than the encoding size for rule set T, as determined in step 1872, then variable nxtRule remains set to currently considered rule r. Otherwise, if rule set S has the smallest encoding size, then rule set R is set to rule set S and variable nxtRule is set to rep, in step 1874. Otherwise, rule set R is set to rule set T and variable nxtRule is set to rev, in step 1876. In step 1878, entries of dataset Gpos selected by nxtRule are removed from dataset Gpos and entries in dataset Gneg selected by rule nxtRule are removed from dataset Gneg. When them is another rule r to consider in rule set R, as determined in step 1880, control flows back to step 1832, in FIG. 18B, for another iteration of the for-loop that begins with step 1836. Otherwise, in step 1882, the variable opt is decremented, Tpos is set to Gpos, and Tneg is set to Gneg, and control returns to step 1806 in FIG. 18A for addition of any new rules needed to fully partition Tpos and Tneg.

There are many different methods for generating rules from datasets. Other methods include the CN2, AQ, and ID3 methods. CN2 uses an entropy-based search heuristic. The current disclosed methods and systems can employ any of many different rule-induction methods to generate rules from automatically generated training data, as discussed below.

Statistical and Data-Analysis Methods

Figure 19A:
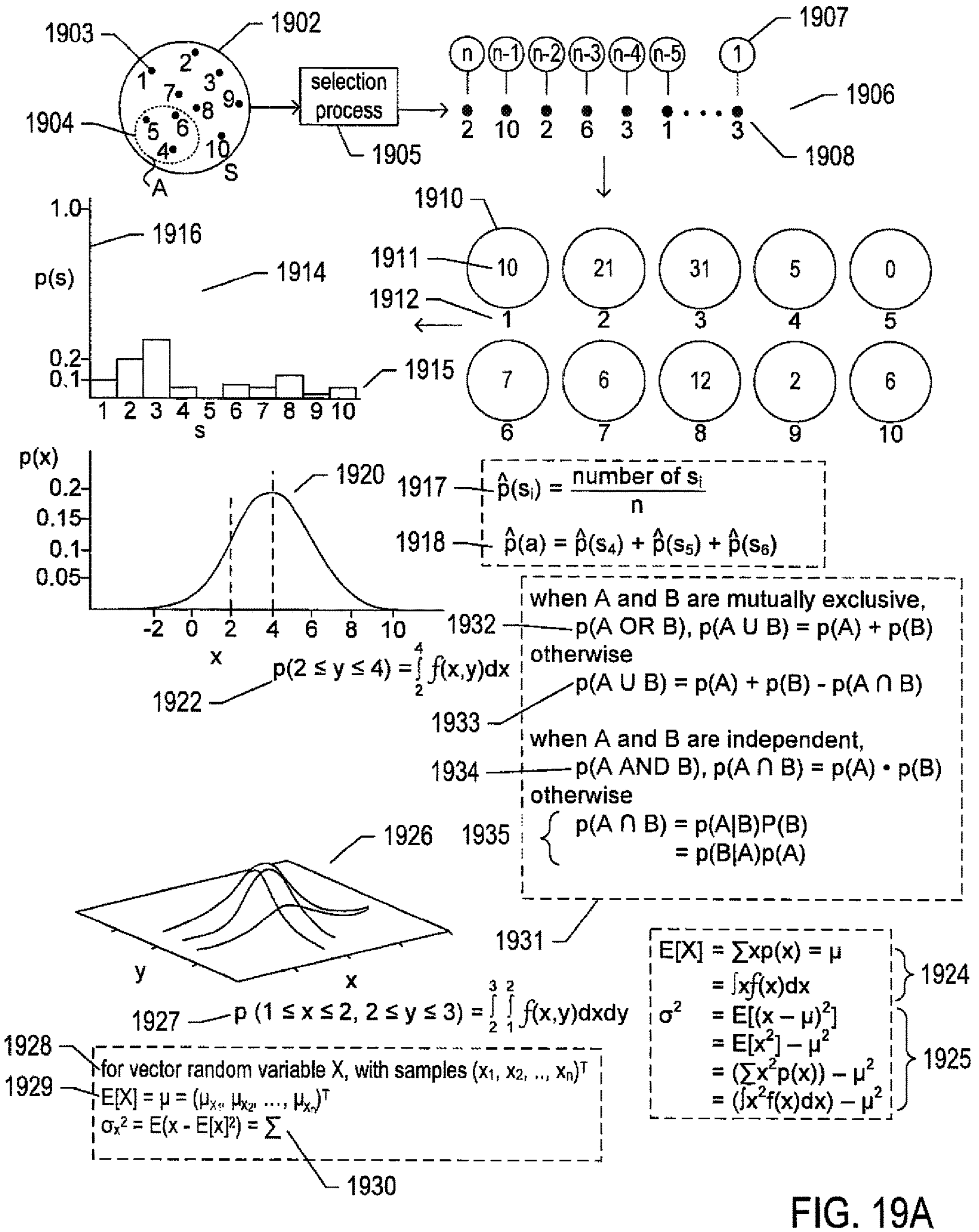

FIGS. 19A-B illustrate numerous statistical and data-analysis methods and processes. FIG. 19A illustrates numerous statistical concepts. The basic concept involves probability and random variables. Consider a set of non-decomposable events, or samples, within a sample space 1902. Each element of the sample space, such as element 1903, represents some type of observable outcome from an experimenter process. Higher-level events, such as event A 1904, may represent the occurrence of any of multiple different lower-level non-decomposable events. A random selection process 1905 generates a sequence of samples 1906, with replacement, from the sample space 1902. The circled numbers, such as circled number 1 1907, represents the numeric sequence identifier for each sample and the numerically labeled sample points, such as sample point 1908, represent the particular non-decomposable event returned by the random sampling process. A random variable represents random selection of samples from a sample space according to a particular probability distribution. The phrase “random variable” is often used synonymously with the phrase “probability distribution,” since a random variable is associated with a particular probability distribution. The sequence of samples generated by the random selection process can be alternatively represented by the number of samples in a generated or selected sample sequence corresponding to each non-decomposable event. For example, disk 1910 represents the fact that the sequence of samples 1906 includes 10 occurrences 1911 of the first non-decomposable event 1912 in the sample space. The alternative representation of the sequence of randomly selected sample points can, in turn, be viewed as a histogram 1914 in which the different types of non-decomposable sample points are plotted with respect to a horizontal axis 1915 and the probability of occurrence of each type of non-decomposable sample point is plotted with respect to the vertical axis 1960. As shown in expression 1917, the estimated probability of occurrence of a particular type of non-decomposable sample point, or event, is the ratio of the number of occurrences of the particular type of sample point divided by the total number of samples n generated by the random selection process.

Histogram 1914 is an example of a discrete probability distribution or probability-mass function. The height of each column in the histogram, hi, has a value between 0 and 1 and the sum of the heights of the columns in the histogram is 1.0. The estimated probability of a higher-level event composed of multiple non-decomposable samples is computed as the sum of the probabilities of the multiple non-decomposable samples, as indicated by expression 1918. A probability density function, an example of which is shown as plot 1920 in FIG. 19A, is a continuous curve. The area under the curve is 1.0 and the probability of a randomly selected sample from the distribution is found, by integration, as the area under the curve between endpoints of a range of sample values 1922. The 1-dimensional probability-density function shown in plot 1920 is characterized by a mean value $\mu$, which is the expected value for the random variable X that selects values from the continuous sample space according to the distribution, as indicated by expressions 1924, and further characterized by a variance $\sigma^2$, as indicated by expressions 1925, which is the expected value of a squared deviation of samples generated by X from the mean $\mu$. Probability density functions can be multivariate, and based on two or more random variables. Plot 1926 shows a 2-dimensional multivariate probability distribution in which the probabilities of occurrences of 2-dimensional sample points is computed, by integration, of volumes under particular portions of the probability-density-function surface, as indicated by expression 1927. Multivariate probability distributions can be thought of as distributions of vector-value random variables, as indicated by expression 1928, and are characterized by a vector of mean values, as indicated by expression 1929, and by a covariance matrix 1930. There are a number of different probability rules, or expressions, that are frequently encountered in the derivations of various statistical methods and data-analysis methods, examples of which are shown in dashed box 1931. These include the probability of the occurrence of either of two events A and B when the two events are mutually exclusive, shown in expression 1932, or when the two events are not mutually exclusive, shown in expression 1933, and the probability of the occurrence of both of two events A and B when the two events are independent, shown in expression 1934, and when the two events are not independent, shown in expressions 1935.

FIG. 19B provides expressions and illustrations for several different statistical methods and concepts. The entropy of a probability distribution is related to the degree of unexpectedness associated with sampling a random variable distributed according to the probability distribution. For example, consider sampling a random variable that describes flipping a fair coin and observing either a heads or a tails result for each coin flip. An entropy of 1.0 is associated with a fair-coin probability distribution, which is (H=0.5, T=0.5), where H represents heads and T represents tails. By contrast, sampling a random variable that describes flipping a completely biased coin, which always produces either heads or tails, is 0.0. The entropy for a single probability distribution is provided by expressions 1942 and the joint entropy for two probability distributions corresponding to two random variables X and Y is given by expression 1943. The mutual information for two probability distributions X and Y is alternatively expressed according to the different expressions 1944. One way of looking at the mutual information between random variables X and Y, I(X;Y), is that when the two random variables are independent from one another, the mutual information I(X;Y) and I(Y;X) are 0 but, when the two random variables are dependent on one another, the mutual information represents a decrease in the number of bits needed to encode X knowing Y or a decrease in the number of bits needed to encode Y knowing X. This is illustrated by Venn diagrams 1945 and 1946 in FIG. 19B. The joint entropy for two independent random variables X and Y is the sum of the entropies for each random variable, as shown by Venn diagram 1945. However, when the random variables are not independent, as shown in Venn diagram 1946, the mutual information for the two random variables 1947 is equal to the joint entropy for the two independent random variables minus the conditional entropies for the two random variables 1948 and 1949. Finally, the symmetrical uncertainty SU(X, Y), given by expression 1950, for the probability distributions represented by two random variables X and Y ranges from 0 to 1, and indicates a type of correlation between the probability distributions, with 0 indicating no correlation and 1 indicating that knowledge of one of the two distributions provides full knowledge about the other.

Currently Disclosed Methods and System

Figure 20:
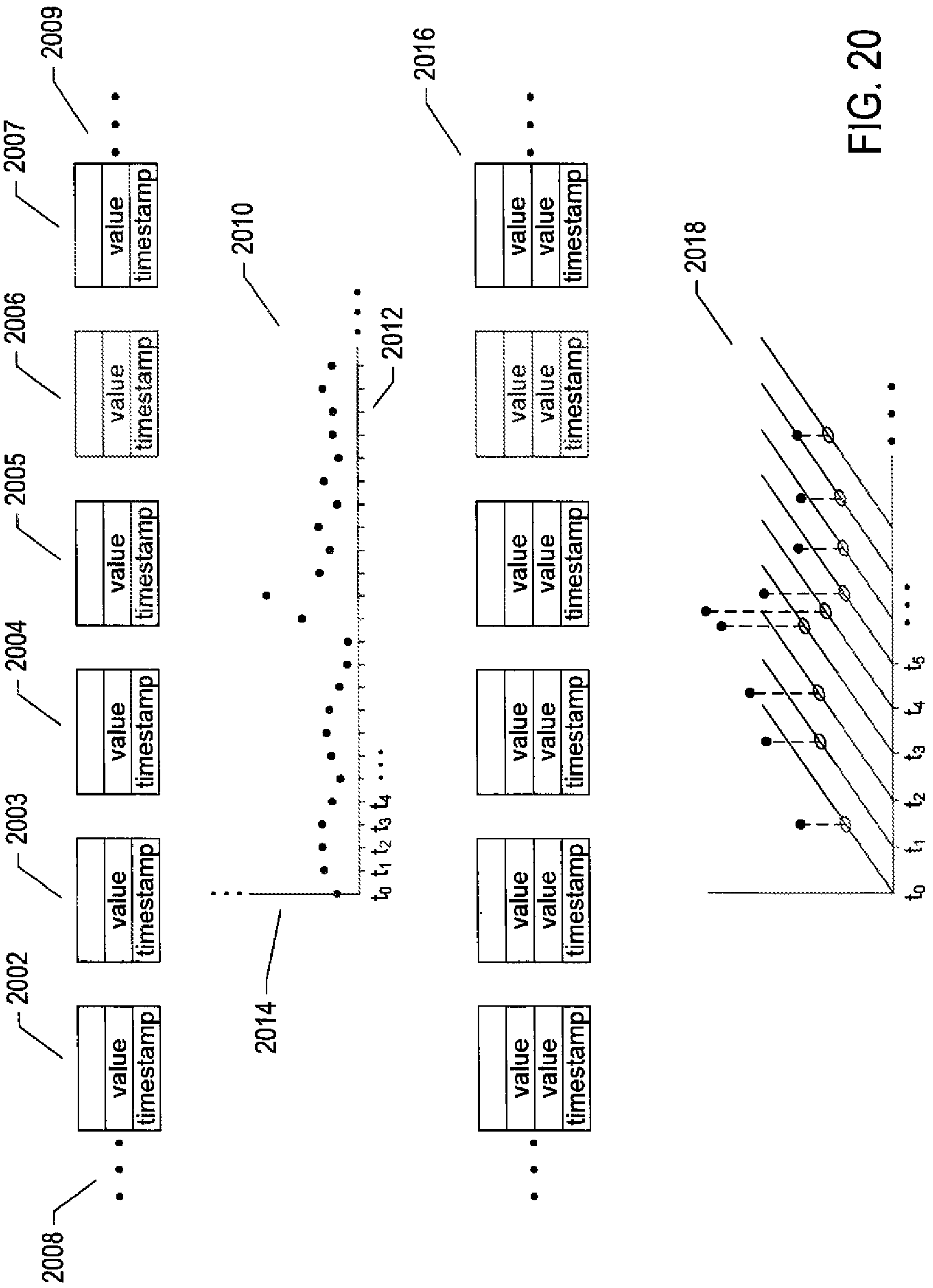
FIG. 20 illustrates the concept of metric data.

FIG. 20 illustrates the concept of metric data. Metric data is generated by many different components and computational entities within distributed computer systems. Metric data fundamentally consists of a stream or sequence of metric-value/timestamp pairs 2002-2007, with ellipses 2008 and 2009 indicating that the stream or sequence continues both forward and backward in time. The metric-value/timestamp pairs may be contained within discrete messages or packets, in certain cases, or may be generated from other types of time-varying signals, in other cases. The metric-value/timestamp pairs are ordered in time as a result of being generated at discrete time points. In many cases, metric data is generated at fixed time intervals. However, when the intervals between metric-value/timestamp pairs are not constant, a metric-data stream or sequence with fixed time intervals can be generated via interpolation. Interpolation can also be used to align two or more metric-data streams in time. A sequence or stream of metric-value/timestamp pairs can be straightforwardly represented as a timeseries plot 2010, with the horizontal axis 2012 representing time and the vertical axis 2014 representing the metric values. A metric-data sequence or stream may alternatively comprise metric-value-vector/timestamp pairs, as indicated by the representation of a vector-valued metric-data stream or sequence 2016. In this example, each message or packet contains a 2-dimensional metric-value vector and can be plotted in a 3-dimensional plot 2018. Of course, a vector-value metric-data stream or sequence can be alternatively viewed as two or more scalar-value metric-data streams or sequences.

Figure 21:
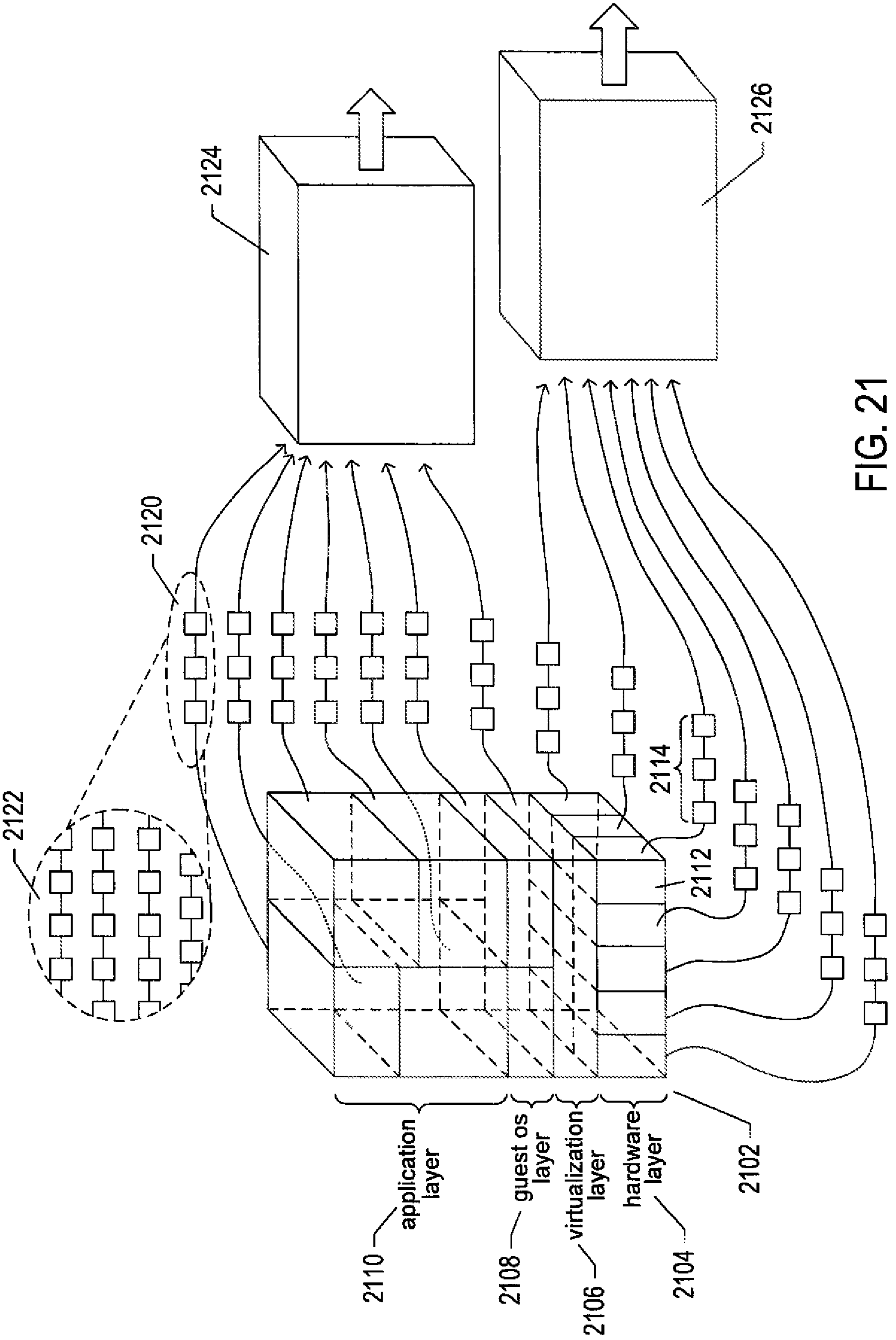
FIG. 21 illustrates generation of metric data by components within a server, or host, within a distributed computer system.

FIG. 21 illustrates generation of metric data by components of a server, or host, within a distributed computer system. The server 2102 is logically represented as containing a hardware layer 2104, virtualization layer 2106, guest-operating-system layer 2108, and an application layer 2110, as discussed above in the initial subsection of the current section of this document. Each of many different hardware-layer components, such as hardware-layer component 2112, may generate one or more metric-data streams or sequences, such as metric-data stream or sequence 2114. Similarly, the virtualization layer 2106, each guest operating system in the guest-operating-system layer 2108, and each application in the application layer 2110 may generate one or more metric-data streams or sequences, where the logical representations of a metric-data stream or sequence, such as representation 2120, may represent multiple parallel metric-data streams or sequences 2122. The metric-data streams and sequences are generally collected and aggregated by metric-data collection-and-aggregation components 2124 and 2126 within a distributed computer system. These components may actively request metric data, at regular intervals, from distributed-computer-system components or may passively receive the metric-data streams or sequences output by the distributed-computer-system components.

Figure 22:
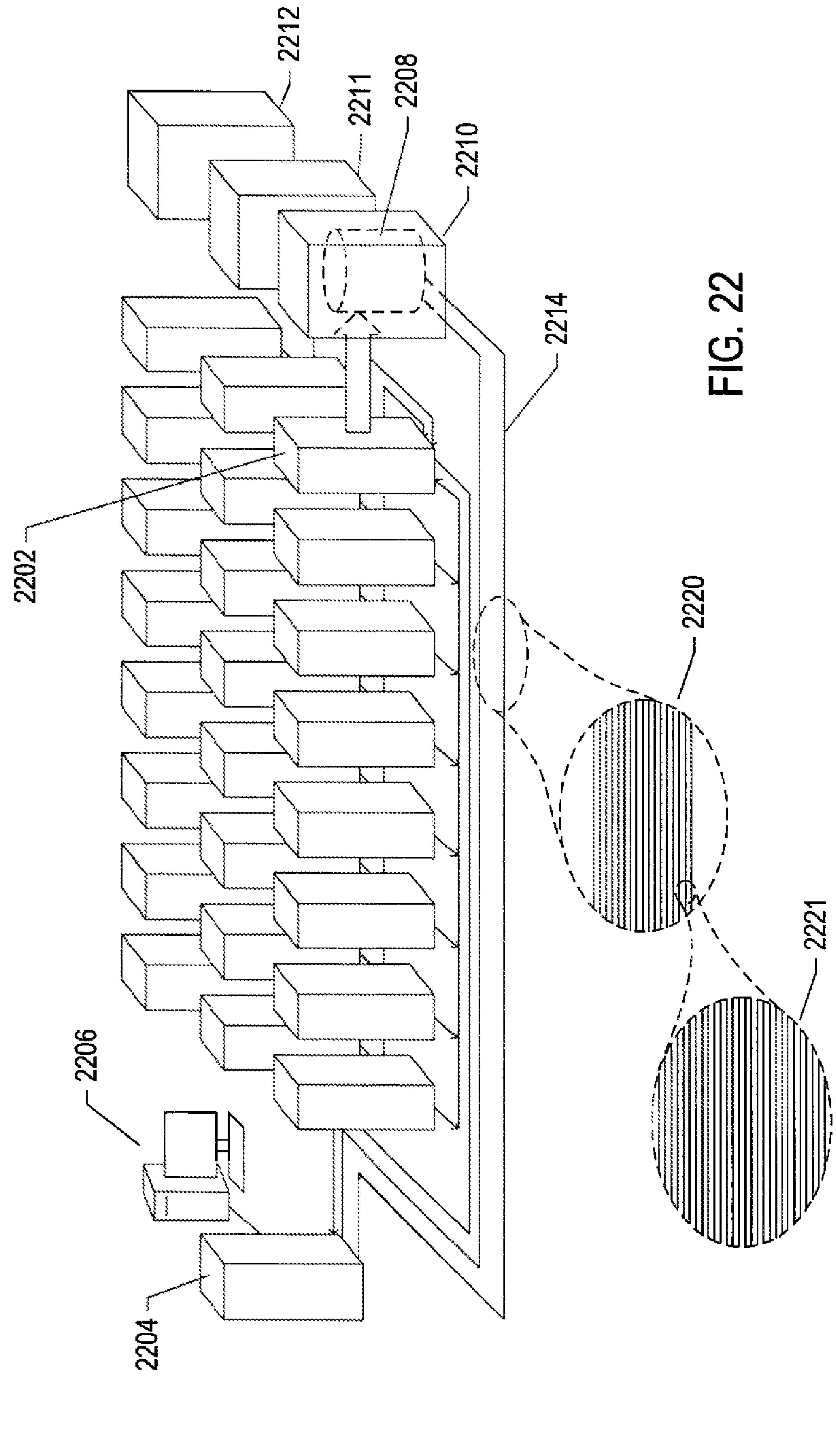
FIG. 22 illustrates metric-data storage and processing in a distributed computer system.

FIG. 22 illustrates metric-data storage and processing in a distributed computer system. In the example shown in FIG. 22, the metric data generated within the hundreds, thousands, or more components of the distributed computer system is collected and aggregated by multiple metric-data collection-and-aggregation components and funneled to a primary metric-data collection-and-aggregation component running within server 2202. The primary metric-data collection-and-aggregation component processes the metric data in order to attempt to detect anomalous operational behaviors or conditions and transmit indications of the detected anomalous operational behaviors or conditions to a management server 2204 for processing, by a distributed management application, and eventual display to distributed-computer-system managers and administrators 2206. In addition, the primary metric-data collection-and-aggregation component stores the metric data in mass storage 2208 provided by one or more mass-storage appliances 2210-2212. The management server 2204 runs various distributed-computer-system management applications and services that may access the stored metric data, as indicated by metric-data transmission medium 2214, in order to carry out various types of metric-data analysis in order to diagnose various operational problems and monitor the operational state of the distributed computer system. As indicated by insets 2220-2221, the stored and subsequently transmitted metric data may comprise thousands, tens of thousands, hundreds of thousands, or more individual metric-data streams or sequences, with even moderately sized distributed computer systems generating terabytes of metric data on a daily or weekly basis. The processing of such huge volumes of metric data in order to detect anomalous operational behaviors and to carry out various sophisticated metric-data analyses can consume a very large fraction of the computational resources available in a distributed computer system. In many cases, the complexity of the metric-data processing problem is far too great for effective implementation by traditional manual, semi-automated, and automated methods. The types and numbers of metric-data streams and sequences can be highly dynamic in large, modern distributed computer systems, and thus cannot be effectively tracked by constantly attempting to update manually programmed metric-data processing methods. Furthermore, the metric data is so complex and voluminous that it is not amenable to human understanding, let alone programming of metric-data processing methods based on such understanding. Vendors of distributed-computer-system components and management applications, distributed-computer-system managers and administrators, and, ultimately, users of computational infrastructure provided by distributed computer systems have come to the realization that only machine-learning-based metric-data processing methods can possibly address the complexity and volume of metric data currently generated within distributed computer systems, likely to continue to increase as machine intelligence is incorporated at finer levels of granularity within distributed-computer-system components. This is a major problem in distributed computing, and a problem that has motivated the currently disclosed methods and systems, discussed below.

Figure 23:
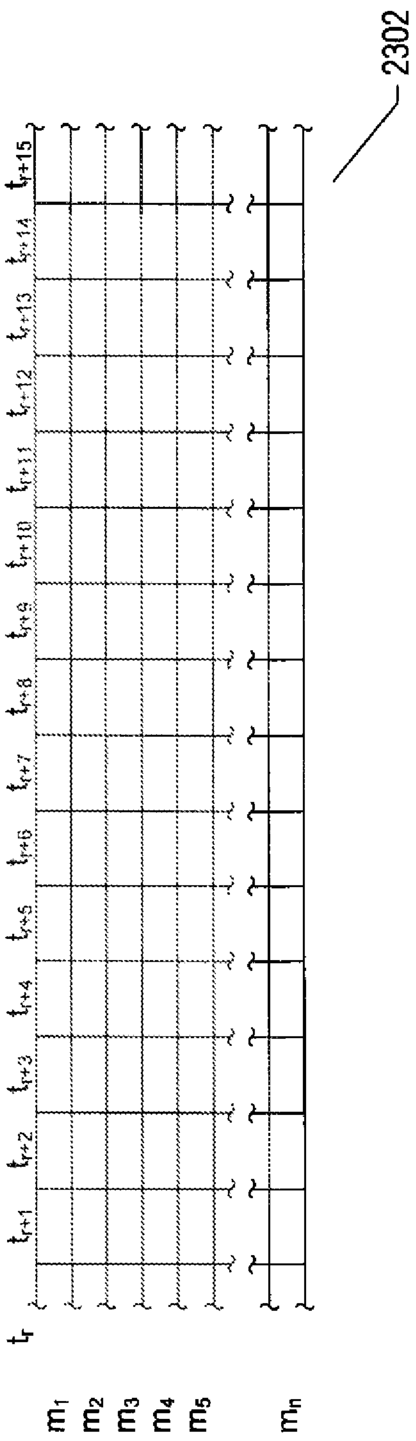
FIG. 23 illustrates a small portion of an aggregated and preliminarily processed metric-data stream generated by the primary metric-data collection-and-aggregation component, discussed above, for anomalous-operational-behavior detection and storage.

FIG. 23 illustrates a small portion of an aggregated and preliminarily processed metric-data stream generated by the primary metric-data collection-and-aggregation component, discussed above, for anomalous-operational-behavior detection and for storage. The aggregated and preliminarily processed metric-data stream 2302 includes n scalar metric-data streams $m_1, m_2, \ldots, m_n$ sequenced and aligned in time. The aggregated and preliminarily processed metric-data stream can be alternatively viewed as a stream of n-dimensional metric-value vectors ordered in time.

Figure 24A:
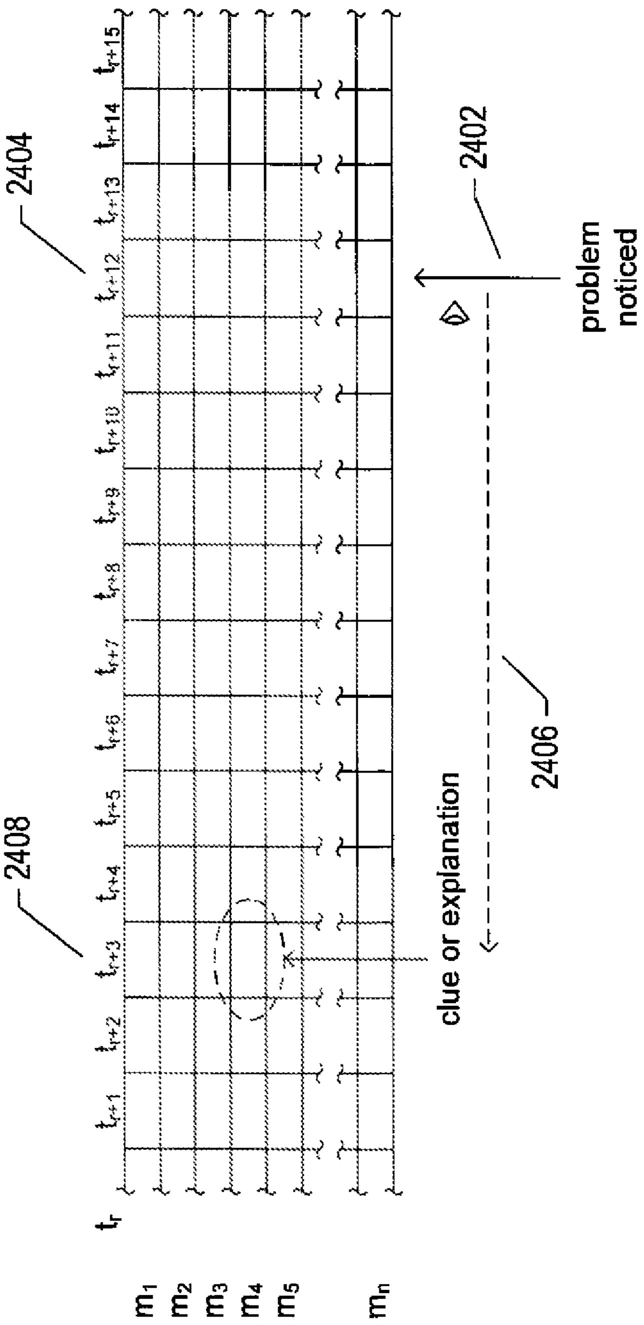
FIGS. 24A-B illustrate several intended uses of an aggregated and preliminarily processed metric-data stream.
Figure 24B:
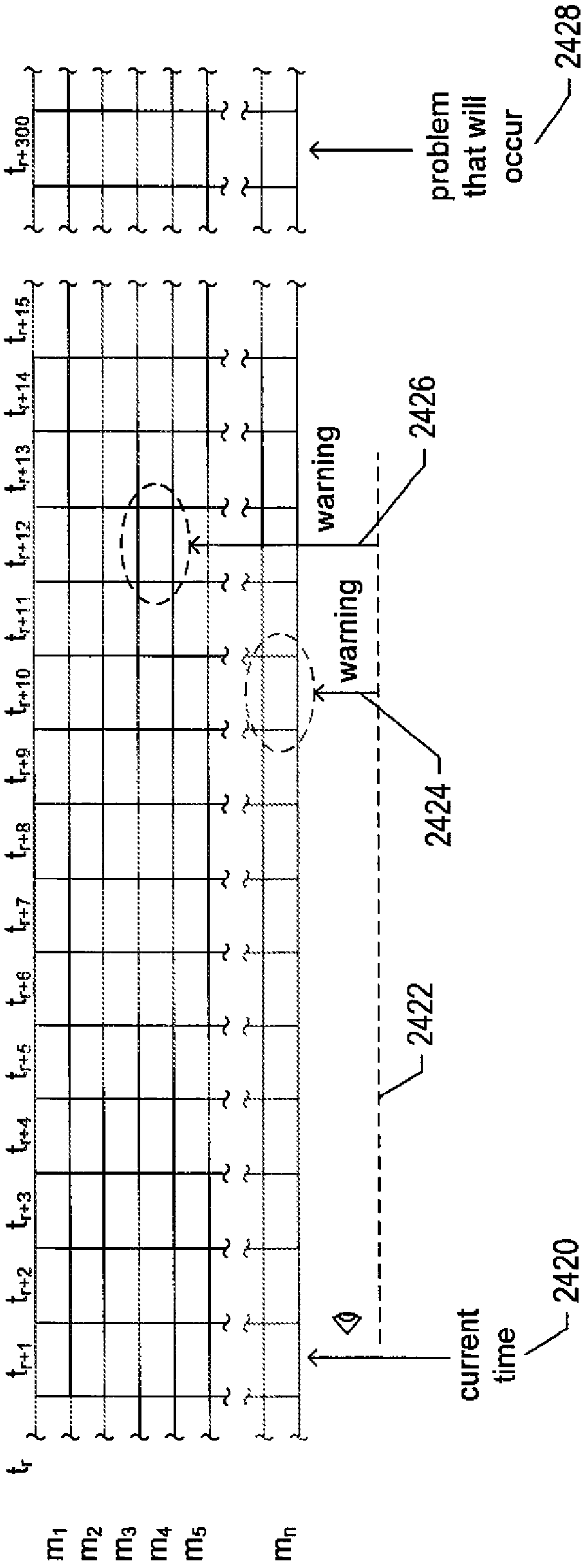

FIGS. 24A-B illustrate several intended uses of the aggregated and preliminarily processed metric-data stream discussed above with reference to FIG. 23. One usage is for diagnosing underlying causes of a detected problem, as illustrated in FIG. 24A. As indicated by arrow 2402, some type of operational problem is detected at a particular point in time 2404. The management application running within the management server of the distributed computer system may then access stored metric data in order to look back, in time, as indicated by dashed arrow 2406, to identify clues or explanations of the problem in metric values collected at earlier points in time, such as time 2408. This type of diagnosis can then lead to generating rational plans for ameliorating the detected problem as well as generating plans for improving the distributed computer system in order to forestall similar problems in the future. Of course, the analysis may involve analyzing many metric values of many different metric-data streams at many previous points in time. However, as discussed above, in view of the enormous quantities of metric data accumulated within a modern distributed computer system, such diagnostic metric-data analyses may be far too complex for effective use of currently available metric-data-analysis tools and methods.

FIG. 24B illustrates another usage of the aggregated and preliminarily processed metric-data stream discussed above with reference to FIG. 23. In this case, the metric-dated stream is viewed from a current point of time 2420 forward. in time, as indicated by dashed-arrow 2422. The intent is to detect, at points in time 2424 and 2426, indications, in the metric-data streams, of an incipient operational anomaly or problem that is likely to occur at a subsequent, future point in time 2428. Thus, rather than used retrospectively for diagnosing problems, the aggregated and preliminarily processed metric-data stream is used for predicting future problems in advance of their occurrence in order to take remedial actions to forestall occurrence of the problems.

Figure 25A:
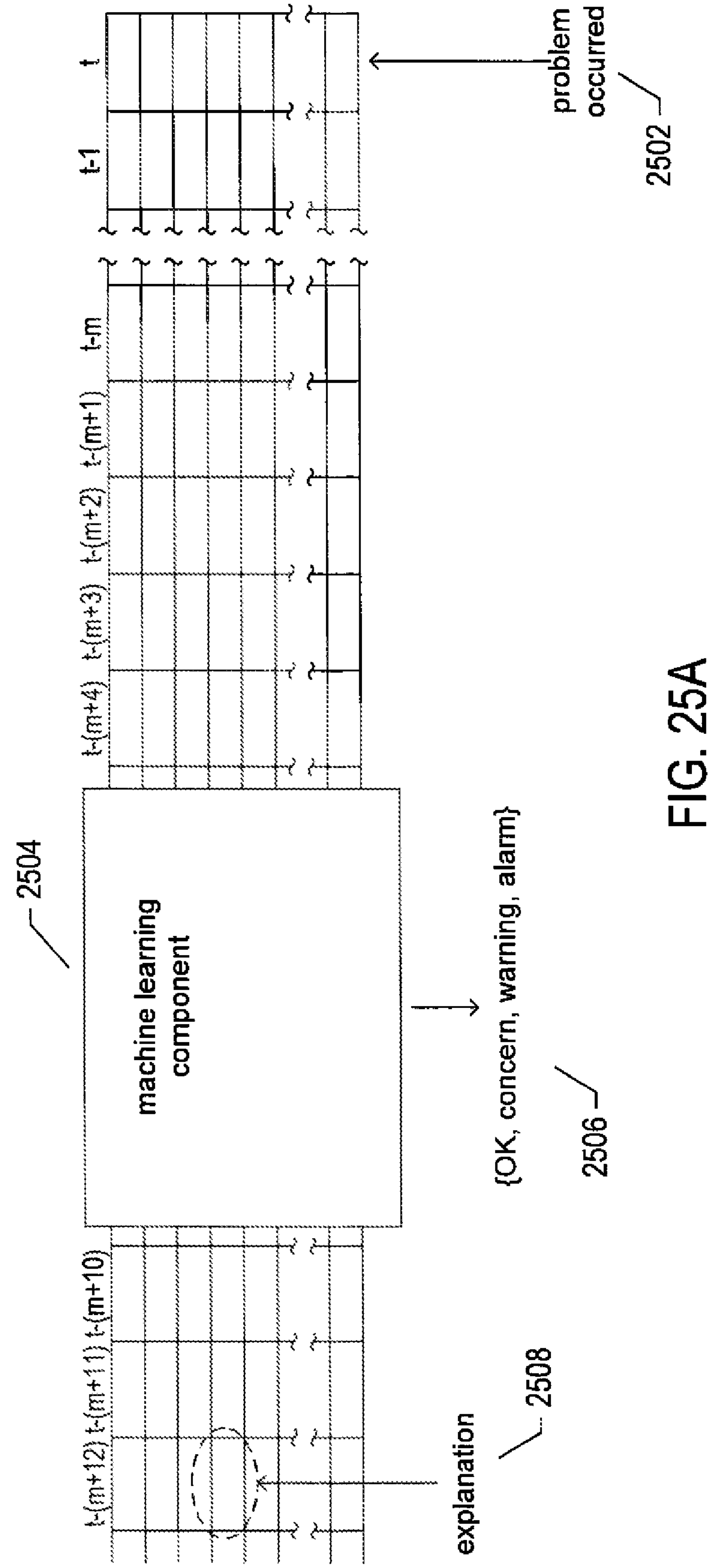
FIGS. 25A-B illustrate use of machine learning to attempt to carry out retrospective diagnoses and forward-looking prediction of distributed-computer-system anomalous behaviors.
Figure 25B:
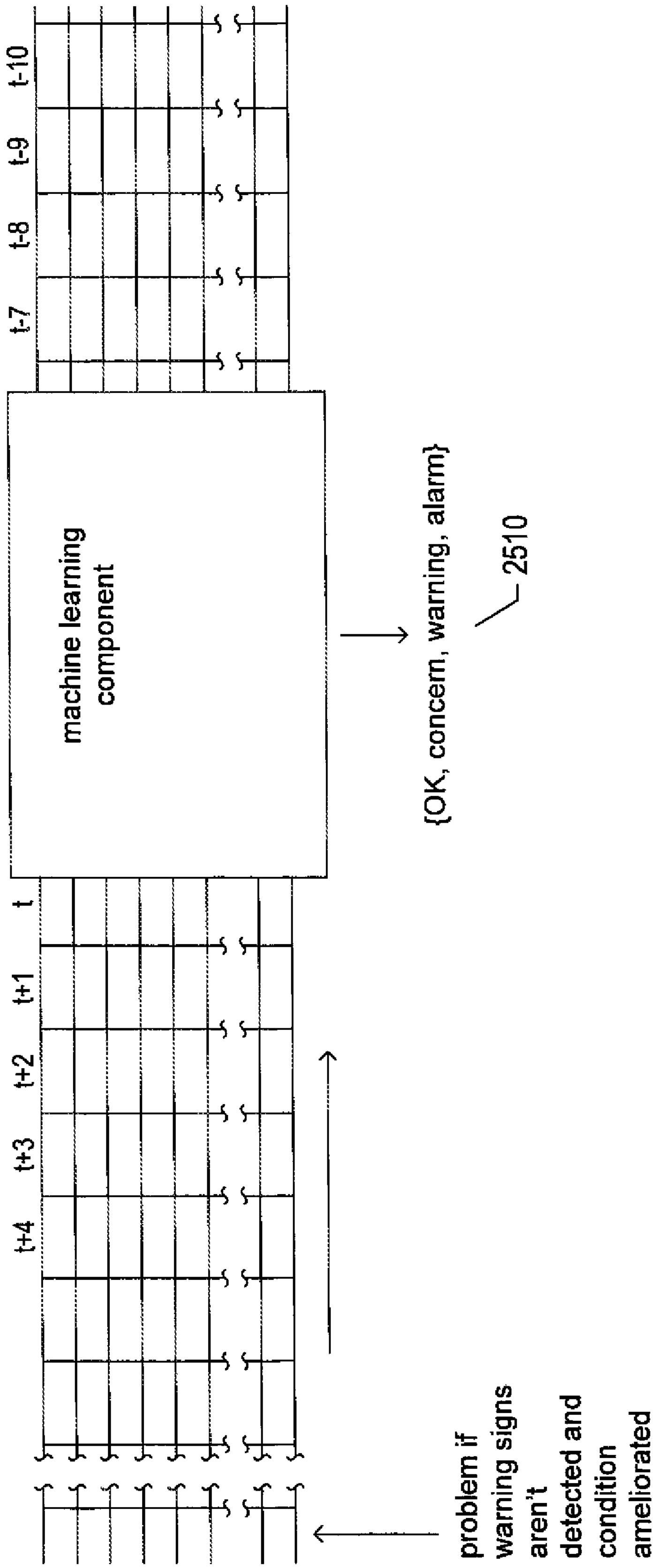

FIGS. 25A-B illustrate use of machine learning to attempt to carry out retrospective diagnoses and forward-looking prediction of distributed-computer-system anomalous behaviors. As shown in FIG. 25A, once a problem has occurred 2502, n-dimensional metric-value vectors, or subsequences of n-dimensional metric-value vectors, are input to a trained neural network or other machine-learning component 2504 that generates output values selected from a set of output values 2506 that indicate potentially anomalous metric data that may be indicative of underlying causes of the problem. These output values can then be used to search for metric-value-indicated explanations 2508 within n-dimensional metric-value vectors, or subsequences of n-dimensional metric-value vectors. In certain cases, the machine-learning component may actually identify purported causes. Similarly, as shown in FIG. 25B, the machine-learning component can be also used in a forward-looking monitoring role to detect indications 2510 of incipient anomalous behaviors in sufficient time to allow remedial actions to be taken. However, there are major problems with such approaches. Neural networks and many other machine-learning techniques are often trained by using extensive annotated data sets, with the annotations made by human experts. For example, training may involve back propagating errors generated by evaluating neural-network outputs against the human-expert annotations. But, due to the volume and complexity of metric data, it is practically impossible to produce sufficient, accurately annotated training data for training machine-learning components, and, because the types and natures of metric-data streams generated within a distributed computer system are constantly changing, the preparation of annotated training data would need to be carried out nearly continuously, which constitutes a far greater overhead in time and cost than can be rationally justified, even if system administrators and managers could be convinced to attempt such continuous training-data-set generation. Another significant problem is that neural networks and many other types of machine-learning components are essentially black boxes. They learn complex, non-linear functions that generate outputs from input data, but they do not provide explanations of those functions or any reasoning that led to them. Therefore, human system managers and administrators are forced to accept machine-learning-component outputs as accurate and rational, often without any rational basis. This is often not acceptable to managers and administrators. Furthermore, metric data is often quite noisy and training machine-learning components with even voluminous amounts of accurately annotated metric data does not necessarily guarantee a sufficient level of reliability in machine-learning-component outputs to justify dependence on them. Thus, naïve-machine-learning approaches to addressing the above-discussed problems with metric-data analysis often only compound those problems. The currently disclosed methods and systems are designed to address these and many other problems with metric-data processing and analysis currently encountered by distributed-computer-system owners, managers, administrators, and users.

Figure 26:
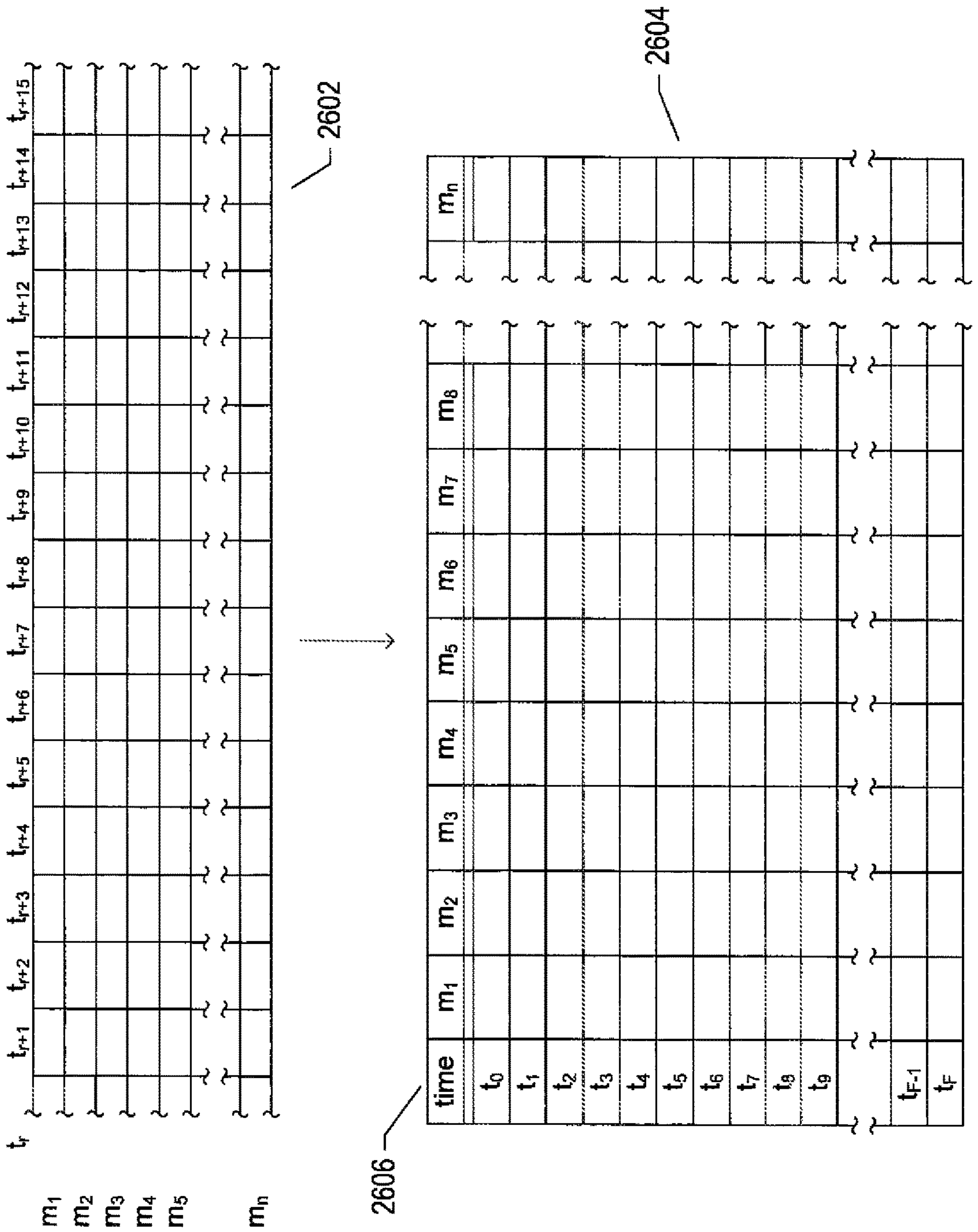
FIG. 26 illustrates a first step in the currently disclosed methods for processing and analyzing metric data.

FIG. 26 illustrates a first step in the currently disclosed methods for processing and analyzing metric data. A portion of the aggregated and preliminarily processed metric-data stream 2602 discussed above with reference to FIG. 23 is again shown at the top of FIG. 26. A portion of the aggregated and preliminarily processed metric-data stream spanning a timeframe between time $t_0$ and time $t_F$ is selected or extracted from the metric-data stream and logically reformatted in tabular form 2604. A first column 2606 of the logical table 2604 contains the times associated with each row in the logical table. Each row represents an n-dimensional metric-value vector selected from the metric-data stream. The times in the first column 2606 were sequentially ordered in time. This logical table has a structure similar to table 1122 in FIG. 11B and table 1202 in FIG. 12A, and is thus close to a table to which the above-described methods for generating decision trees and rule sets can be applied. However, so far, there is no label column.

Figure 27A:
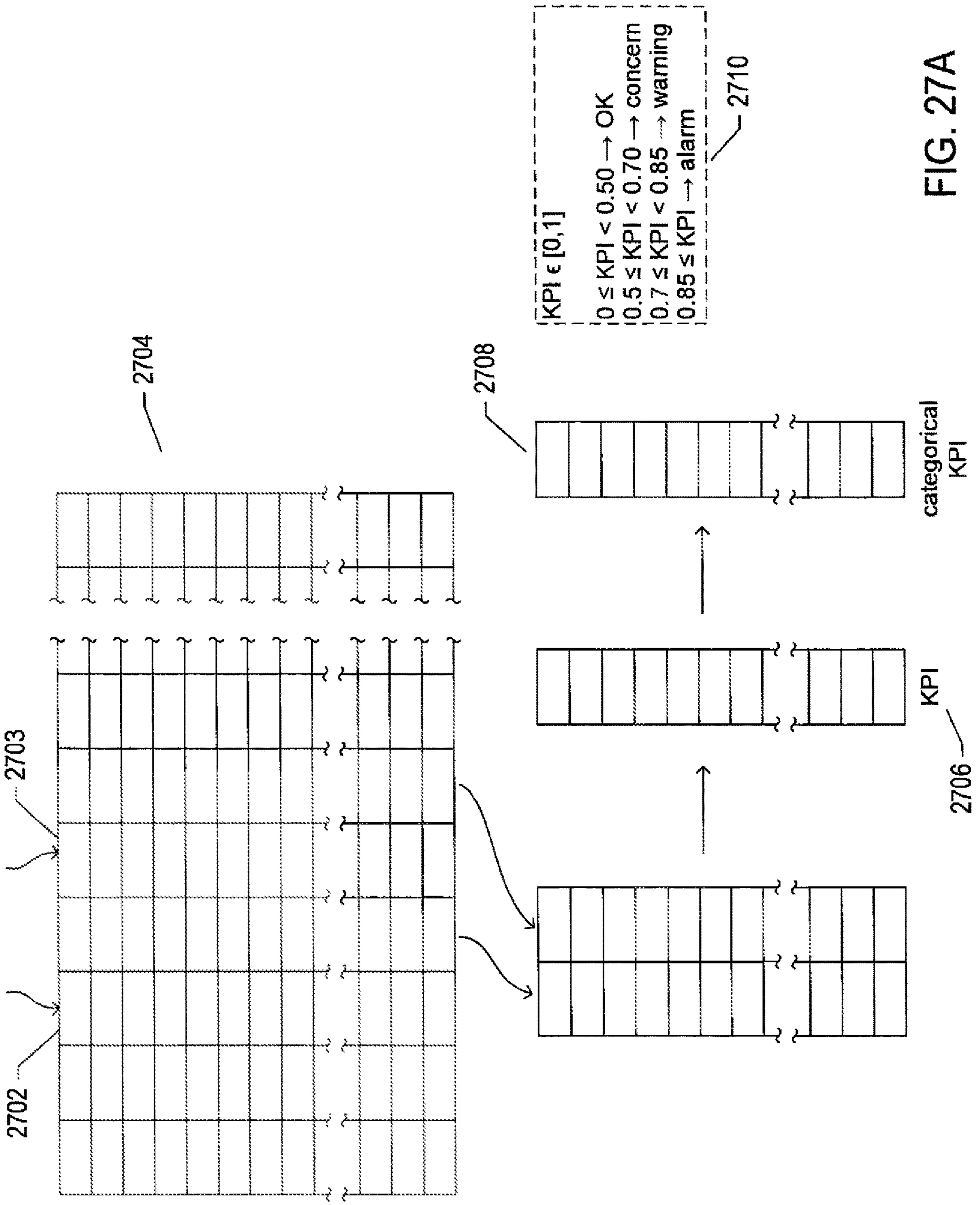
FIGS. 27A-B illustrate two next steps in the currently disclosed methods for processing and analyzing metric data.
Figure 27B:
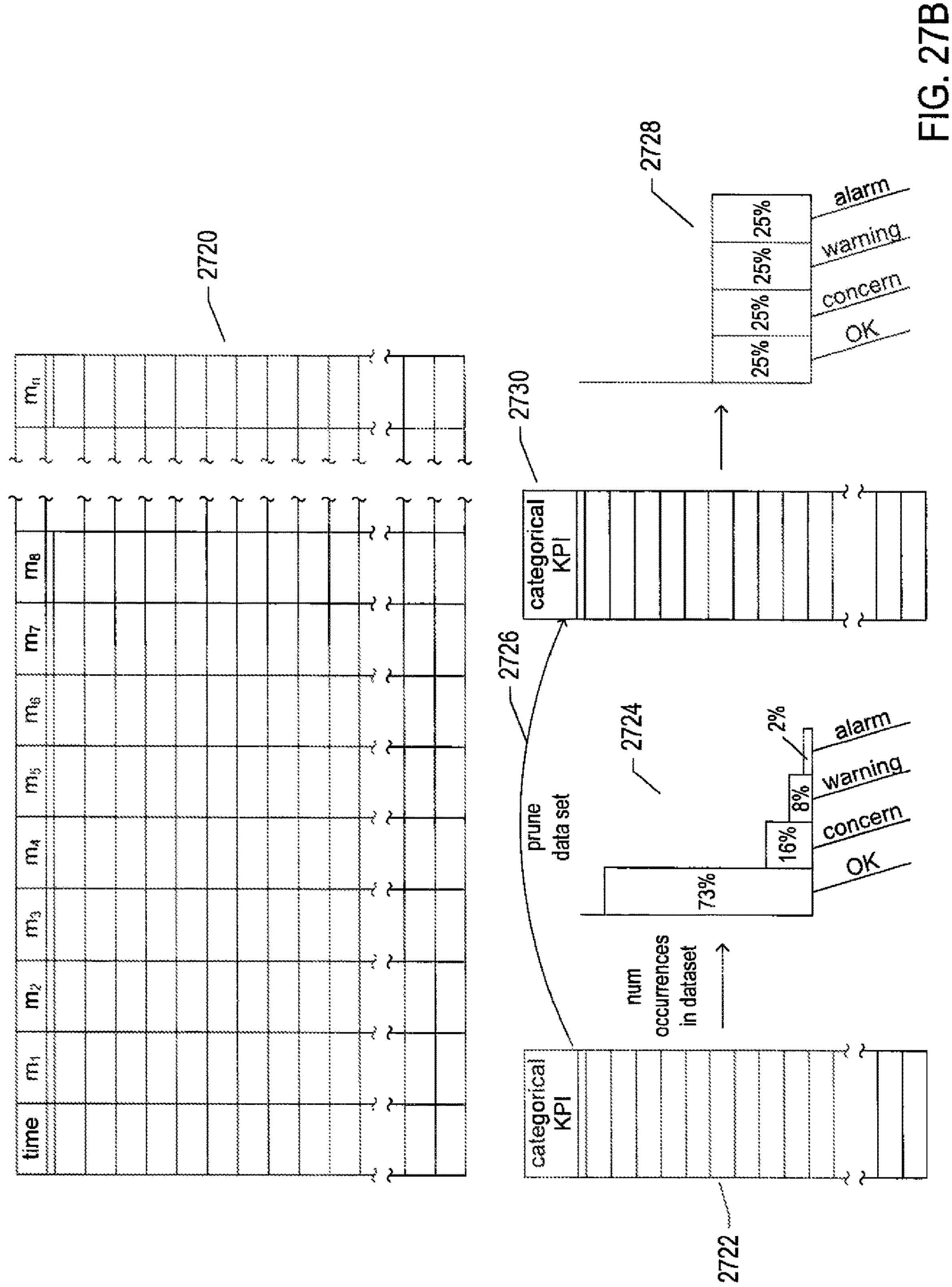

FIGS. 27A-B illustrate two next steps in the currently disclosed methods for processing and analyzing metric data. As shown in FIG. 27A, one or more columns 2702 and 2703 of the logical table 2704 generated from a portion of the metric data stream can be selected to generate values for a KPI column 2706. The KPI column serves as a label column in the currently disclosed methods for processing and analyzing metric data. The acronym "KPI" stands for "key performance indicator." Key performance indicators are selected by human experts. They are indicators of fundamental operational characteristics of a distributed computer system and components of a distributed computer system. For example, in the case of a transaction-processing distributed-application component, the number of transactions processed per second may be a key performance indicator. Changes in the values of a key performance indicator may correspond to strong indications of operational-state changes and/or operational anomalies. Thus, in the second step of the currently disclosed methods, a KPI column 2706 is generated from one or more metric columns in the logical table 2704 and then transformed to a categorical KPI column, or label column, containing discrete values 2708. An example used in the current discussion is to generate a set of label values {OK, concern, warning, alarm} using a numeric-to-category transformation function 2710. The categorical KPI column is added to the logical table and the one or more metric columns used to generate the categorical KPI column are removed from the table or associated with deletion indications.

The first step described in the preceding paragraph represents a significant innovation and addresses one of the major problems mentioned above. The first step generates training data from metrics collected from an operational distributed computer system, without the need for human-expert annotations. Human experts do select the KPIs and provide the functions that generate numerical KPI values and transform the numerical values generated for the KPI-column entries to categorical values, but human experts do not need to carry out and/or monitor annotation of metric data to produce a training data set. This allows for automated, continuous machine-learning-component training.

As shown at the top of FIG. 27B, the logical table with the added KPI column 2720 now has the form needed for generation of rule sets and decision trees, which are machine-learned components that facilitate metric-data analysis. However, there is an additional problem. When the KPI column 2722 is transformed into a histogram 2724 showing the frequencies of occurrence of the different categories or labels, it is generally the case that the distribution is extremely nonuniform. In the current example, a large fraction of the labels generated for the n-dimensional metric-value vectors, or table rows, have the label value "OK," as would be expected in metric data generated from an operational distributed computer system. The remaining values "concern," "warning," and "alarm" are ordered in increasing seriousness or severity and therefore occur with decreasing probability in the metric data. When the label-value distribution is so extremely skewed, the tabulated data tends to produce poor machine-learning training, with the trained machine-learning components skewed towards the normal n-dimensional metric-vector values and generally suffering overfitting and lack of generalization. For this reason, as indicated by arrow 2726 in FIG. 27B, a third step of the currently disclosed metric-data processing-and-analysis methods is to prune the logical table 2720 in a way that results in a relatively uniform distribution 2728 of the label values in the categorical KPI column 2730 resulting from the logical-table pruning.

Figure 28:
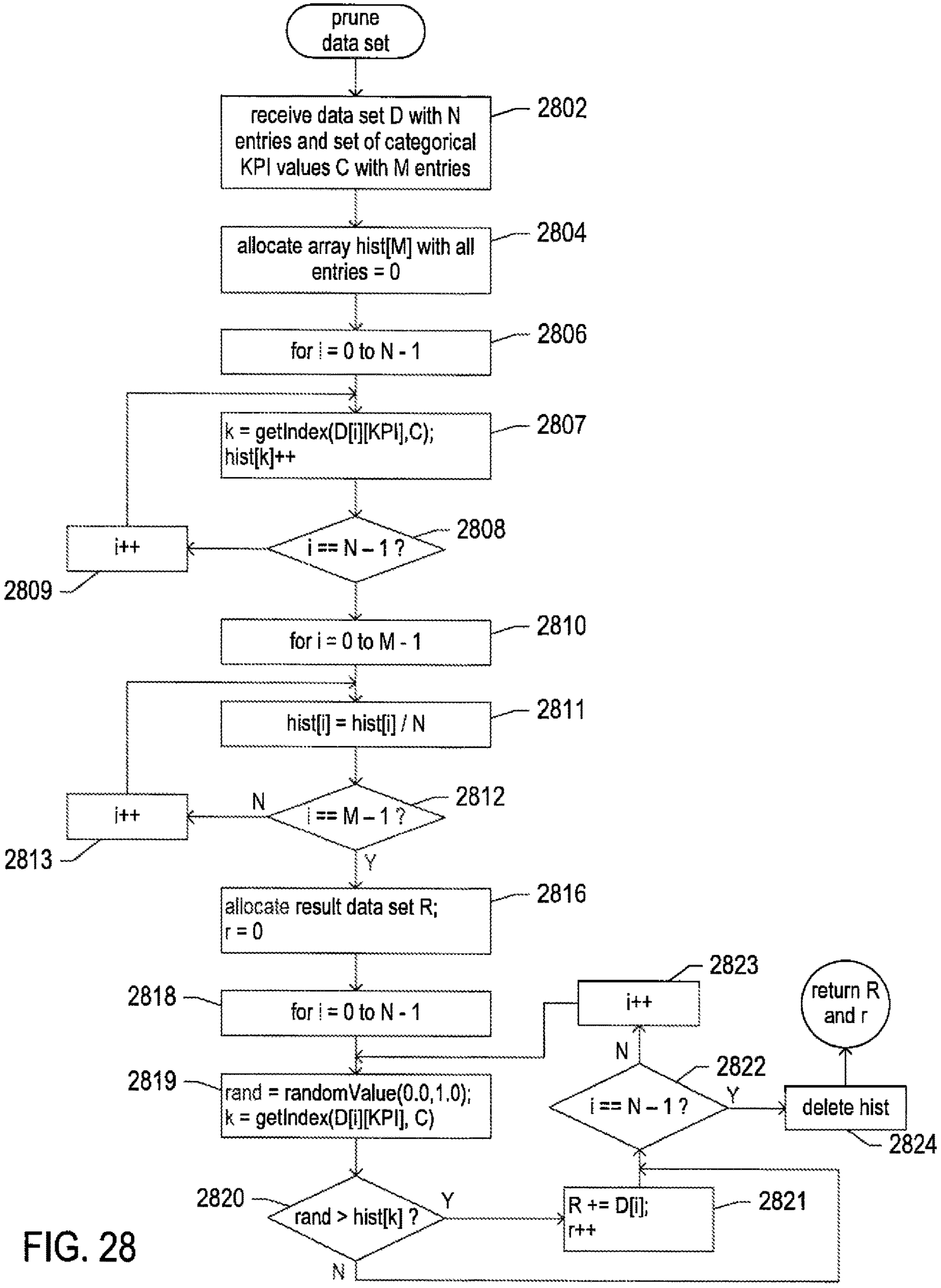
FIG. 28 provides a control-flow diagram for a simple data-set-pruning method that can be used to prune the logical table in order to balance the distribution of KPI-column values.

FIG. 28 provides a control-flow diagram for a simple data-set-pruning method that can be used to prune the logical table in order to balance the distribution of KPI-column values, as discussed above with reference to FIG. 27B. In step 2802, the routine "prune data set" receives a logically tabular data set D with N entries and a set of categorical KPI values C with M members. In step 2804, the routine "prune data set" allocates an integer array hist for representation of a histogram for the KPI-column values of the data set D with all elements initially equal to 0. In the for-loop of steps 2806-2809, the values in the KPI-column are used to generate a histogram-like distribution of KPI values in the array hist. with the function getIndex used to generate the index of the element of set C corresponding to an entry i in the categorical KPI column. Next, in the for-loop of steps 2810-2013, the counts in the array hist are transformed into estimated probabilities by dividing each count by N. In step 2816, the routine "prune data set" allocates a result data set R and sets the local variable r to 0. Finally, in the for-loop of steps 2818-2023, the routine "prune data set" randomly selects entries from data set D for inclusion into data set R with probabilities of selection inversely related to the probabilities of occurrence of the label values in the histogram so that the KPI-column values in the data set R are uniformly distributed, and additionally counts the number of entries in the data set R in local variable r. In step 2824, the array hist is deallocated and the routine "prune data set" returns data set R and the count of entries in data set R. Of course, in the control-flow diagrams provided in the current document, arguments may be passed either by value or by reference and return values can be returned either by value or by reference, depending on their sizes and other considerations.

Figure 29:
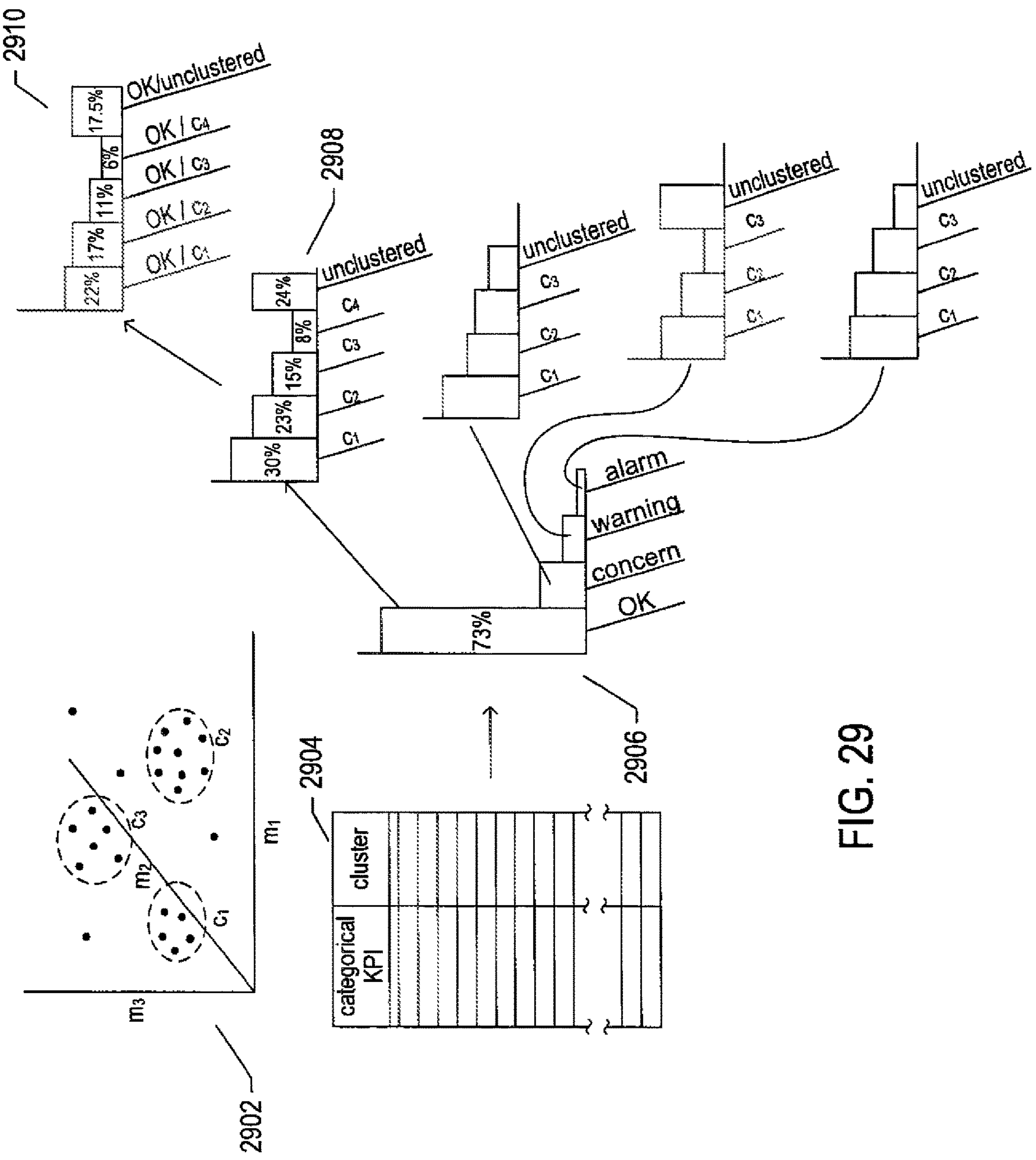
FIG. 29 illustrates another approach to data-set pruning to render the KPI-column values evenly distributed.

FIG. 29 illustrates another approach to data-set pruning to render the KPI-column values evenly distributed. In this approach, the n-dimensional metric-value vectors of the data set D with common KPI-column values are clustered, as indicated in plot 2902, using a clustering technique such as the K-nearest-neighbor technology. A table 2904 that associates each KPI value with a set of clusters is then prepared. A distribution for the KPI values 2906 is prepared, as discussed above, and then secondary distributions for each KPI-value/cluster pair, such as secondary distribution 2908, are prepared. The secondary distributions are then normalized based on the probabilities of the KPI values to generate final distributions, such as final distribution 2910. The "prune data set" routine, described above, then can be modified to randomly select entries inversely proportional to the probabilities of the KPI-value/cluster probabilities. There are many additional possible approaches to data-set pruning.

Figure 30A:
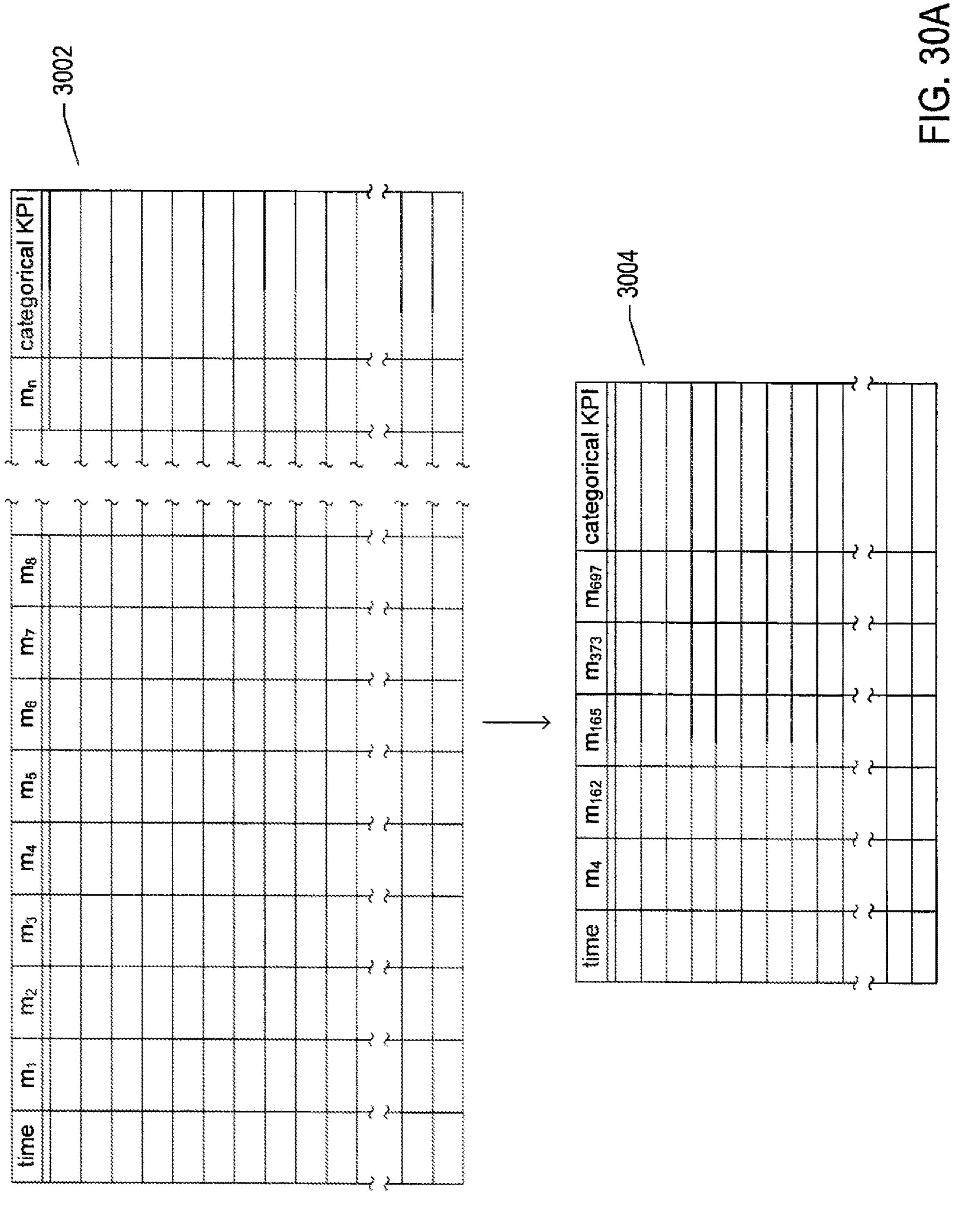
FIGS. 30A-C illustrate a fourth step in the currently disclosed metric-data processing-and-analysis methods.
Figure 30B:
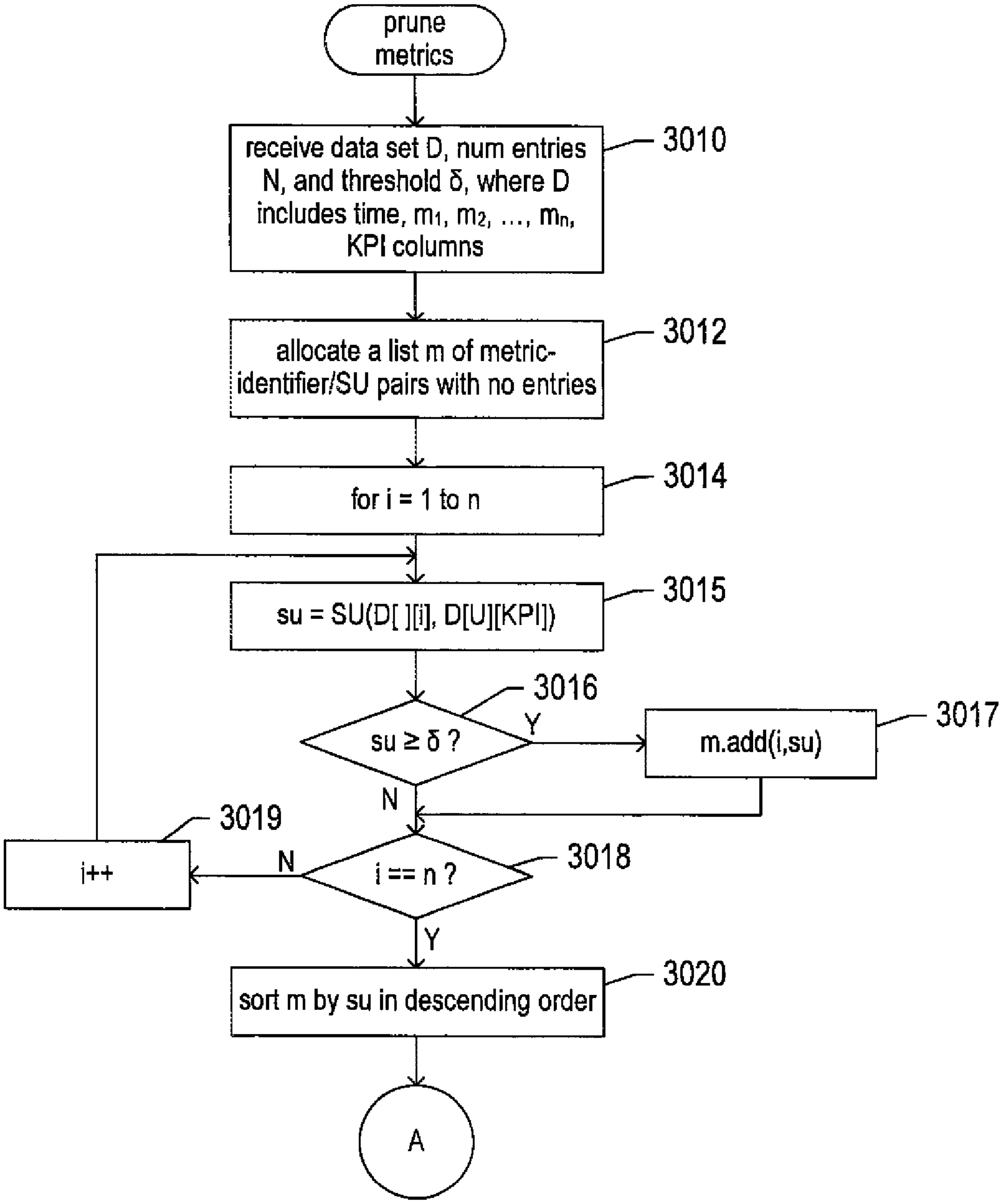
Figure 30C:
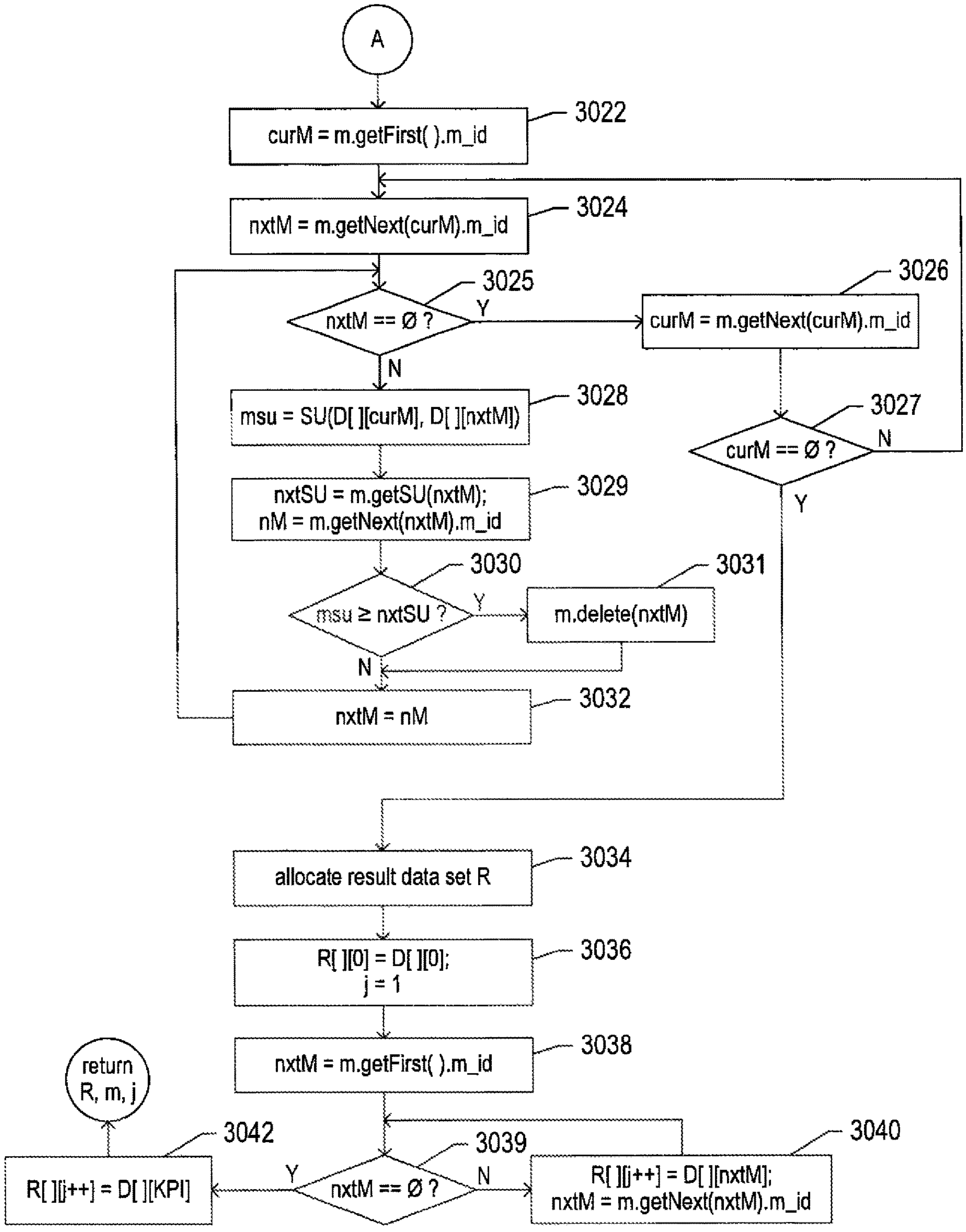

FIGS. 30A-C illustrate a fourth step in the currently disclosed metric-data processing-and-analysis methods. As shown in FIG. 30A, the fourth step prunes the logically tabular data set 3002 into a much more concise logically tabular data set 3004 by selecting a relatively small number of relevant metric columns, or feature columns, to include in the concise data set 3004. In general, the KPI value associated with a row in the logical table can be explained or predicted from only a very small fraction of the metric values in the row. Moreover, a small subset of the metrics, or features, can generally be used to predict or explain the KPI values associated with all or a large fraction of the rows in the logical table. In the fourth step, an explanatory set of metric columns is selected from the logical table for inclusion in the concise logical table that is used for machine-learning-component training.

FIGS. 301-C provide a control-flow diagram for a routine "prune metrics," which generates a concise logical table from an input logical table of metric values, as discussed above. In step 3010, the routine "prune metrics" receives a logically tabular data set D with N entries, n metric columns, and a categorical KPI column as well as a threshold value S. In step 3012, the routine "prune metrics" allocates a list m of metric-identifier/SU pairs, initially with no entries. The acronym "SU" refers to the symmetric uncertainty discussed above with reference to FIG. 19B. In the for-loop of steps 3014-3019, the symmetric uncertainty of each metric column with respect to the KPI column, where the columns are used to generate distributions, is computed and those metric columns with computed SU values greater than the threshold 6 are added to the list m. The for-loop of steps 3014-3019 thus selects a set of features most correlated with the KPI column. In step 3020, the list m is sorted by SU value in descending order. Turning to FIG. 30C, the routine "prune metrics" sets local variable curM to the first metric identifier in the list m, in step 3022. In step 3024, local variable nxtM is set to the metric identifier in the list m following the metric identifier stored in local variable curM. When nxtM contains a null value, as determined in step 3025, indicating that the function getNext failed to find a metric identifier, in step 3024, local variable curM is attempted to be set to the metric identifier in the list m following the metric identifier stored in local variable curM, in step 3026. When local variable curM is set to null in step 3026, indicating that there are no further metric identifiers in list m, as determined in step 3027, control flows to step 3034, discussed below. Otherwise, control returns to step 3024. When nxtM contains a metric identifier, as determined in step 3025, indicating that the function getNext found a metric identifier, in step 3024, a symmetric-uncertainty value msu is determined for the metric column corresponding to the value stored in curM with respect to the metric column corresponding to the value stored in nxtM, in step 3028. When the value msu is greater than the SU value computed for the metric column corresponding to the metric identifier nxtM, as determined in step 3030, the metric identifier nxtM is deleted from list m, in step 3031. Thus, in the loop of steps 3024-3032, those metrics more correlated with the metric corresponding to curM than with the KPI column are removed from list m. In step 3034, a result data set R is allocated and, in step 3036, the first time column is copied from data set D to result data set R and local variable j is initialized to 1. Then, in a loop of steps 3038-3040, the metric columns corresponding to metric identifiers remaining in the list m are copied from data set D to the result data set R, with local variable j incremented each time a metric column is copied from D to R. Finally, in step 3042, the KPI column is copied from data set D to the result data set R, and the routine "prune metrics" returns the result data set R, the list of metric identifiers m, and the number j of columns in result data set R.

Figure 31:
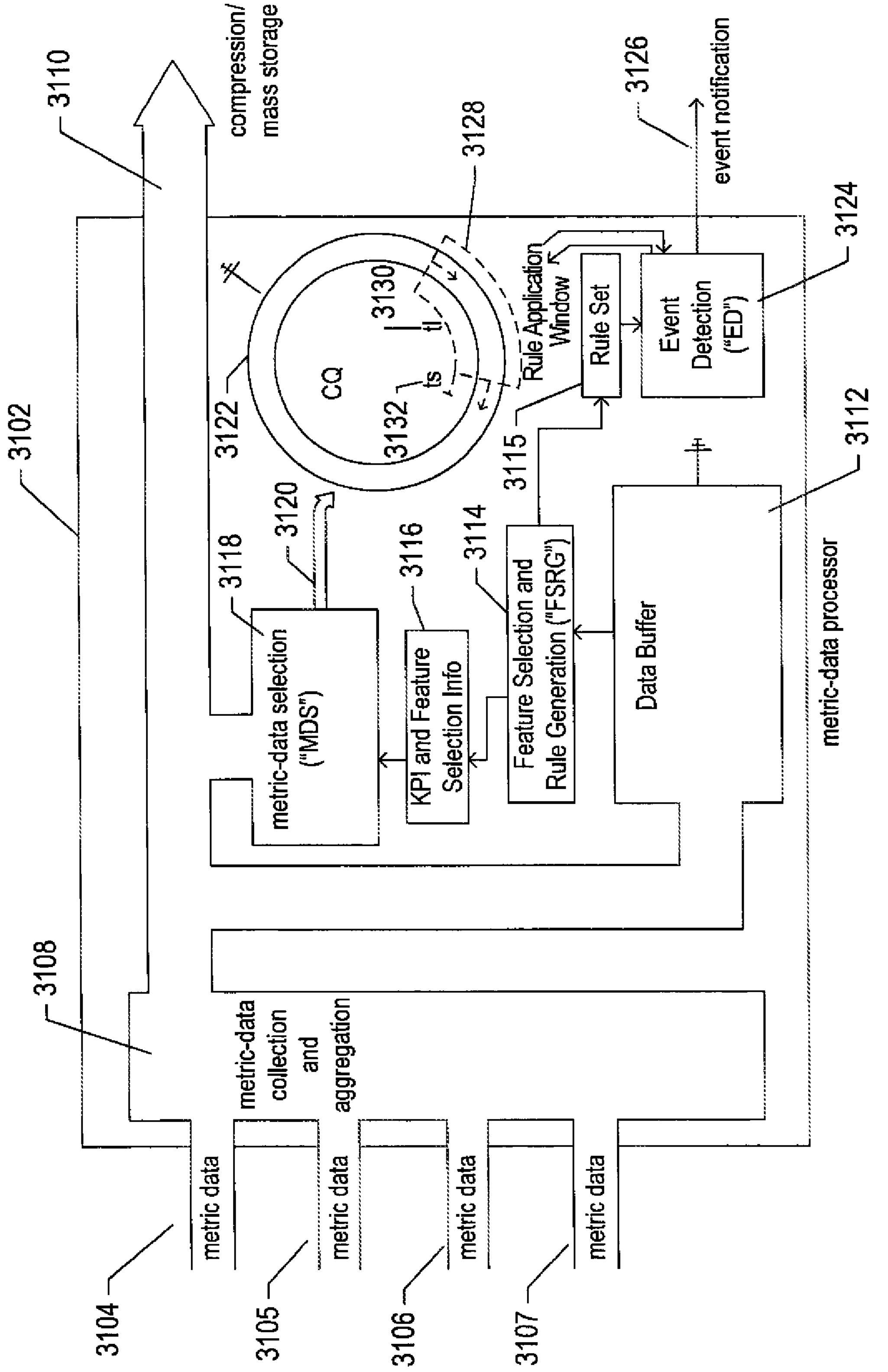
FIG. 31 shows one implementation of a metric-data initial processing and analysis component of the distributed computer system.

FIG. 31 shows one implementation of a metric-data initial processing and analysis component of the distributed computer system. The metric-data processor 3102 uses the currently disclosed metric-data processing-and-analysis methods to generate machine-learning components, comprising sets of decision trees and/or rules, for facilitating analysis of metric-data streams. The metric-data processor uses the decision trees and/or rules to attempt to predict operational anomalies and problems before they develop into serious problems and inform a management application or other distributed-computer-system management entity of the incipient problems so that they can be remediated. The metric-data processor can also transmit the machine-learning components to the distributed management application or other distributed-computer-system entities and components for use in more comprehensive metric-data analysis. The metric-data processor executes within server 2202 shown in FIG. 22, in the currently described implementation example. The metric-data processor receives metric-data streams 3104-3107 from collection-and-aggregation components and carries out preliminary processing, by a metric-data collection-and-aggregation component 3108, in order to aggregate the received metric data into a stream of n-dimensional metric-value vectors 3110 that is output to downstream compression and a data-storage components of the distributed computer system. At regular intervals, portions of the output n-dimensional metric-value-vector stream are buffered in a data buffer 3112 and used by a feature-selection and rule-generation component 3114 to generate machine-learning components, such as rule sets 3115, to facilitate metric-data analysis as well as metric-selection criteria 3116, which are used by a metric-data selection component 3118 to select a lower-dimensional metric-value-vector stream 3120 from the output n-dimensional metric-value-vector stream that is buffered in a circular queue CQ 3122 for application of the rule set 3115, by an event-detection component 3124, to detect incipient problems. The event-detection component sends event notifications 3126 to the distributed-computer-system management application, and may also send corresponding rules or the entire rule set for use by the distributed-computer-system management application. Rules of the rule set are applied to a rule-application window 3128 of time-ordered metric-value vectors. The rule-application window has a length tl 3130, in metric-value-vector units, and is shifted by is metric-value-vector units 3132 for each new rule-application operation. Thus, the metric-data processor continuously analyzes the input metric data to generate new rule sets, continuously outputs the received metric data for compression and storage, and continuously monitors the input metric data, using the generated rule set, to identify incipient problems and operational anomalies. Note that the phrase "rule set" refers, in this and subsequent paragraphs, to sets of rules, sets of decision trees, and/or sets of other similar machine-learned analysis tools.

Figure 32:
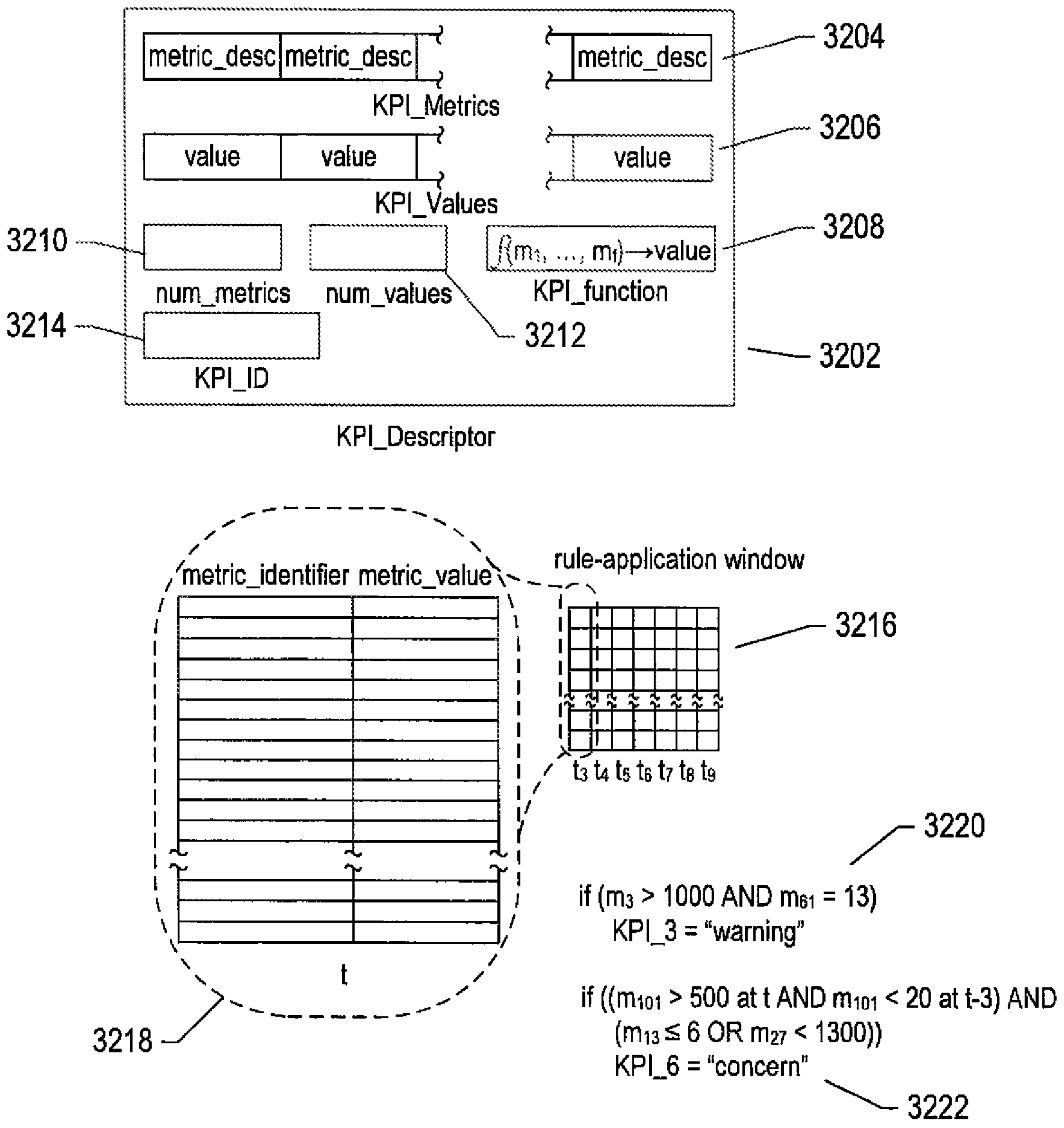
FIG. 32 illustrates data structures used by the metric-data-processor logic.

FIG. 32 illustrates data structures used by the metric-data-processor logic. A KPI descriptor 3202 describes a KPI used to generate labels for a training data set. A KPI includes a set of metrics 3204 from which KPI values are generated, as discussed above, a set of categorical KPI values 3206 used as labels for the training data, and a function 3208 that generates the categorical labels from values of the KPI metrics, as also discussed above. The KPI descriptor includes indications of the number of KPI metrics 3210 and the number of KPI values 3212. The KPI descriptor also contains an identifier for the KPI 3214. The rule-application window 3216 (3128 in FIG. 31) is a time-ordered set of vectors, each comprising, as shown in inset 3218, a set of metric-identifier/metric-value pairs. These vectors are generated by the metric-data selection component (3118 in FIG. 31). The feature-selection and rule-generation component 3114 generates rules, such as rules 3220 and 3222, that consist of Boolean conditionals and indications of the KPI value for particular KPIs. In certain implementations, these rules may contain relative time indications so that, as in rule 3222, the values of a metric at different points in time can be considered by the rule. This is why a rule-application window is used. In other implementations, rules are applied only to a single metric-value vector, in which case the rule-application window need only have a length of 1 and is a value of 1.

Figure 33:
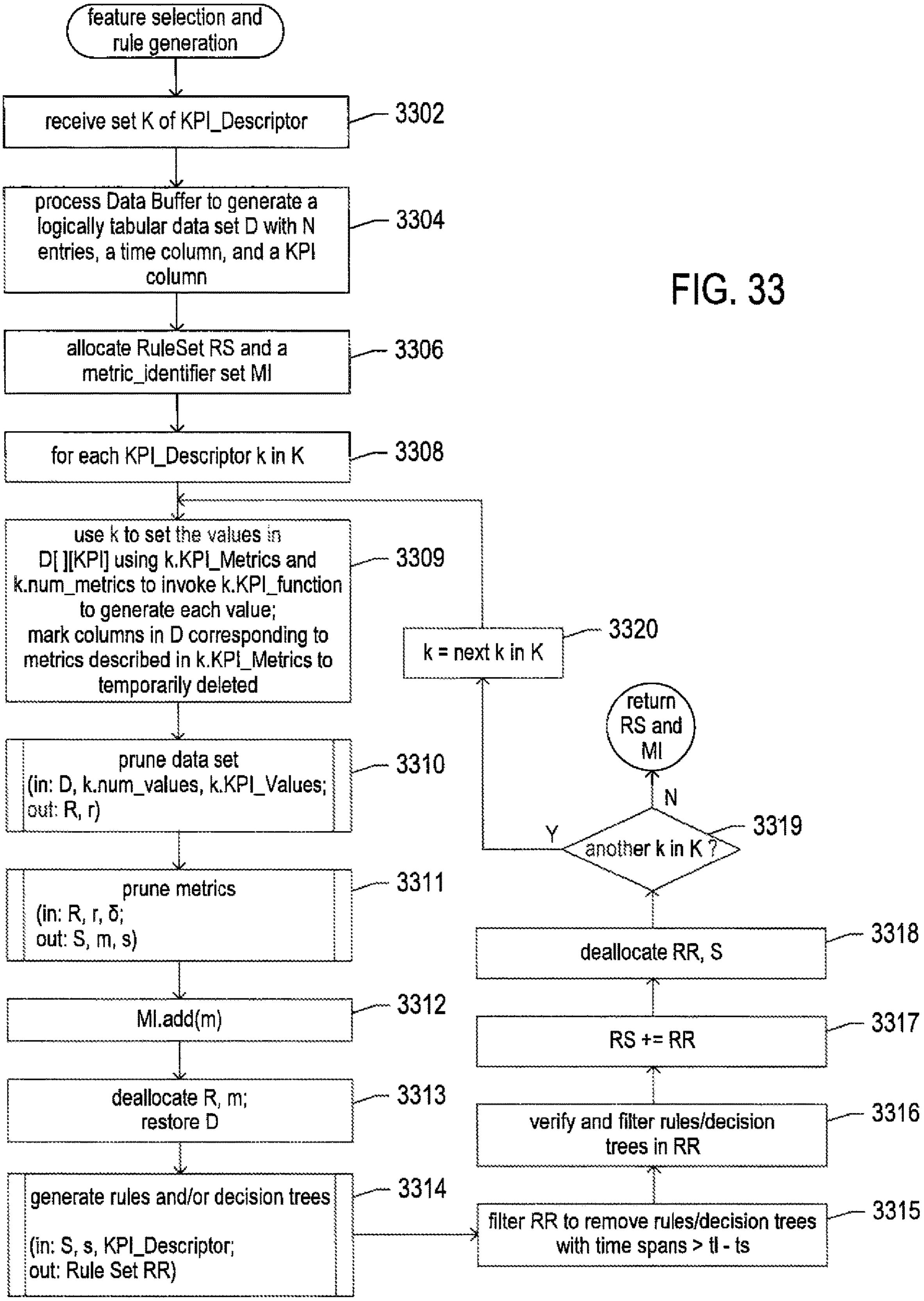
FIG. 33 provides a control-flow diagram that illustrates implementation of the rule-generation logic of the feature selection and rule generation component of the metric-data processor.

FIG. 33 provides a control-flow diagram that illustrates implementation of the rule-generation logic of the feature selection and rule generation component ("FSRG") of the metric-data processor discussed above with reference to FIG. 31. In step 3302, the FSRG routine receives a set K of KPI descriptors. In step 3304, the FSRG routine transforms the metric data stored in the Data Buffer 3112 to generate a logically tabular data set D, as discussed above with reference to FIGS. 26-27B. In step 3306, the FSRG routine allocates a rule-set data structure RS and a metric-identifier data structure MI. In the for-loop of steps 3308-3320, the FSRG routine considers each KPI descriptor k in the received set of KPI descriptors K. In step 3309, values for the KPI column for the logically tabular data set D are generated, as discussed above, with reference to FIGS. 27A-B. In step 3310, the routine "prune data set" is called to prune data set D in order to render the distribution of KPI values uniform, as discussed above with reference to FIGS. 27 B-29. In step 3311, the routine "prune metrics" is called to generate a concise logically tabular data set S, as discussed above with reference to FIGS. 30A-C. The metric identifiers returned by the routine "prune metrics," in list m, are added to the metric-identifier data structure MI. Redundant metrics in the list m are not added to MI. In step 3313, data set R generated by the routine "prune data set" and input to the routine "prune metrics" is deallocated, along with the list m, and the data set D is restored by undeleting temporarily deleted metrics. In step 3314, data set S, output by the routine "prune metrics," is used as a training data set to generate rules for the currently considered KPI. In step 3315, the rules are filtered to remove rules with relative times spanning timelines greater than those that can be incorporated into the rule-application window and, in step 3316, additional verification and filtering is carried out on the generated rules. In step 3317, the generated rules are added to the rule-set data structure RS. When there is another KPI descriptor to consider, as determined in step 3319, the next KPI descriptor k is extracted from the set K and control returns to step 3309 to generate additional rules. Otherwise, the routine FSRG returns the rule set RS and metric-identifier data structure MI. Rule generation can be carried out by a variety of different rule-generation techniques, including those discussed in a preceding subsection of this document. Rule generation may involve generating logical rules, such as rules 3220 and 3222 shown in FIG. 32, or may involve generating decision trees, discussed in a previous subsection, which are essentially equivalent to rule sets. In fact, the currently disclosed methods and systems encompass using automatically generated training data to train any of many different types of machine-learning based metric-data-analysis tools. The current document focuses on rule induction and decision trees because they are examples of explainable machine-learning-based tools that not only facilitate metric-data processing and analysis, but also provide easy-to-understand rationalizations for the results that they provide.

Figure 34A:
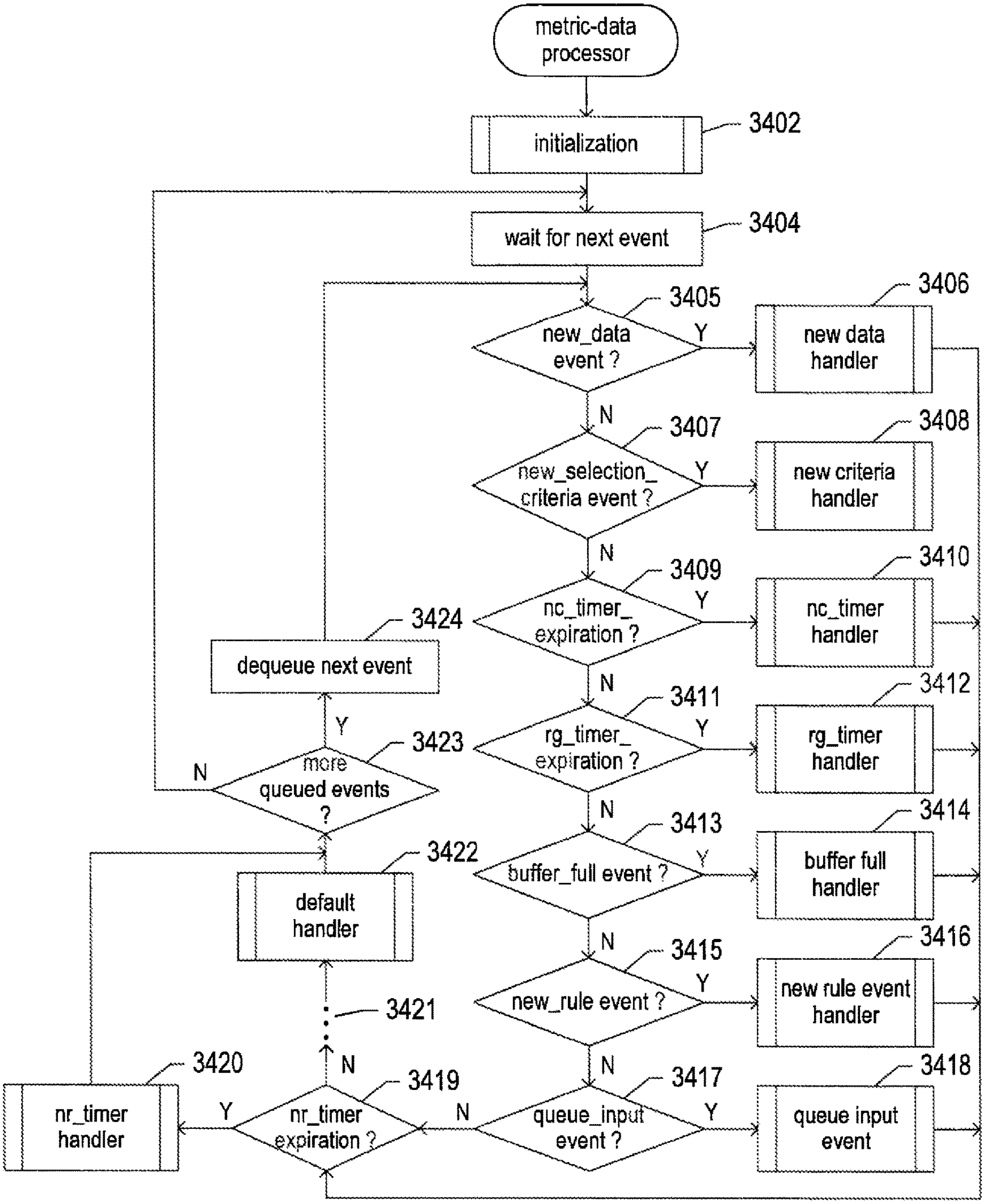
FIGS. 34A-F provide control-flow diagrams that illustrate implementation of the metric-data processor logic for the metric-data processor discussed above with reference to FIG. 31.

FIGS. 34A-F provide control-flow diagrams that illustrate implementation of the metric-data processor logic for the metric-data processor discussed above with reference to FIG. 31. As shown in FIG. 34A, the logic for the metric-data processor is foundationed on an event-handling loop contained in the routine "metric-data processor." In step 3402, the routine "metric-data processor" initializes the various components of the metric-data processor, including communications, data structures, variables, and other implementation entities. Then, in step 3404, the routine "metric-data processor" waits for the occurrence of a next event. When the next event is a new_data event, as determined in step 3405, the routine "new data handler" is called in step 3406. A new_data event is generated by the metric-data collection-and-aggregation component 3108 when a new n-dimensional metric-value vector has been added to the output n-dimensional-metric-value-vector stream. When the next event is a new_selection_criteria event, as determined in step 3407, the routine "new criteria handler" is called in step 3408. A new_selection_criteria event is generated by the FSRG component when new metric-selection criteria have been generated. When the next event is a nc_timer_expiration event, as determined in step 3409, a routine "nc_timer handler" is called, in step 3410. An nc_timer_expiration event occurs when an nc_timer expires, indicating that the metric-selection criteria (3116 in FIG. 31) can be fully updated. When the next event is an rg_timer_expiration event, as determined in step 3411, a routine "rg_timer handler" is called in step 3412. An rg_timer_expiration event occurs when an rg_timer expires, indicating that a next round of rule generation should be carried out by the component. When the next event is a buffer_full event, as determined in step 3413, a routine "buffer full handler" is called in step 3414. A buffer_full event occurs when the Data Buffer is full and the FSRG component can therefore begin to generate new rules and feature-selection criteria. When the next event is a new_rule event, as determined in step 3415, a routine "new rule event handler" is called in step 3416. A new_rule event indicates that the FSRG component has generated a new set of rules. When the next event is a queue_input event, as determined in step 3417, a routine "queue input event" is called in step 3480. A queue_input event is generated when the metric-data-selection component (3118 in FIG. 31) inputs a new lower-dimensional metric-value vector into the CQ (3122 in FIG. 31). When the next event is an nr_timer_expiration event, as determined in step 3419, a routine "nr_timer handler" is called in step 3420. An nr_timer_expiration event is generated when an nr_timer expires, indicating that the rule set used by the event-detection component (3115 in FIG. 31) can be updated. Ellipsis 3421 indicates that additional events may be handled by the event-handling loop. A default handler 3422 may handle any rare or unexpected events. When there are additional events queued for handling, as determined in step 3423, a next event is dequeued in step 3424 and control returns to step 3405. Otherwise, control returns to step 3404.

Figure 34B:
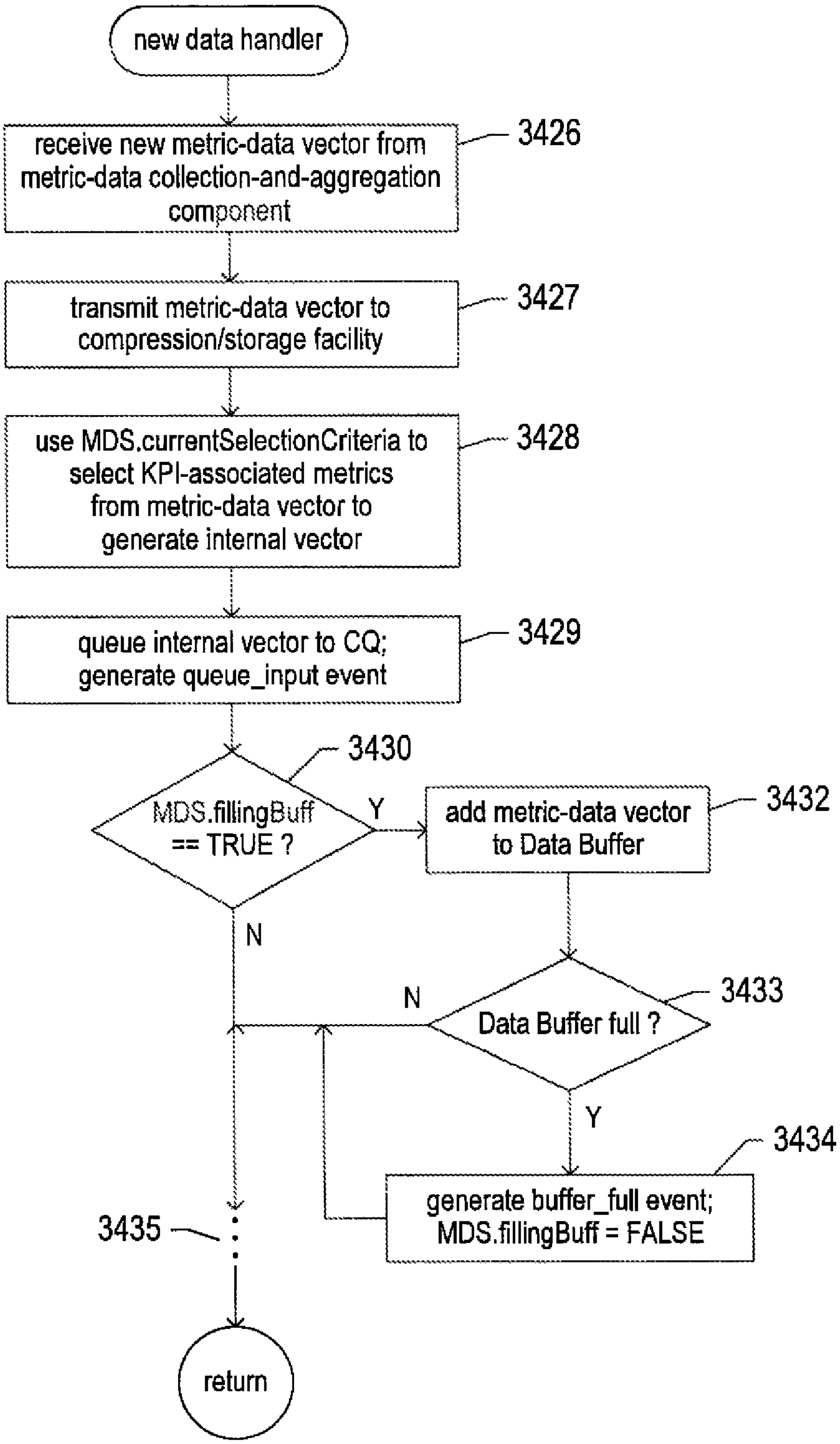

FIG. 34B provides a control-flow diagram for the routine "new data handler," called in step 3406 of FIG. 34A. In step 3426, the routine "new data handler" receives a new metric-data vector from the metric-data collection-and-aggregation component. In step 3427, the metric-data vector is transmitted to the compression/storage components. In step 3428, the metric-data-selection component ("MDS") uses the current feature-selection criteria (3116 in FIG. 31) to select KPI-associated metrics from the metric-data vector in order to generate a lower-dimensional internal vector which, in step 3429, is queued to CQ, followed by generation of a queue_input event. When the Data Buffer is being filled at the beginning of a next rule-generation session, as determined in step 3430, the metric-data vector is added to the Data Buffer, in step 3432. If the Data Buffer is not full, as determined in step 3433, the routine "new data handler" generates a buffer_full event and sets a local variable fillingBuff to FALSE, in step 3434. Ellipsis 3435 indicates that the routine "new data handler" may carry out additional steps.

Figure 34C:
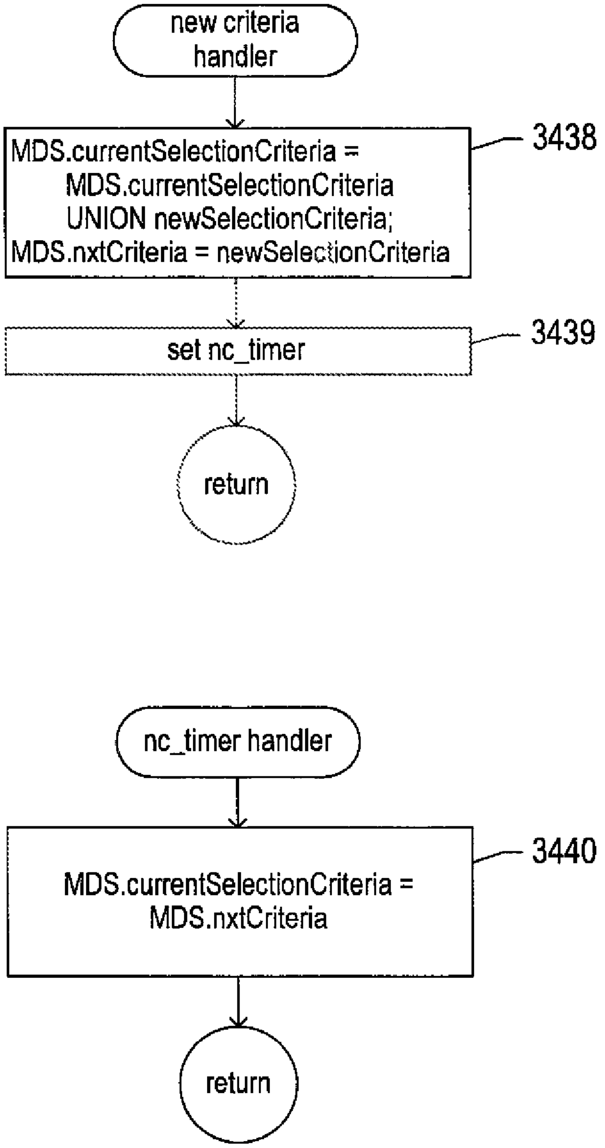

FIG. 34C provides a control-flow diagram for the routine "new criteria handler" called in step 3408 of FIG. 34A and a control-flow diagram for the routine "nc_timer handler," called in step 3410 of FIG. 34A. In step 3438, the routine "new criteria handler" sets the current feature-selection criteria to be the union of the current feature-selection criteria and new feature-selection criteria generated by the FSRG component. In addition, the new feature-selection criteria are saved in a local variable. In step 3439, the routine "new criteria handler" sets the nc_timer. Until the nc_timer expires, the MDS generates lower-dimensional metric-value vectors containing metrics needed both for the current rule set and for a new rule set generated by the FSRG components. In step 3440, the routine "nc_timer handler" sets the current feature-selection criteria to new feature-selection criteria that was generated by the FSRG component and then stored, by the MDS, until the nc_timer expired.

Figure 34D:
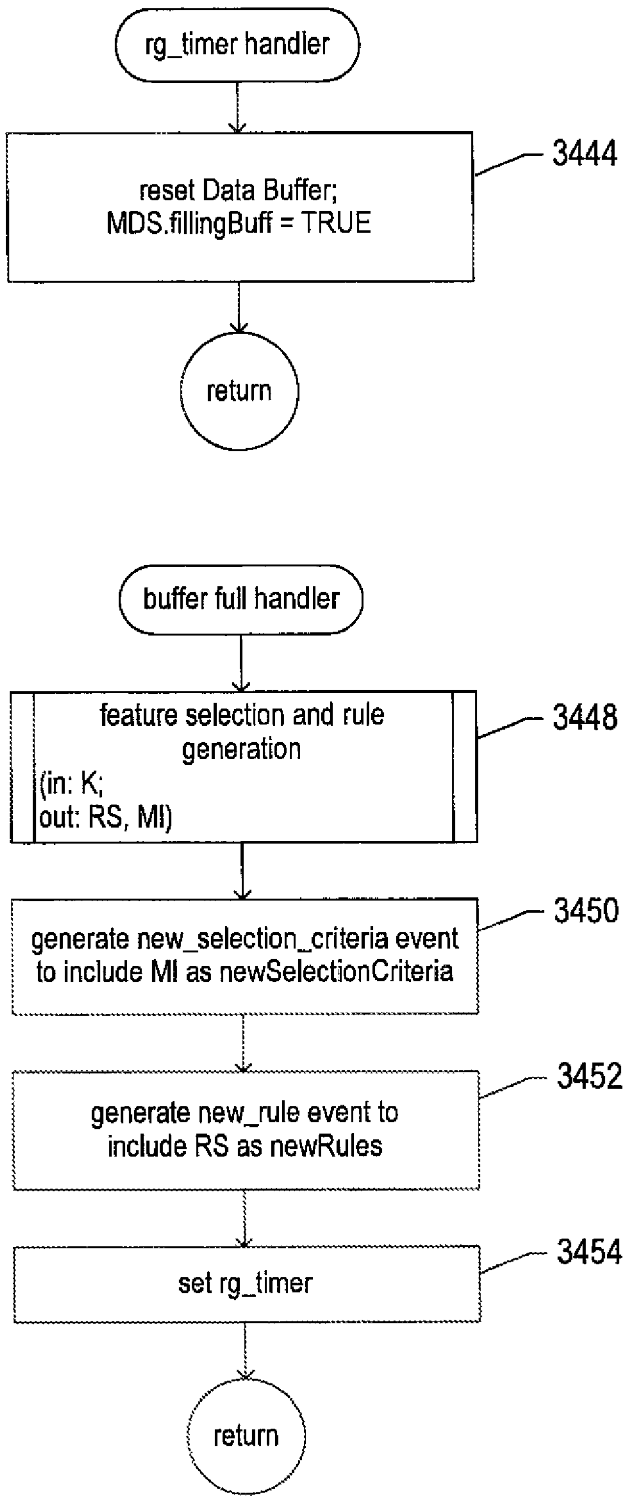

FIG. 34D provides a control-flow diagram for the routine "rg_timer handler," called in step 3412 of FIG. 34A and a control-flow diagram for the routine "buffer full handler," called in step 3414 of FIG. 34A. In step 3444, the routine "rg_timer handler" resets the Data Buffer for receiving new metric data and sets the local MDS variable fillingBuff to TRUE. In step 3448, the routine "buffer full handler" calls the routine "feature selection and rule generation," discussed above with reference to FIG. 33, to generate a new rule set and feature-selection criteria. In step 3450, the routine "buffer full handler" generates a new_selection_criteria event and, in step 3452, generates a new_rule event. Finally, in step 3454, the routine "buffer full handler" sets the rg_timer.

Figure 34E:
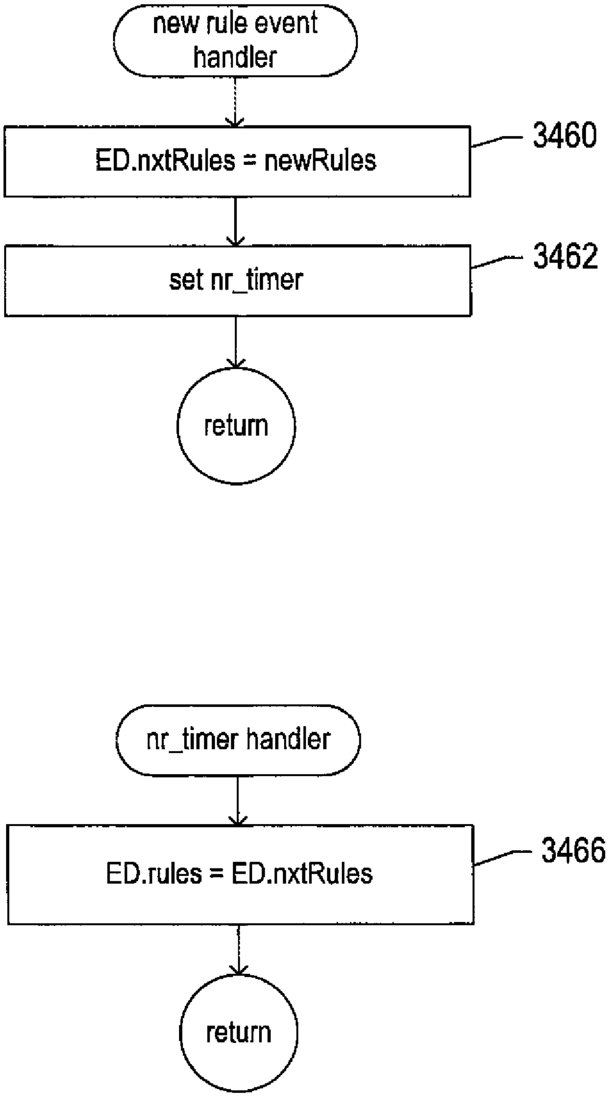

FIG. 34E provides a control-flow diagram for the routine "new rule event handler." called in step 3406 of FIG. 34A and provides a control-flow diagram for the routine "nr_timer handler," called in step 3420 of FIG. 34A. In step 3460, the routine "new rule event handler" stores the new rules generated by the FSRG component in a local event-detection component ("ED") variable nxtRules and, in step 3462, sets the nr_timer. In step 3466, the routine "nr_timer handler" sets the current rules to the new rules generated by the FSRG component and stored in the local ED variable nxtRules.

Figure 34F:
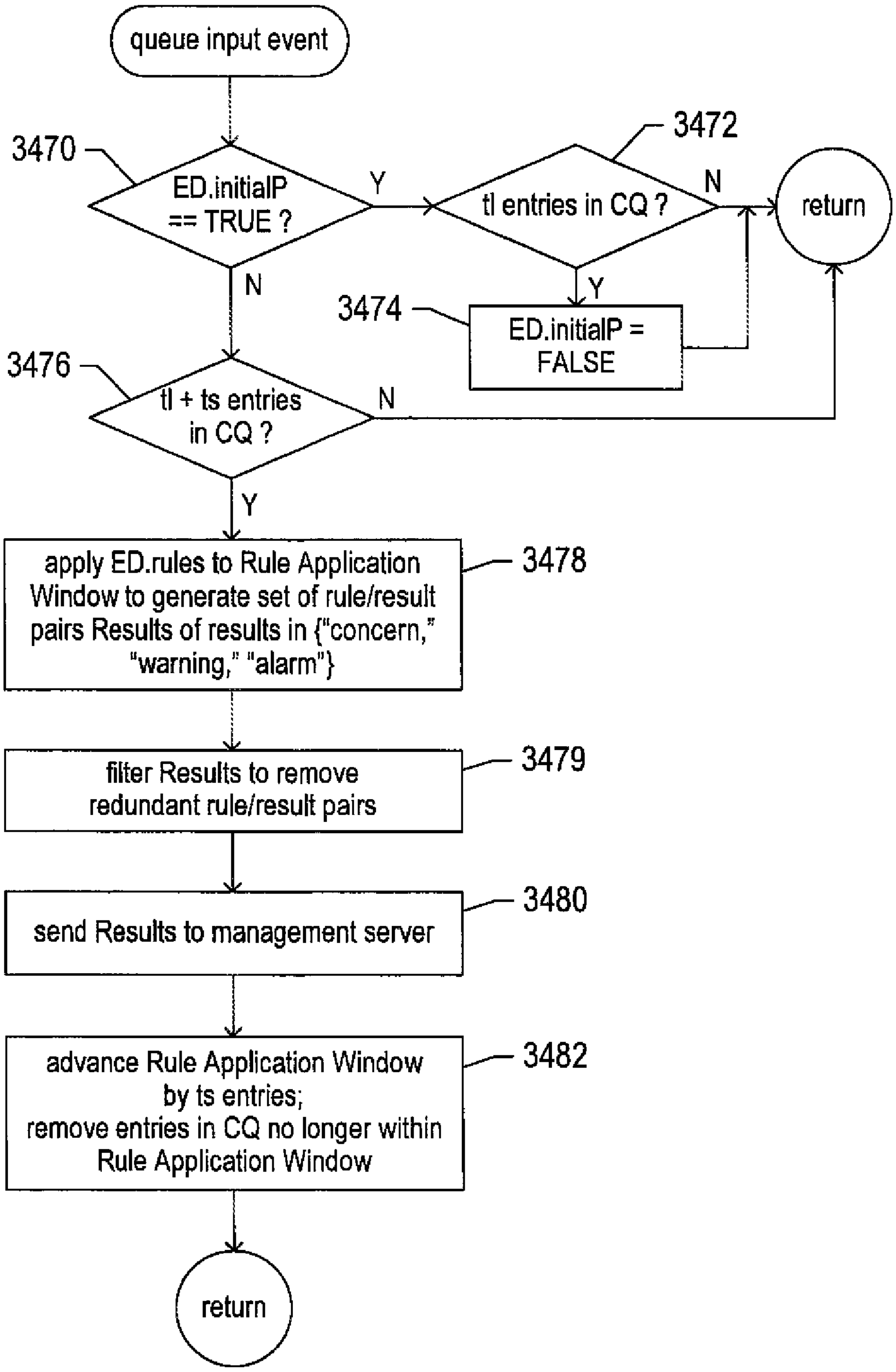

FIG. 34F provides a control-flow diagram for the routine "queue input event," called in step 3418 of FIG. 34A. In step 3470, the routine "queue input event" determines whether the ED local variable initialP contains the value TRUE. If so, and when there are tl entries in CQ, as determined in step 3472, the ED local variable initialP is set to FALSE, in step 3474. In both cases, the routine "queue input event" then returns. When the ED local variable initialP contains the value FALSE, as determined in step 3470, and when there are tl+ts entries in CQ, as determined in step 3476, the ED applies, in step 3478, the current rule set to the rule-application window in order to produce a set of rules/result pairs Results, each pair including the rule that generated the result and a result that includes a KPI identifier and a KPI value in the set {"concern," "warning," "alarm"}. In step 3479, the routine "queue input event" filters the rules/result pairs in the set Results to remove any redundant rule/result pairs, such as one of two different rules/result pairs containing values generated from the same rule. In step 3480, the routine "queue input event" transmits the set Results to the management server. Finally, in step 3482, the routine "queue input event" advances the rule-application window by ts metric-value vectors and removes metric-value vectors from the CQ that are no longer within the rule-application window.

The present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the currently disclosed methods and systems. For example, there are many different possible metrics that can be computed and used in the various different components that use the currently disclosed metric-data processing-and-analysis methods. Many different machine-learning components can be trained using the training data sets generated by the currently disclosed metric-data processing-and-analysis methods.

The invention claimed is:

1. An improved machine-learning-based metric-data processing system that processes metric-data generated within a distributed computer system, the improved machine-learning-based metric-data processing system comprising:

one or more processors;

one or more memories;

one or more data-storage devices; and computer instructions stored in one or more of the one or more memories that, when executed by one or more of the one or more processors, control the improved machine-learning-based metric-data processing system to receive multiple metric-data streams from one or more metric-data collection-and-aggregation components of the distributed computer system, output an n-dimensional metric-value-vector stream to one or more compression and/or storage components;

automatically generate machine-learning-based analysis tools using training data automatically generated from the n-dimensional metric-value-vector stream;

use the automatically generate machine-learning-based analysis tools to monitor the input metric data to detect incipient operational anomalies and problems within the distributed computer system;

report the detected anomalies and problems to management components for amelioration; and forwarding, by the improved machine-learning-based metric-data processing system, one or more of the automatically generated machine-learning-based analysis tools to management components within the distributed computer system for use in metric-data analysis.

2. The improved machine-learning-based metric-data processing system of claim 1 wherein the multiple metric-data streams each comprises a sequence of encoded metric-data data points, each metric-data data point representable as a timestamp/value pair; and wherein the value of a timestamp/value pair is one of a scalar value and a vector value.

3. The improved machine-learning-based metric-data processing system of claim 1 wherein the output of the n-dimensional metric-value-vector stream to one or more compression and/or storage components occurs currently and asynchronously with respect to generation of machine-learning-based analysis tools, monitoring of the input metric data, and reporting of the detected anomalies and problems to management components for amelioration.

4. The improved machine-learning-based metric-data processing system of claim 1 wherein automatic generation of training data from the n-dimensional metric-value-vector stream comprises generating a set of logically tabular datasets by:

for each of a set of KPIs, selecting a subsequence of n-dimensional metric-value vectors from the n-dimensional metric-value-vector stream;

transforming the selected subsequence of n-dimensional metric-value vectors into a logically tabular dataset having metric columns corresponding to elements of the n-dimensional metric-value vectors that each contain a sequence of metric values contained in a particular element of the n-dimensional metric-value vectors;

adding a KPI column to the logically tabular dataset;

pruning the logically tabular dataset so that KPI values in the KPI column are uniformly distributed; and pruning the metric columns to generate a concise logically tabular dataset.

5. The improved machine-learning-based metric-data processing system of claim 4 wherein adding a KPI column to the logically tabular dataset further comprises:

selecting one or more metric columns of the logically tabular dataset;

from each element in the one or more selected metric columns, generating a numerical KPI value;

transforming the numerical KPI values into categorical KPI values;

adding the KPI column containing the categorical KPI values to the logically tabular dataset; and removing the selected metric columns from consideration for selection for inclusion in the concise logically tabular dataset.

6. The improved machine-learning-based metric-data processing system of claim 4 wherein pruning the logically tabular dataset so that KPI values in the KPI column are uniformly distributed further comprises:

determining a probability distribution for the categorical KPI values; and iteratively considering each row of the logically tabular dataset, and randomly selecting the considered row for removal from the logically tabular data set with a probability inversely proportional to the probability associated with the categorical KPI values in the determined probability distribution.

7. The improved machine-learning-based metric-data processing system of claim 4 wherein pruning the metric columns to generate a concise logically tabular dataset further comprises:

computing pairwise symmetrical uncertainty values for the metric columns with respect to the KPI column;

selecting metric columns with computed symmetrical uncertainty values less than a threshold value;

computing pairwise symmetrical uncertainty values for selected metric columns with respect to other selected metric columns; and removing metric columns that are more strongly correlated with other metric columns than with the KPI column.

8. The improved machine-learning-based metric-data processing system of claim 1 wherein automatically generating machine-learning-based analysis tools using automatically generated training data further comprises one of:

generating a set of logical rules from the training data using a rule-induction method; and generating one or more decision trees from the training data using a decision-tree construction method.

9. The improved machine-learning-based metric-data processing system of claim 1 wherein using the automatically generated machine-learning-based analysis tools to monitor the input metric data to detect incipient operational anomalies and problems within the distributed computer system further comprises one or more of:

applying each automatically generated machine-learning-based analysis tool to a subsequence of n-dimensional metric-value vectors selected from the n-dimensional metric-value-vector stream to generate a categorical KPI value; and when the generated categorical KPI value is indicative of an operational anomaly or problem, storing an indication of the tool along with the generated categorical KPI value for subsequent reporting.

10. A method, incorporated in an improved machine-learning-based metric-data processing system having one or more processors, one or more memories, one or more data-storage devices, that: automatically generates training data from an n-dimensional metric-value-vector stream; and automatically generates machine-learning-based analysis tools using the automatically generated training data; and using the automatically generated machine-learning-based analysis tools to monitor metric data to detect incipient operational anomalies and problems within the distributed computer system; applying each automatically generated machine-learning-based analysis tool to a subsequence of n-dimensional metric-value vectors selected from the n-dimensional metric-value-vector stream to generate a categorical KPI value; and when the generated categorical KPI value is indicative of an operational anomaly or problem, storing an indication of the tool along with the generated categorical KPI value for subsequent reporting the detected anomalies and problems to management components for amelioration.

11. The method of claim 10 wherein automatically generating training data from the n-dimensional metric-value-vector stream further comprises generating a set of logically tabular datasets by:

for each of a set of KPIs, selecting a subsequence of n-dimensional metric-value vectors from the n-dimensional metric-value-vector stream;

transforming the selected subsequence of n-dimensional metric-value vectors into a logically tabular dataset having metric columns corresponding to elements of the n-dimensional metric-value vectors that each contain a sequence of metric values contained in a particular element of the n-dimensional metric-value vectors;

adding a KPI column to the logically tabular dataset;

pruning the logically tabular dataset so that KPI values in the KPI column are uniformly distributed; and pruning the metric columns to generate a concise logically tabular dataset.

12. The method of claim 11 wherein adding a KPI column to the logically tabular dataset further comprises:

selecting one or more metric columns of the logically tabular dataset;

from each element in the one or more selected metric columns, generating a numerical KPI value;

transforming the numerical KPI values into categorical KPI values;

adding the KPI column containing the categorical KPI values to the logically tabular dataset; and removing the selected metric columns from consideration for selection for inclusion in the concise logically tabular dataset.

13. The method of claim 11 wherein pruning the logically tabular dataset so that KPI values in the KPI column are uniformly distributed further comprises:

determining a probability distribution for the categorical KPI values; and iteratively considering each row of the logically tabular dataset, and randomly selecting the considered row for removal from the logically tabular data set with a probability inversely proportional to the probability associated with the categorical KPI values in the determined probability distribution.

14. The method of claim 11 wherein pruning the metric columns to generate a concise logically tabular dataset further comprises:

computing pairwise symmetrical uncertainty values for the metric columns with respect to the KPI column;

selecting metric columns with computed symmetrical uncertainty values less than a threshold value;

computing pairwise symmetrical uncertainty values for selected metric columns with respect to other selected metric columns; and removing metric columns that are more strongly correlated with other metric columns than with the KPI column.

15. The method of claim 10 wherein automatically generating machine-learning-based analysis tools using automatically generated training data further comprises one of:

generating a set of logical rules from the training data using a rule-induction method; and generating one or more decision trees from the training data using a decision-tree construction method.

* * * * *